(12) United States Patent
Baba et al.

(10) Patent No.: US 12,548,442 B2
(45) Date of Patent: Feb. 10, 2026

(54) PROCESSING DEVICE, PROCESSING METHOD, PROCESSING SYSTEM, AND STORAGE MEDIUM

(71) Applicant: DENSO CORPORATION, Kariya (JP)

(72) Inventors: Atsushi Baba, Kariya (JP); Shin Kosaka, Kariya (JP); Megumi Anami, Kariya (JP); Norifumi Kanda, Kariya (JP); Tasuku Hayakawa, Eching (DE)

(73) Assignee: DENSO CORPORATION, Kariya (JP)

( * ) Notice: Subject to any disclaimer, the term of this patent is extended or adjusted under 35 U.S.C. 154(b) by 227 days.

(21) Appl. No.: 18/363,503

(22) Filed: Aug. 1, 2023

(65) Prior Publication Data

US 2024/0038069 A1    Feb. 1, 2024

Related U.S. Application Data

(63) Continuation of application No. PCT/JP2022/002632, filed on Jan. 25, 2022.

(30) Foreign Application Priority Data

Feb. 3, 2021 (JP) .................. 2021-015884

(51) Int. Cl.
    *G08G 1/0967*      (2006.01)
    *G16Y 10/40*      (2020.01)
    *G16Y 40/50*      (2020.01)

(52) U.S. Cl.
    CPC ........ *G08G 1/096775* (2013.01); *G16Y 10/40* (2020.01); *G16Y 40/50* (2020.01)

(58) Field of Classification Search
    CPC ... G08G 1/096775; G16Y 40/50; G16Y 10/40
(Continued)

(56) References Cited

U.S. PATENT DOCUMENTS 9,495,874 B1 * 11/2016 Zhu .................. G08G 1/096741
11,024,160 B2 * 6/2021 Ricci ...................... G01C 21/26
(Continued)

FOREIGN PATENT DOCUMENTS

JP      2009-94718 A      4/2009
JP      2012233725 A      11/2012
(Continued)

OTHER PUBLICATIONS

U.S. Appl. No. 18/363,517, filed Aug. 1, 2023, and its entire file history.

*Primary Examiner* — Luis A Martinez Borrero
(74) *Attorney, Agent, or Firm* — Maschoff Brennan

(57) ABSTRACT

A processing device performing a process related to driving of a host moving object, which is capable of communicating with a remote center, is provided. The processing device includes a processor configured to: monitor a safety envelope violation, which is a violation of a safety envelope in which safety of intended functionality is set in compliance with a driving policy, in the host moving object in manual driving; in response to determining that the safety envelope violation is occurred, generate scenario information, which represents a scenario of the safety envelope violation, and transmit the scenario information to the remote center; and acquire feedback information from the remote center, the feedback information being fed back based on the scenario information.

25 Claims, 29 Drawing Sheets

| Terms | Description |
|---|---|
| Levels of driving automation | Levels of driving automation may be defined as "mutually exclusive set of driving automation levels, ranging from Level 0 (no automation) to Level 5 (full automation), defining the roles of the driver or user and automation system in relation to each other". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Dynamic driving task (DDT) | Dynamic driving task may be defined as "real-time operational and tactical functions required to operate a vehicle in traffic". Dynamic driving task may be defined as "all of the real-time operational and tactical functions required to operate a vehicle in on-road traffic". |
| Takeover | Takeover may be define as "transfer of the driving task between the automated driving system and the driver". |
| Lagging measure | Lagging measure may be defined as "metrics that are assessed after deployment of an automated driving system and provides confirmation that the positive risk balance as well as conformance with the safety-by-design techniques have been achieved". Lagging measure may be defined as "metrics that are assessed after deployment of an automated driving system and provides confirmation that conformance with the safety-by-design has been achieved". Herein, safety may be defined with consideration of statistics or social acceptability other than absolute metrics. |
| Leading measure | Leading measure may be defined as "metrics that are derived from data that is assessed prior to deployment of an automated driving system indicating that the automated driving system conforms with safety-by-design techniques to achieve a positive risk balance and avoidance of unreasonable risk". Leading measure may be defined as "metrics that are derived from data that is assessed prior to deployment of an automated driving system indicating that the automated driving system conforms with safety-by-design to achieve avoidance of unreasonable risk". Herein, safety may be defined with consideration of statistics or social acceptability other than absolute metrics. |

(58) Field of Classification Search
USPC .......................................................... 701/117
See application file for complete search history.

(56) References Cited

U.S. PATENT DOCUMENTS

| | | | | |
|---|---|---|---|---|
| 11,774,963 B2* | 10/2023 | Huang | .................... | G05D 1/225 |
| | | | | 701/2 |
| 2011/0210867 A1* | 9/2011 | Benedikt | .................. | G08G 1/01 |
| | | | | 340/905 |
| 2014/0309806 A1* | 10/2014 | Ricci | ....................... | G06F 21/31 |
| | | | | 701/1 |
| 2014/0310739 A1* | 10/2014 | Ricci | .................... | G06V 20/593 |
| | | | | 725/75 |
| 2016/0055747 A1* | 2/2016 | Ricci | ................... | G06F 11/2023 |
| | | | | 701/117 |
| 2018/0127001 A1* | 5/2018 | Ricci | ..................... | B60W 30/14 |
| 2021/0155269 A1* | 5/2021 | Oba | ................. | G08G 1/096775 |
| 2022/0126864 A1* | 4/2022 | Moustafa | .............. | B60W 40/09 |
| 2022/0180738 A1* | 6/2022 | Dubner | ............ | G08G 1/096775 |
| 2022/0234615 A1* | 7/2022 | Nishino | ................ | G01S 17/931 |
| 2022/0238019 A1* | 7/2022 | Tsuda | ..................... | G06Q 40/08 |
| 2022/0289250 A1* | 9/2022 | Oba | ........................ | G08G 1/16 |
| 2023/0037798 A1* | 2/2023 | Dalmasso | ........ | G08G 1/096716 |
| 2023/0147357 A1* | 5/2023 | Iwai | ....................... | G08G 1/164 |
| | | | | 701/23 |

FOREIGN PATENT DOCUMENTS

| | | |
|---|---|---|
| JP | 2017-187856 A | 10/2017 |
| JP | 6708793 B2 | 6/2020 |
| WO | 2018/115963 A2 | 6/2018 |
| WO | 2019/180506 A2 | 9/2019 |
| WO | 2020/035728 A2 | 2/2020 |

* cited by examiner

FIG. 1

| Terms | Description |
|---|---|
| Levels of driving automation | Levels of driving automation may be defined as "mutually exclusive set of driving automation levels, ranging from Level 0 (no automation) to Level 5 (full automation), defining the roles of the driver or user and automation system in relation to each other". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Dynamic driving task (DDT) | Dynamic driving task may be defined as "real-time operational and tactical functions required to operate a vehicle in traffic". Dynamic driving task may be defined as "all of the real-time operational and tactical functions required to operate a vehicle in on-road traffic". |
| Takeover | Takeover may be define as "transfer of the driving task between the automated driving system and the driver". |
| Lagging measure | Lagging measure may be defined as "metrics that are assessed after deployment of an automated driving system and provides confirmation that the positive risk balance as well as conformance with the safety-by-design techniques have been achieved". Lagging measure may be defined as "metrics that are assessed after deployment of an automated driving system and provides confirmation that conformance with the safety-by-design has been achieved". Herein, safety may be defined with consideration of statistics or social acceptability other than absolute metrics. |
| Leading measure | Leading measure may be defined as "metrics that are derived from data that is assessed prior to deployment of an automated driving system indicating that the automated driving system conforms with safety-by-design techniques to achieve a positive risk balance and avoidance of unreasonable risk". Leading measure may be defined as "metrics that are derived from data that is assessed prior to deployment of an automated driving system indicating that the automated driving system conforms with safety-by-design to achieve avoidance of unreasonable risk". Herein, safety may be defined with consideration of statistics or social acceptability other than absolute metrics. |

FIG. 2

| Terms | Description |
|---|---|
| High definition map (HD map) | High definition map may be defined as "maps with high level precision mostly used in the context of automated driving system to give the vehicle precise information about the road environment". |
| Path planning | Path planning may be defined as "identification and selection of the vehicle trajectory for every defined time-step in response to the situational awareness, destination and other constraints". |
| Operational design domain (ODD) | Operational design domain may be defined as "specific conditions under which a given driving automation system is designed to function". Operational design domain may be defined as "operating conditions under which a given automated driving system or feature thereof is specifically designed to function, including, but not limited to, environmental, geographical, and time-of-day restrictions, and/or the requisite presence or absence of certain traffic or roadway characteristics". |
| Scenario | Scenario may be defined as "description of the temporal relationship between several scenes, with goals and values within a specified situation in a sequence of scenes influenced by actions and events". Scenario may be defined as "description of the consecutive time series of activities integrating the subject vehicle, all its external environment and their interactions in the process of performing a certain driving task". Scenario may be defined as "high level descriptions of common driving situations in which reasonable and foreseeable assumptions about the behavior of other road users shall be made". |
| Scene | Scene may be defined as "snapshot of the environment including the scenery, dynamic elements, and all actors and observers self-representations, and the relationships among those entities". Scene may be defined as "snapshot of the scenario at a given point of time". |
| Use case | Use case may be defined as "description of a suite of related scenarios". |
| Simulation | Simulation may be defined as "approximated imitation of selected behavioral characteristics of one physical or abstract system by a static or dynamic model". |

FIG. 3

| Terms | Description |
|---|---|
| Driving policy (DP) | Driving policy may be defined as "strategy and rules defining acceptable control actions at vehicle level". Driving policy may be decision-making level implementation of the vehicle level safety strategy (VLSS). Driving policy may be a mapping from a sensing state (a description of the world around us) into a driving command (e.g., the command is lateral and longitudinal accelerations for the coming second, which determines where and at what speed should the car be in one second from now). |
| Vehicle level safety strategy (VLSS) | VLSS may represent the set of requirements for the function under development used to support SOTIF related design, verification and validation activities. VLSS may be the overarching specification that ensure the overall AV safety. |
| Safety of the Intended functionality (SOTIF) | SOTIF may be defined as "absence of unreasonable risk due to these potentially hazardous behaviors related to such limitations". SOTIF may be defined as "absence of unreasonable risk due to hazards resulting from functional insufficiencies of the intended functionality or its implementation". SOTIF may be defined as "absence of unreasonable risk due to hazards resulting from functional insufficiencies of the intended functionality or by reasonably foreseeable misuse by road users". |
| Proper response | Proper response may be defined as "the set of corrective actions that the driving policy might require to maintain the SOTIF of an autonomous vehicle (AV) during nominal conditions". |
| Unreasonable risk | Unreasonable risk may be defined as "risk judged to be unacceptable in a certain context according to valid societal moral concepts". |
| Unreasonable situation | Unreasonable situation may be defined as "a situation where some other agent is not behaving reasonably per the assumptions used in the model". |
| Misuse | Misuse may be defined as "usage of the system by a human in a way not intended by the manufacturer or the service provider". |

FIG. 4

| Terms | Description |
|---|---|
| Safety envelope | The definition of a "safety envelope" may be a common concept that can be used to address all the principles that the driving policy might comply with. According to this concept, the autonomous vehicle might have one or more boundaries around the ego-vehicle, where the violation of one or more of these boundaries result in different responses by the autonomous vehicle.<br>Safety envelopes may define a physics based margin around the automated vehicle typically combined with defined assumptions about the reasonably foreseeable worst case behavior of others to provide a foundational building block of a safety-related model.<br>Safety envelope may be the basic construct for understanding if the autonomous vehicle is in a high risk scenario.<br>Safety envelope may be defined to demarcate boundaries, margins or buffer areas not only around the ego-vehicle but also around other vehicles, around pedestrians or around stationary objects. |
| DDT fallback | DDT fallback may be defined as "response by the driver or automation system to either perform the DDT or transition to a minimal risk condition after the occurrence of a failure(s) or detection of a functional insufficiency or upon detection of a potentially hazardous behavior".<br>DDT fallback may be defined as "takeover/fallback condition and schemes of transition control from autonomous to control by driver or other system with their relevant use cases". |
| Minimal risk condition (MRC) | Minimal risk condition may be defined as "vehicle state in order to reduce the risk of a harm, when a given trip cannot be completed".<br>Minimal risk condition may be defined as "condition to which a user or an automated driving system may bring a vehicle after performing the minimal risk maneuver in order to reduce the risk of a crash when a given trip cannot be completed". |
| Minimal risk maneuver (MRM) | Minimal risk maneuver may be defined as "automated driving system's capability of transitioning the vehicle between nominal and minimal risk conditions". |
| Degradation | Degradation may be defined as "state or transition to a state of the item or element with reduced functionality, performance, or both". |

FIG. 5

| Terms | Description |
|---|---|
| user | User may be defined as "general term referencing the human role in driving automation". |
| Fallback ready user | Fallback ready user may be defined as "user who is able to operate the vehicle and is capable of intervening to perform the DDT fallback as required and within a time span appropriate for the defined non-driving occupation". |
| Road user | Road user may be defined as "anyone who uses a road including sidewalk and other adjacent spaces". Road users may include pedestrians, cyclists, other VRUs, and vehicles (for example, human driven motor vehicles or ADS-equipped vehicles). |
| Vulnerable road user (VRU) | Vulnerable road user may be defined as "non-protected road user such as motorcyclists, cyclists, pedestrians and persons with disabilities or reduced mobility and orientation". |
| Non vulnerable road user | Non vulnerable road user may be defined as "protected road users such as users in other vehicles, trucks, construction and agricultural machines". |
| Other road user | Other road user may be defined as "vulnerable and non-vulnerable road users with no role in the ego automated vehicle". |
| Response time | Response time may be defined as "the time it takes for a road user to initiate an appropriate response (e.g., braking/steering/accelerating/stopping) due to a specific stimulus in a given scenario" |

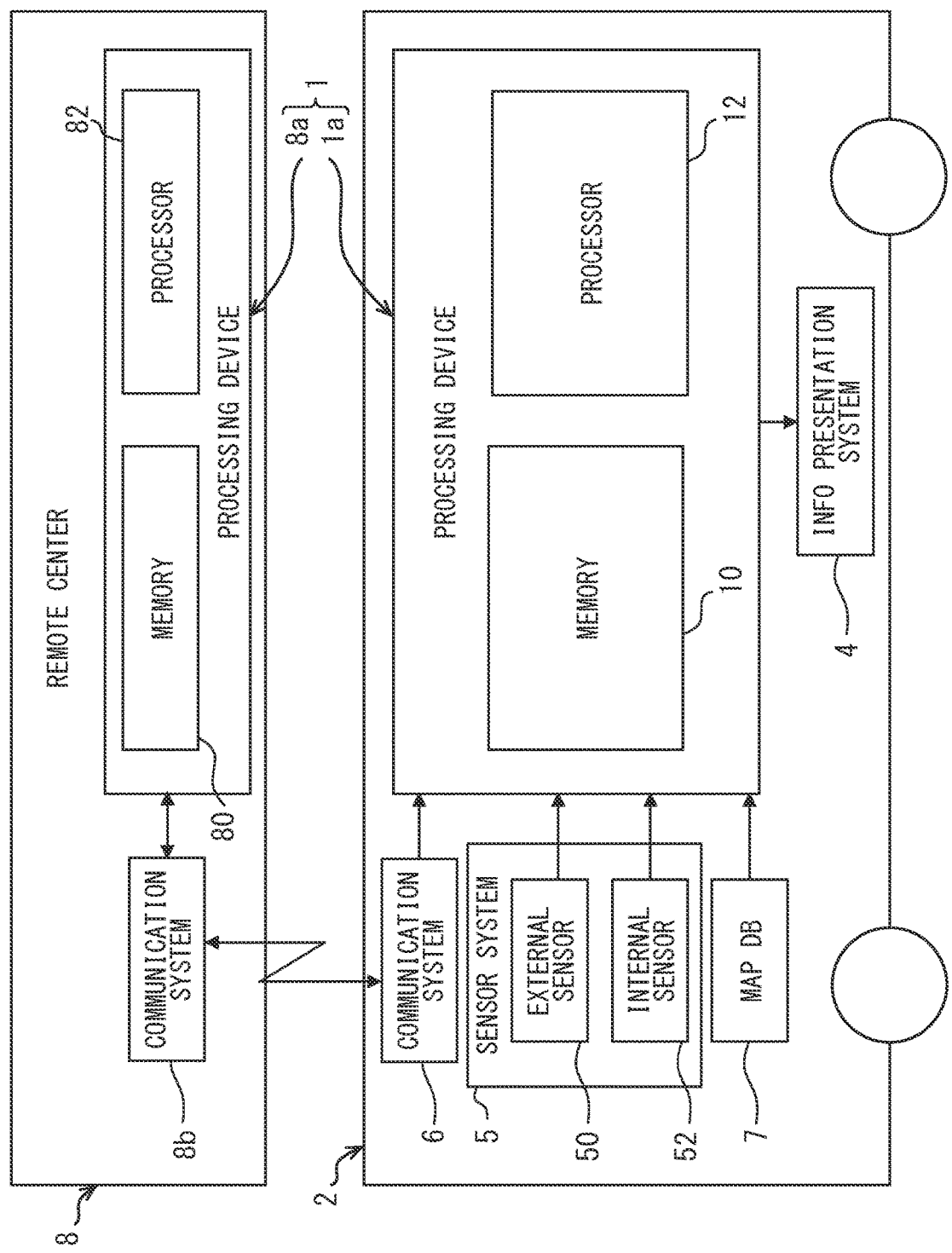

FIG. 10
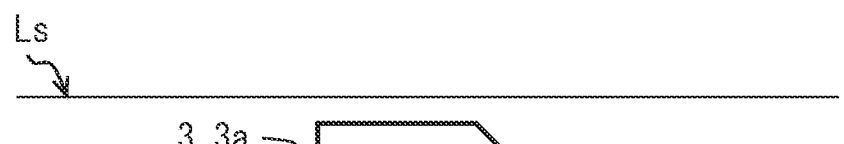
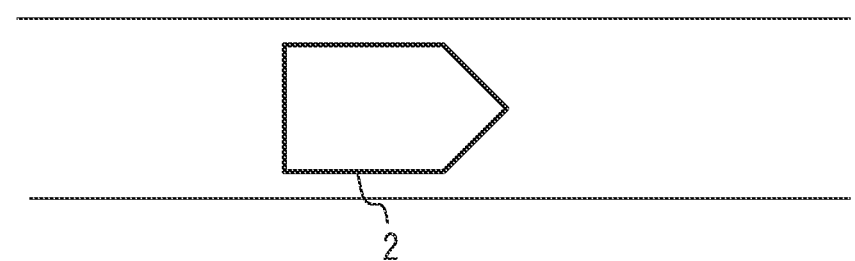

FIG. 12

| VEHICLE OF VIOLATION | MOTION PHYSICAL QUANTITY OF VIOLATION | | TYPE OF RISK | | FACTOR OF VIOLATION (ERRONEOUS DETERMINATION / ERRONEOUS CONTROL) | VIOLATED DRIVING POLICY |
|---|---|---|---|---|---|---|
| HOST VEHICLE | ACCELERATION AND DECELERATION | LONGITUDINAL DIRECTION | REAR-END COLLISION | PRECEDING VEHICLE | BRAKING TIMING ERROR | 1 |
| | | | | FOLLOWING VEHICLE | INSUFFICIENT VEHICLE-TO-VEHICLE DISTANCE | 1 |
| | | | HEAD-ON COLLISION | CORRECT LANE | ONCOMING TIMING ERROR | 3 |
| | | | | OPPOSITE LANE | ONCOMING LANE PRIORITY ERROR | 3 |
| | | | CROSSING | PRIORITIZED | CROSSING TIMING ERROR | 3 |
| | | | | NON-PRIORITIZED | INTERSECTION PRIORITY ERROR | 3 |
| | | LATERAL DIRECTION | SIDE COLLISION | | PASSING / LANE CHANGE TIMING ERROR | 2 |
| | SPEED | LONGITUDINAL DIRECTION LATERAL DIRECTION | BLIND SPOT | MOVING OBJECT | OVERSPEED | 4 |
| | | | | FEATURE | OVERSPEED | 4 |
| | | | | OUT OF SENSOR RANGE | OVERSPEED | 4 |
| TARGET VEHICLE | SAME AS ABOVE | | SAME AS ABOVE | | SAME AS ABOVE | 5 |

PROCESSING DEVICE, PROCESSING METHOD, PROCESSING SYSTEM, AND STORAGE MEDIUM

CROSS REFERENCE TO RELATED APPLICATION

The present application is a continuation application of International Patent Application No. PCT/JP2022/002632 filed on Jan. 25, 2022, which designated the U.S. and claims the benefit of priority from Japanese Patent Application No. 2021-015884 filed in Japan on Feb. 3, 2021 The entire disclosures of all of the above applications are incorporated herein by reference.

TECHNICAL FIELD

The present disclosure relates to a processing technique for performing processing related to driving of a host moving object.

BACKGROUND

Conventionally, driving control related to a navigation operation of a host vehicle is planned according to detection information related to internal and external environments of the host vehicle.

SUMMARY

The present disclosure provides a processing device, processing method, or a processing program for performing a process related to driving of a host moving object. The host moving object is capable of communicating with a remote center. The processing device includes a processor configured to: monitor a safety envelope violation, which is a violation of a safety envelope in which safety of intended functionality is set in compliance with a driving policy, in the host moving object in manual driving; in response to determining that the safety envelope violation is occurred, generate scenario information, which represents a scenario of the safety envelope violation, and transmit the scenario information to the remote center; and acquire feedback information from the remote center, the feedback information being fed back based on the scenario information.

BRIEF DESCRIPTION OF DRAWINGS

Objects, features and advantages of the present disclosure will become apparent from the following detailed description made with reference to the accompanying drawings.

FIG. 1 is a description table illustrating descriptions of terms in the present disclosure.

FIG. 2 is a description table illustrating descriptions of terms in the present disclosure.

FIG. 3 is a description table illustrating descriptions of terms in the present disclosure.

FIG. 4 is a description table illustrating definitions of terms in the present disclosure.

FIG. 5 is a description table illustrating definitions of terms in the present disclosure.

FIG. 6 is a block diagram illustrating a processing system of a first embodiment.

FIG. 10 is a schematic diagram illustrating a lane structure example of the first embodiment.

FIG. 12 is a description table describing the processing method of the first embodiment.

DETAILED DESCRIPTION

Figure 7:
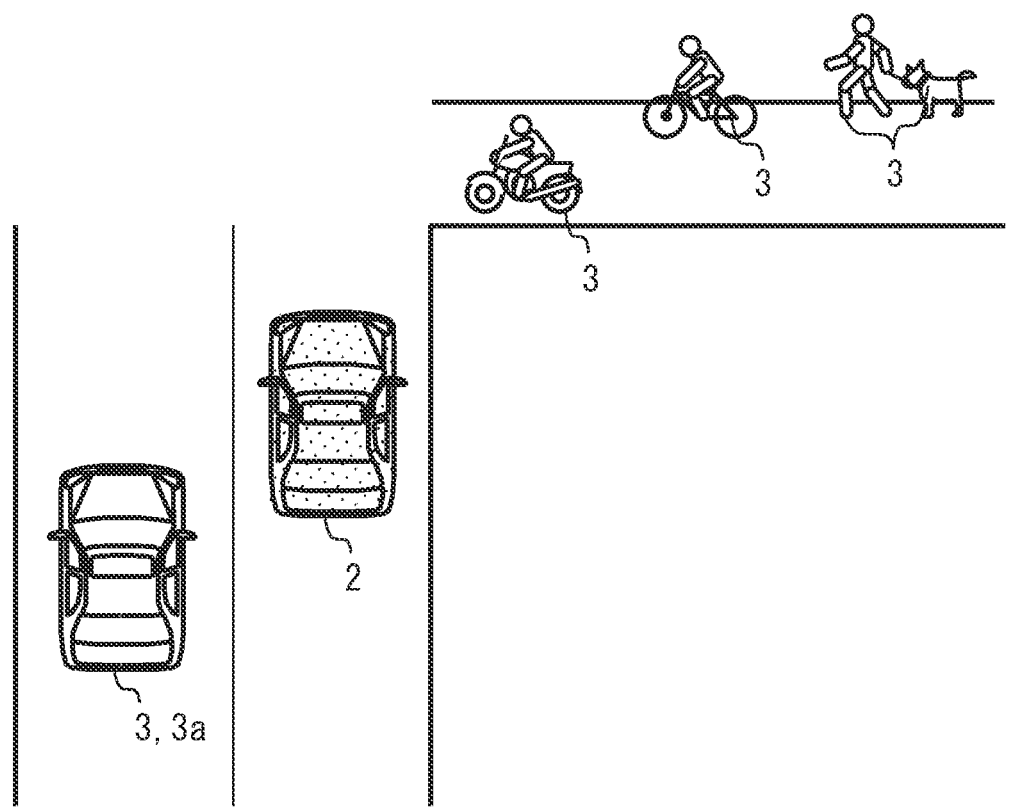
FIG. 7 is a schematic diagram illustrating a traveling environment of a host vehicle to which the first embodiment is applied.

Before describing the present disclosure, a related art will be described. In a technique disclosed in JP 6708793 B2, driving control related to a navigation operation of a host vehicle is planned according to detection information related to internal and external environments of the host vehicle. Therefore, when it is determined that there is potential accident liability based on a safety model following a driving policy and the detection information, a constraint/restriction is applied to the driving control. Thus, it is difficult to assume safety improvement in manual driving.

According to a first aspect of the present disclosure, a processing device, which performs a process related to driving of a host moving object, is provided. The host moving object is capable of communicating with a remote center. The processing device includes a processor configured to: monitor a safety envelope violation, which is a violation of a safety envelope in which safety of intended functionality is set in compliance with a driving policy, in the host moving object in manual driving; in response to determining that the safety envelope violation is occurred, generate scenario information, which represents a scenario of the safety envelope violation, and transmit the scenario information to the remote center; and acquire feedback information from the remote center, the feedback information being fed back based on the scenario information.

According to a second aspect of the present disclosure, a processing method executed by a processor for performing a process related to driving of a host moving object is provided. The host moving object is capable of communicating with a remote center. The processing method includes: monitoring a safety envelope violation, which is a violation of a safety envelope in which safety of the intended functionality is set in compliance with a driving policy, in the host moving object in manual driving; in response to determining that the safety envelope violation is occurred, generating scenario information, which represents a scenario of the safety envelope violation, and transmitting the scenario information to the remote center; and acquiring feedback information from the remote center, the feedback information being fed back based on the scenario information.

According to a third aspect of the present disclosure, a processing program stored in a storage medium is provided. The processing program includes instructions, and when instructions are executed by a processor, the program performs a process related to driving of a host moving object. The host moving object is capable of communicating with a remote center. The instructions includes: monitoring a safety envelope violation, which is a violation of a safety envelope in which safety of the intended functionality is set in compliance with a driving policy, in the host moving object in manual driving; in response to determining that the safety envelope violation is occurred, generating scenario information, which represents a scenario of the safety envelope violation, and transmitting the scenario information to the remote center; and acquiring feedback information from the remote center, the feedback information being fed back based on the scenario information.

According to a fourth aspect of the present disclosure, a processing device, which performs a process related to driving of a host moving object in a remote center, is provided. The remote center is capable of communicating with the host moving object. The processing device includes a processor configured to: acquire scenario information from the host moving object in manual driving, the scenario information representing a scenario of a safety envelope violation, the safety envelope violation being a violation of a safety envelope in which safety of the intended functionality is set in compliance with a driving policy; and generate feedback information based on the scenario information and transmit the feedback information to the host moving object.

According to a fifth aspect of the present disclosure, a processing method, which is executed by a processor for performing a process related to driving of a host moving object in a remote center, is provided. The remote center is capable of communicating with the host moving object. The processing method includes: acquiring scenario information from the host moving object in manual driving, the scenario information representing a scenario of a safety envelope violation, the safety envelope violation being a violation of a safety envelope in which safety of the intended functionality is set in compliance with a driving policy; and generating feedback information based on the scenario information and transmitting the feedback information to the host moving object.

According to a sixth aspect of the present disclosure, a processing program, which is stored in a storage medium and includes instructions, is provided. The instructions, when being executed by a processor, perform a process related to driving of a host moving object in a remote center. The remote center is capable of communicating with the host moving object. The instructions include acquiring scenario information from the host moving object in manual driving, the scenario information representing a scenario of a safety envelope violation, the safety envelope violation being a violation of a safety envelope in which safety of the intended functionality is set in compliance with a driving policy; and generating feedback information based on the scenario information and transmitting the feedback information to the host moving object.

According to a seventh aspect of the present disclosure, a processing system, which performs a process related to driving of a host moving object, is provided. The host moving object is capable of communicating with a remote center. The processing system includes: a first processor of the host moving object and a second processor of the remote center. The first processor is configured to: monitor a safety envelope violation, which is a violation of a safety envelope in which safety of intended functionality is set in compliance with a driving policy, in the host moving object in manual driving; and in response to determining that the safety envelope violation is occurred, generate scenario information, which represents a scenario of the safety envelope violation, and transmit the scenario information from the host moving object to the remote center. The second processor is configured to generate feedback information based on the scenario information and transmit the feedback information from the remote center to the host moving object.

According to an eighth aspect of the present disclosure, a processing method, which is executed by cooperation of a first processor of a host moving object and a second processor of a remote center, is provided. The host moving object is capable of communicating with the remote center, and the processing method performs process related to driving of the host moving object. The processing method includes: monitoring a safety envelope violation, which is a violation of a safety envelope in which safety of intended functionality is set in compliance with a driving policy, in the host moving object in manual driving; in response to determining that the safety envelope violation is occurred, generating scenario information, which represents a scenario of the safety envelope violation, and transmitting the scenario information from the host moving object to the remote center; and generating feedback information based on the scenario information and transmitting the feedback information from the remote center to the host moving object.

According to a ninth aspect of the present disclosure, a processing program, which is stored in at least one of a first storage medium of a host moving object or a second storage medium of a remote center, is provided. The host moving object is capable of communicating with the remote center. The processing program includes instructions that perform a process related to driving of the host moving object when the instructions are executed by cooperation of a first processor of the host moving object and a second processor of the remote center. The instructions includes: monitoring a safety envelope violation, which is a violation of a safety envelope in which safety of intended functionality is set in compliance with a driving policy, in the host moving object in manual driving; in response to determining that the safety envelope violation is occurred, generating scenario information, which represents a scenario of the safety envelope violation, and transmitting the scenario information from the host moving object to the remote center; and generating feedback information based on the scenario information and transmitting the feedback information from the remote center to the host moving object.

According to these first to ninth aspects, in a host moving object in manual driving, feedback information is fed back from the remote center to the host moving object, based on scenario information representing a scenario of safety envelope violation in which safety of the intended functionality is set in compliance with a driving policy. Accordingly, the host moving object can recognize the appropriate degree of the determination for the safety envelope violation based on the feedback information as a third party's determination. Therefore, it becomes possible to increase safety improvement in manual driving of the host moving object.

Hereinafter, multiple embodiments according to the present disclosure will be described with reference to the drawings. Duplicate description may be omitted by assigning the same reference numerals to the corresponding configuration elements in each embodiment. When only a part of the configuration is described in each embodiment, the configurations of the other embodiments described above can be applied to the other parts of the configuration. Not only the combinations of the configurations explicitly illustrated in the description of each embodiment, but also the configurations of multiple embodiments can be partially combined even if they are not explicitly illustrated if there is no problem in the combination in particular.

FIGS. 1 to 5 provide descriptions of terms associated with each embodiment of the present disclosure. Meanwhile, definitions of the terms are not interpreted as being limited to the descriptions illustrated in FIGS. 1 to 5, and are interpreted without departing from the gist of the present disclosure.

First Embodiment

A processing system 1 of a first embodiment illustrated in FIG. 6 performs processing related to driving of a host moving object (hereinafter, referred to as driving-related process). The host moving object as a target on which the processing system 1 performs the driving-related process is a host vehicle 2 illustrated in FIGS. 6 and 7. From the viewpoint of the host vehicle 2, the host vehicle 2 can also be said to be a subject vehicle (ego-vehicle).

In the host vehicle 2, autonomous driving is executed. The autonomous driving is classified into levels according to the degree of manual intervention by an occupant in a dynamic driving task (hereinafter, referred to as DDT). The autonomous driving may be realized through autonomous traveling control, such as conditional driving automation, altitude driving automation, or full driving automation, in which the operating system executes all DDTs. The autonomous driving may be realized in an advanced driver-assistance control, such as driving assistance or partial driving automation, in which a driver as the occupant executes some or all of the DDT. The autonomous driving may be realized by either one, combination, or switching between autonomous traveling control and advanced driver-assistance control.

Figure 8:
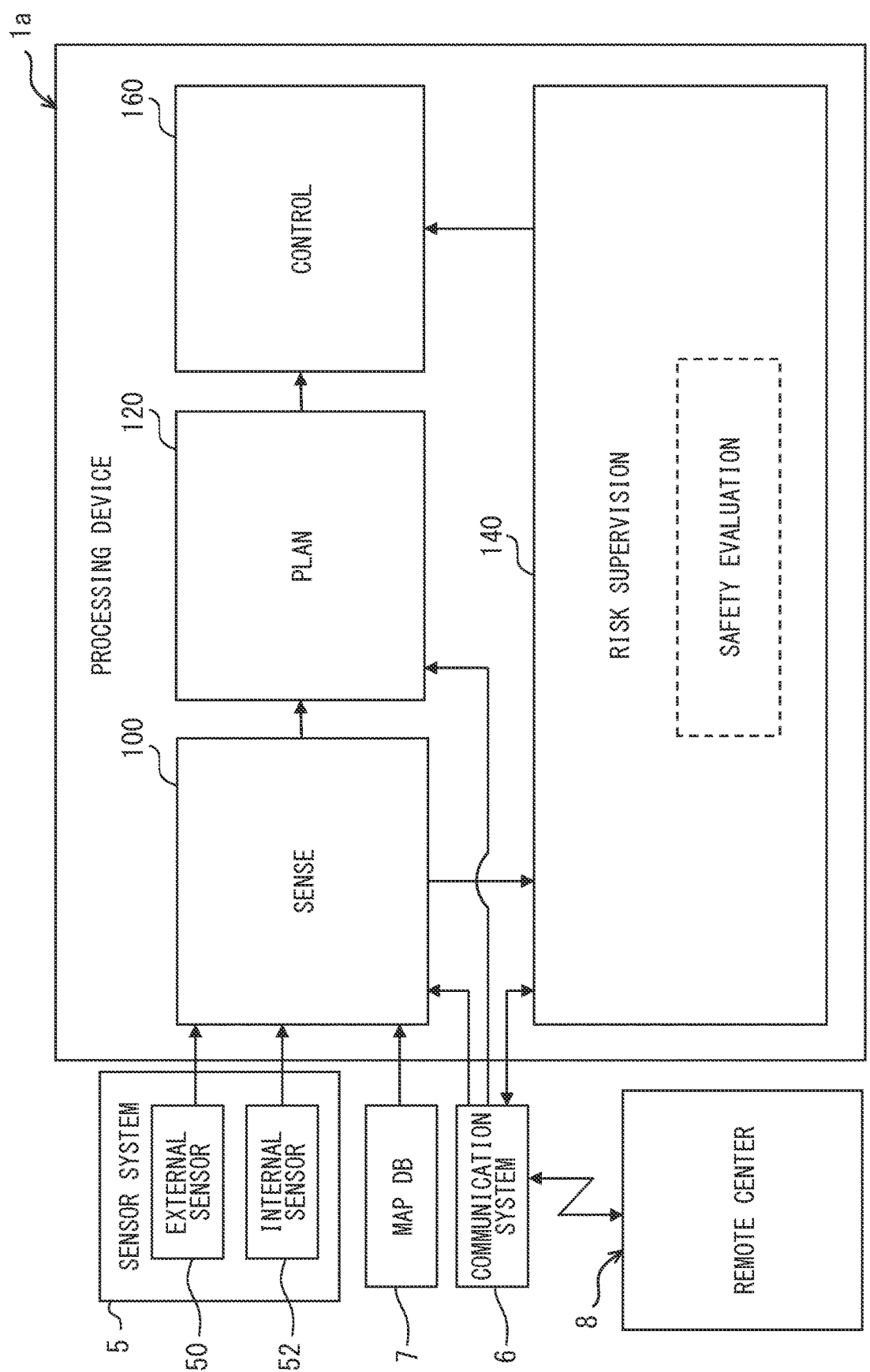
FIG. 8 is a block diagram illustrating the processing system of the first embodiment.

A sensor system 5, a communication system 6, a map DB (Data Base) 7, and an information presentation system 4 illustrated in FIGS. 6 and 8 are mounted in the host vehicle 2. The sensor system 5 acquires sensor data which is usable by the processing system 1 by detecting an outside and an inside of the host vehicle 2. For this purpose, the sensor system 5 includes an external sensor 50 and an internal sensor 52.

The external sensor 50 may detect targets existing in the outside of the host vehicle 2. The target detection type external sensor 50 is at least one type of, for example, camera, light detection and ranging/laser imaging detection and ranging (LiDAR), laser radar, millimeter wave radar, ultrasonic sonar, and the like. The external sensor 50 may detect a state of the atmosphere in the outside of the host vehicle 2. The atmosphere detection type external sensor 50 is at least one type of, for example, an outside air temperature sensor, a humidity sensor, and the like.

The internal sensor 52 may detect a specific physical quantity related to vehicle motion (hereinafter, referred to as a kinematic property) in the inside of the host vehicle 2. The physical quantity detection type internal sensor 52 is at least one type of, for example, a speed sensor, an acceleration sensor, a gyro sensor, and the like. The internal sensor 52 may detect a state of an occupant in the inside of the host vehicle 2. The occupant detection type internal sensor 52 is at least one type of, for example, an actuator sensor, a driver status monitor, a biosensor, a seating sensor, an in-vehicle device sensor, and the like. As the actuator sensor in particular, at least one type of, for example, an accelerator sensor, a brake sensor, a steering sensor, and the like, which detects an operating state of the occupant with respect to the motion actuator of the host vehicle 2, is adopted.

The communication system 6 acquires communication data which is usable by the processing system 1 by wireless communication. The communication system 6 may receive a positioning signal from an artificial satellite of a global navigation satellite system (GNSS) existing in the outside of the host vehicle 2. The positioning type communication system 6 is, for example, a GNSS receiver or the like. The communication system 6 may transmit and receive communication signals with a V2X system existing in the outside of the host vehicle 2. The V2X type communication system 6 is at least one type of, for example, a dedicated short range communications (DSRC) communication device, a cellular V2X (C-V2X) communication device, and the like. The communication system 6 may transmit and receive communication signals to and from a terminal existing in the inside of the host vehicle 2. The terminal communication type communication system 6 is at least one type of, for example, Bluetooth (registered trademark) device, Wi-Fi (registered trademark) device, infrared communication device, and the like.

Figure 9:
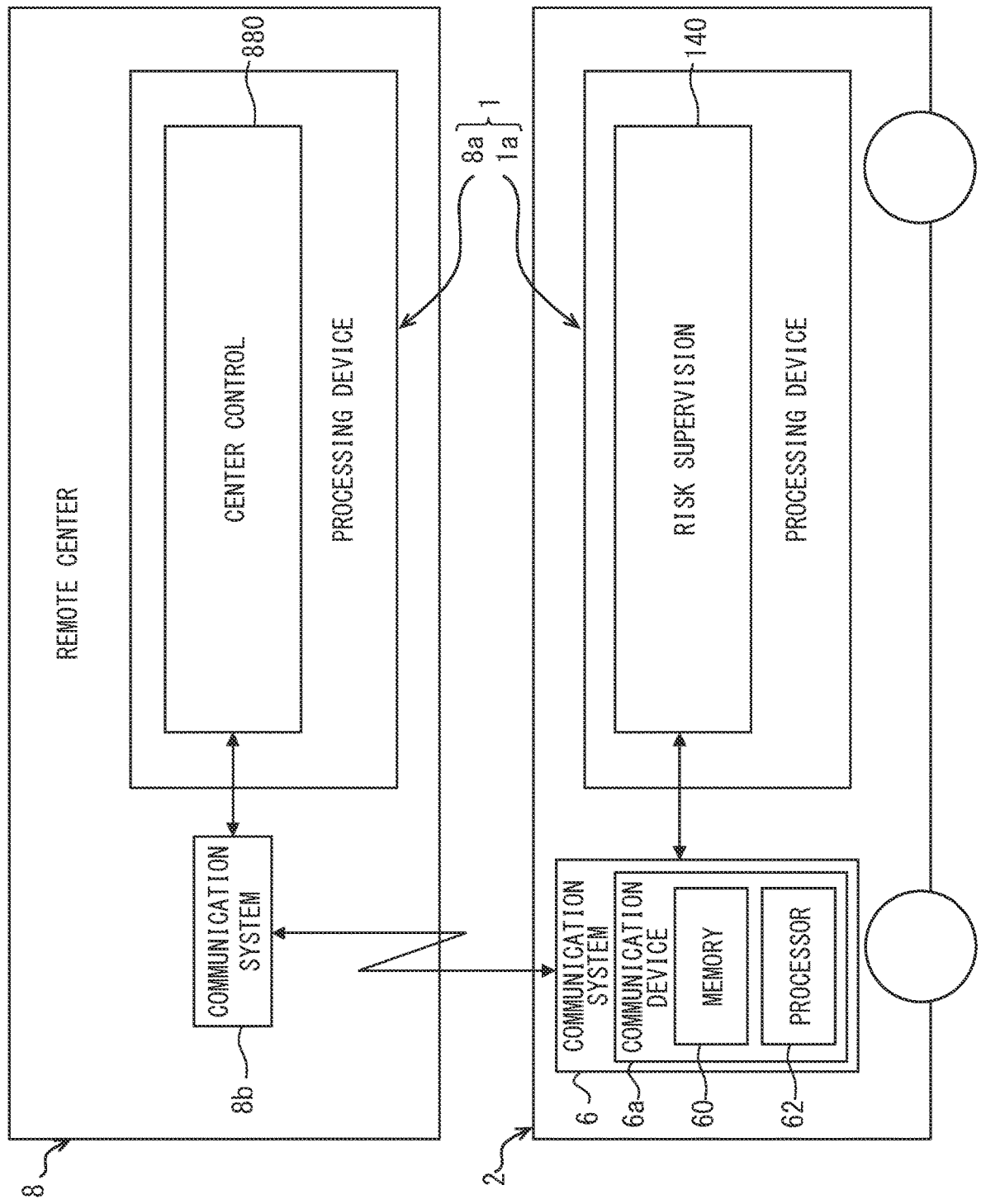
FIG. 9 is a block diagram illustrating the processing system of the first embodiment.

Such a communication system 6, as illustrated in FIG. 9, is preferably constructed mainly of at least one type of communication device 6a. In this case, the communication device 6a includes at least one dedicated computer. In this case, the dedicated computer constituting the communication device 6a has at least one memory 60 and at least one processor 62. The memory 60 and processor 62 of the communication device 6a conform to a memory 10 and a processor 12 of a processing device 1a, which will be described below.

The map DB 7 illustrated in FIGS. 6 and 8 stores map data which is usable by the processing system 1. The map DB 7 includes at least one type of non-transitory tangible storage medium of, for example, a semiconductor memory, a magnetic medium, an optical medium, and the like. The map DB 7 may be a DB of a locator for estimating a self-state amount of the host vehicle 2 including its own position. The map DB may be a DB of a navigation unit that navigates a travel path of the host vehicle 2. The map DB 7 may be constructed by a combination of multiple types of DBs.

The map DB 7 acquires and stores the latest map data through communication and the like with an external center via the V2X type communication system 6, for example. The map data is two-dimensional or three-dimensional data as a data representing a traveling environment of the host vehicle 2. Digital data of a high definition map may be adopted as the three-dimensional map data. The map data may include road data representing at least one type of, for example, positional coordinates, a shape, a road surface condition, and the like of a road structure. The map data may include, for example, marking data representing at least one type of positional coordinates, a shape, and the like of a traffic sign, a road marking, and a lane marking attached to a road. The marking data included in the map data may represent landmarks such as a traffic sign, an arrow marking, a lane marking, a stop line, a direction sign, a landmark beacon, a rectangular sign, a business sign, and a line pattern change of the road, for example. The map data may include structure data representing at least one type of positional coordinates, a shape, and the like of a building and a traffic light facing the road, for example. The marking data included in the map data may represent landmarks such as a streetlight, an edge of the road, a reflecting plate, a pole, and a back side of the traffic sign, for example.

The information presentation system 4 presents notification information to an occupant including a driver of the host vehicle 2. The information presentation system 4 includes a visual presentation unit, an auditory presentation unit, and a cutaneous sensation presentation unit. The visual presentation unit presents notification information by stimulating a visual sense of the occupant. The visual presentation unit is at least one type of, for example, a head-up display (HUD), a multi function display (MFD), a combination meter, a navigation unit, a light emitting unit, and the like. The auditory presentation unit presents notification information by stimulating an auditory sense of the occupant. The auditory presentation unit is at least one type of, for example, a speaker, buzzer, vibration unit, and the like. The cutaneous sensation presentation unit presents notification information by stimulating a cutaneous sensations of the occupant. The cutaneous sensation stimulated by the cutaneous sensation presentation unit includes at least one type of, for example, touch, temperature, wind, and the like. The cutaneous sensation presentation unit is at least one type of, for example, a steering wheel vibration unit, a driver's seat vibration unit, a steering wheel reaction force unit, an accelerator pedal reaction force unit, a brake pedal reaction force unit, an air conditioning unit, and the like.

As illustrated in FIG. 6, the processing system 1 includes the processing device 1a of the host vehicle 2 and a processing device 8a of the remote center 8. The processing system 1 may include at least the communication system 6 among the sensor system 5, the communication system 6, the map DB 7, and the information presentation system 4 in the host vehicle 2. The processing device 1a is connected to the sensor system 5, the communication system 6, the map DB 7, and the information presentation system 4 via at least one type of, for example, a local area network (LAN), a wire harness, an internal bus, a wireless communication line, and the like. The processing device 1a includes at least one dedicated computer. The dedicated computer constituting the processing device 1a may be an integrated electronic control unit (integrated ECU) that integrates driving control of the host vehicle 2. The dedicated computer constituting the processing device 1a may be a determination ECU that determines a DDT in the driving control of the host vehicle 2. The dedicated computer constituting the processing device 1a may be a monitoring ECU that monitors the driving control of the host vehicle 2. The dedicated computer constituting the processing device 1a may be an evaluation ECU that evaluates the driving control of the host vehicle 2.

The dedicated computer constituting the processing device 1a may be a navigation ECU that navigates the travel path of the host vehicle 2. The dedicated computer constituting the processing device 1a may be a locator ECU that estimates a self-state amount including a self-position of the host vehicle 2. The dedicated computer constituting the processing device 1a may be an actuator ECU that controls a motion actuator of the host vehicle 2. The dedicated computer constituting the processing device 1a may be a human machine interface (HMI) control unit (HCU) that controls the information presentation in the host vehicle 2. The dedicated computer constituting the processing device 1a may be at least one external computer that constructs a mobile terminal or the like that can communicate via the communication system 6, for example.

The dedicated computer constituting the processing device 1a has at least one memory 10 and at least one processor 12. The memory 10 is at least one type of non-transitory tangible storage medium, such as a semiconductor memory, a magnetic medium, and an optical medium, for non-transitory storage of computer readable programs, data, and the like, for example. The processor 12 includes, as a core, at least one type of, for example, a central processing unit (CPU), a graphics processing unit (GPU), a reduced instruction set computer (RISC)-CPU, and the like.

The processor 12 executes multiple instructions included in a processing program stored as software in the memory 10. Accordingly, the processing device 1a constructs functional blocks for performing a driving-related process of the host vehicle 2. In this manner, in the processing device 1a, the processing program stored in the memory 10 causes the processor 12 to execute multiple instructions to perform the driving-related process of the host vehicle 2, thereby constructing the functional blocks. The functional blocks constructed by the processing device 1a include a sensing block 100, a planning block 120, a risk monitoring block 140 (RISK SUPERVISION), and a control block 160, as illustrated in FIG. 8.

The sensing block 100 acquires sensor data from the external sensor 50 and internal sensor 52 of the sensor system 5. The sensing block 100 acquires communication data from the communication system 6. The sensing block 100 acquires map data from the map DB 7. The sensing block 100 detects internal and external environments of the host vehicle 2 by fusing these acquired data as inputs. By detecting the internal and external environment, the sensing block 100 generates detection information to be given to the planning block 120 and the risk monitoring block 140 at a latter stage. In this manner, in generating the detection information, the sensing block 100 acquires data from the sensor system 5 and the communication system 6, recognizes or understands the meaning of the acquired data, and grasps a general situation including an outside situation of the host vehicle 2, its own position within the external situation, and an internal situation of the host vehicle 2 by integrating the acquired data. The sensing block 100 may provide substantially the same detection information to the planning block 120 and the risk monitoring block 140. The sensing block 100 may provide different detection information to the planning block 120 and the risk monitoring block 140.

The detection information generated by the sensing block 100 describes a state detected for each scene or scenario in the traveling environment of the host vehicle 2. The sensing block 100 may detect an object, including a road user, an obstacle, and a structure, in the outside of the host vehicle 2 to generate detection information for the object. The object detection information may represent at least one type of, for example, a distance to the object, a relative speed of the object, a relative acceleration of the object, an estimated state based on tracking detection of the object, and the like. The object detection information may further represent a type recognized or specified from a state of the detected object. The sensing block 100 may generate the detection information for a roadway on which the host vehicle 2 is traveling now and in the future by detecting the roadway. The roadway detection information may represent at least one type of, for example, state, among a road surface, a lane, a roadside, a free space, and the like.

The sensing block 100 may generate the detection information of a self-state amount by localization that presumptively detects the self-state amount including a self-position of the host vehicle 2. The sensing block 100 may generate update information of the map data regarding the roadway of the host vehicle 2 at the same time as the detection information of the self-state amount, and feed back the update information to the map DB 7. The sensing block 100 may detect a sign associated with the roadway of the host vehicle 2 to generate the detection information for the sign. The sign detection information may represent a state of at least one type of, for example, a sign, a lane marking, a traffic light, and the like. The sign detection information may also represent a traffic rule which is recognized or specified from the state of the sign. The sensing block 100 may generate the detection information of a climate situation by detecting the climate situation for each scene or scenario in which the host vehicle 2 travels. The sensing block 100 may generate the detection information for a time by detecting the time for each traveling scene or scenario of the host vehicle 2.

The planning block 120 acquires the detection information from the sensing block 100. The planning block 120 plans driving control of the host vehicle 2 according to the acquired detection information. In planning the driving control, a control command for a navigation operation and a driver assistance operation of the host vehicle 2 is generated. That is, the planning block 120 realizes a DDT function that generates the control command as a motion control request for the host vehicle 2. The control command generated by planning block 120 may include a control parameter of controlling a motion actuator of the host vehicle 2. The motion actuator as a target to which the control command is output includes at least one type of, for example, an internal combustion engine, an electric motor, a power train in which these are combined, a brake device, a steering device, and the like.

The planning block 120 may use a safety model described according to a driving policy and its safety to generate the control command to comply with the driving policy. The driving policy followed by the safety model is defined, for example, based on a vehicle-level safety strategy that ensures safety of the intended functionality (hereinafter, referred to as SOTIF). In other words, the safety model is described by following driving policies that implement vehicle-level safety strategies and by modeling the SOTIF. The planning block 120 may train the safety model with a machine learning algorithm that back-propagates driving control results to the safety model. As the safety model to be trained, at least one type of learning model may be used among deep learning by a neural network such as deep neural network (DNN), reinforcement learning, and the like, for example. The safety model may be defined here as safety-related models that represent safety-related aspects of driving action based on assumptions about the reasonably foreseeable action of other road users, and may be defined in a model constituting a part of the safety-related model. Such a safety model is preferably constructed in at least one type of, for example, a mathematical model that formulates vehicle-level safety, a computer program that executes processing according to the mathematical model, and the like.

The planning block 120 may plan a path through which the host vehicle 2 travels in the future by driving control, prior to generating the control command. The path planning may be executed by a calculation of, for example, by simulation and the like, to navigate the host vehicle 2 based on the detection information. That is, the planning block 120 may realize the DDT function of planning a path as a tactical action of the host vehicle 2. The planning block 120 may also plan an appropriate track based on the acquired detection information for the host vehicle 2 following the planned path, prior to generating the control command. That is, the planning block 120 may realize a DDT function that plans the track of host vehicle 2. The track planned by the planning block 120 may define at least one type of, for example, a traveling position, a speed, an acceleration, a yaw rate, and the like, in time series, as a kinematic property related to the host vehicle 2. The time series track plan constructs a scenario of a future travel by navigating the host vehicle 2. The planning block 120 may generate the track by planning using a safety model. In this case, a cost function that gives a cost to the generated track may be calculated, and the safety model may be trained by a machine learning algorithm based on the calculation result.

The planning block 120 may plan adjustment of levels of driving automation in the host vehicle 2 according to the acquired detection information. The adjusting of the levels of driving automation may also include takeover between autonomous driving and manual driving. The takeover between autonomous driving and manual driving may be realized in a scenario associated with entering or leaving an operational design domain (hereinafter, referred to as ODD) in which autonomous driving is executed, based on a setting of the ODD. In the leaving scenario from the ODD, that is, a takeover scenario from autonomous driving to manual driving, an unreasonable situation in which an unreasonable risk is determined to exist based on, for example, a safety model and the like can be cited as a use case. In this use case, the planning block 120 may plan a DDT fallback for a driver who will be a fallback ready user to give the host vehicle 2a minimal risk maneuver to transition the host vehicle 2 to a minimal risk condition.

The adjusting of the levels of driving automation may include degradation traveling of the host vehicle 2. In the degradation traveling scenario, an unreasonable situation determined, for example, based on a safety model and the like when there is an unreasonable risk by a takeover to manual driving, is a use case. In this use case, the planning block 120 may plan a DDT fallback to transition the host vehicle 2 to a minimal risk condition through autonomous traveling and autonomous stopping. The DDT fallback for transitioning the host vehicle 2 to the minimal risk condition may be not only realized in the adjustment to lower the levels of driving automation, but also the adjustment to maintain the levels of driving automation with degradation traveling, for example, a minimum risk maneuver (MRM) and the like. The DDT fallback for transitioning the host vehicle 2 to the minimal risk condition may enhance prominence of the transition situation by at least one type of, for example, lighting, horns, signals, gestures, and the like.

The risk monitoring block 140 acquires the detection information from the sensing block 100. The risk monitoring block 140 monitors a risk between the host vehicle 2 and other target moving objects 3 (see FIG. 7) for each scene or scenario based on the acquired detection information. The risk monitoring block 140 executes risk monitoring in time series based on the detection information to ensure the SOTIF of the host vehicle 2 to the target moving object 3. The target moving object 3 assumed in risk monitoring is another road user existing in the traveling environment of the host vehicle 2. The target moving object 3 includes a non vulnerable road user such as an automobile, a truck, a motorcycle, and a bicycle and a vulnerable road user such as a pedestrian, for example. The target moving object 3 may further include an animal.

The risk monitoring block 140 sets a safety envelope that ensures the SOTIF in the host vehicle 2, for example, based on a vehicle-level safety strategy, and the like, based on the acquired detection information for each scene or scenario. The risk monitoring block 140 may set the safety envelope between the host vehicle 2 and the target moving object 3 using a safety model that follows the driving policy described above. The safety model used to set the safety envelope may be designed to avoid potential accident liability resulting from unreasonable risk or road user misuse, subject to accident liability rules. In other words, the safety model may be designed such that the host vehicle 2 complies with accident liability rules according to a driving policy. Such a safety model includes, for example, a responsibility sensitive safety model as disclosed in JP 6708793 B2, and the like.

The safety envelope may be defined herein as a set of limits and conditions under which a system is designed to operate as a target of a constraint/restriction or control to maintain an operation within an acceptable level of risk. Such a safety envelope can be set as a physics-based margin around each road user, including the host vehicle 2 and the target moving object 3, with a margin relating to at least one kinematic property, such as a distance, a speed, an acceleration, and the like, for example. For example, in setting of the safety envelope, a safety distance may be assumed from a profile relating to at least one kinematic property, based on a safety model for the host vehicle 2 and the target moving object 3 that are assumed to follow the driving policy. The safety distance defines a physics-based marginal boundary around the host vehicle 2 for a predicted motion of the target moving object 3. The safety distance may be assumed, taking into account a response time until a proper response is executed by the road user. The safety distance may be assumed to comply with accident liability rules. For example, in a scene or scenario in which a lane structure such as a lane exists, a safety distance for avoiding a risk of rear-end collision and head-on collision of the host vehicle 2 in a longitudinal direction and a safety distance for avoiding a risk of side-surface collision of the host vehicle 2 in the lateral direction may be calculated. On the other hand, in a scene or scenario in which there is no lane structure, a safety distance for avoiding a risk of track collision in any direction of the host vehicle 2 may be calculated.

The risk monitoring block 140 may specify a situation for each scene or scenario of relative motions between the host vehicle 2 and the target moving object 3, prior to a setting of the safety envelope described above. For example, in a scene or scenario in which a lane structure such as a lane exists, a situation in which a risk of rear-end collision and head-on collision is assumed in the longitudinal direction and a situation in which a risk of side-surface collision is assumed in the lateral direction may be specified. In the specifying of these situations in the longitudinal direction and the lateral direction, a state amount relating to the host vehicle 2 and the target moving object 3 may be converted into a coordinate system in which a straight lane is premised. On the other hand, in a scene or scenario in which there is no lane structure, a situation in which there is a risk of track collision of the host vehicle 2 in any direction may be specified. At least a part of the situation-specific function described above may be executed by the sensing block 100, and a situation-specific result may be given to the risk monitoring block 140 as the detection information.

The risk monitoring block 140 executes safety determination (SAFETY EVALUATION) between the host vehicle 2 and the target moving object 3, based on the set safety envelope and the acquired detection information for each scene or scenario. That is, the risk monitoring block 140 tests whether a traveling scene or scenario interpreted based on the detection information between the host vehicle 2 and the target moving object 3 has a safety envelope violation that is a violation of the safety envelope to realize the safety determination. When a safety distance is assumed in a setting of the safety envelope, it may be determined that there is no violation of the safety envelope when an actual distance between the host vehicle 2 and the target moving object 3 exceeds the safety distance. On the other hand, when the actual distance between the host vehicle 2 and the target moving object 3 becomes equal to or less than the safety distance, it may be determined that the safety envelope is violated.

The risk monitoring block 140 may calculate a reasonable scenario with a simulation to give the host vehicle 2 an appropriate action to take a proper response when it is determined that the safety envelope is violated. In the reasonable scenario simulation, by estimating state transitions between the host vehicle 2 and the target moving object 3, an action to be taken for each transition state may be set as a constraint/restriction (to be described in detail below) on the host vehicle 2. In a setting of the action, a limit value assumed for at least one type of kinematic property given to the host vehicle 2 may be calculated to limit the kinematic property as the constraint/restriction on the host vehicle 2.

The risk monitoring block 140 may directly calculate the limit value for compliance with accident liability rules, from a profile relating to at least one type of kinematic property, based on the safety model for the host vehicle 2 and target moving object 3 assumed to comply with a driving policy. It can be said that the direct calculation of the limit value is itself a setting of the safety envelope and a setting of the constraint/restriction on driving control. Therefore, when an actual value that is safer than the limit value is detected, it may be determined that the safety envelope is not violated. On the other hand, when an actual value outside the limit value is detected, it may be determined that the safety envelope is violated.

The risk monitoring block 140 may store at least one type of, for example, evidence information among detection information used to set the safety envelope, determination information representing a determination result of the safety envelope, detection information that influenced the determination result, simulated scenario, and the like in the memory 10. The memory 10 storing the evidence information may be mounted in the host vehicle 2, or may be installed at an external center and the like outside the host vehicle 2, for example, depending on a type of dedicated computer constituting the processing device 1a. The evidence information may be stored in an unencrypted state, or in an encrypted or hashed state. The storing of the evidence information is executed at least when it is determined that the safety envelope is violated. Of course, the storing of the evidence information may be not executed even when it is determined that there is no violation of the safety envelope. The evidence information when it is determined that there is no violation of the safety envelope can be used as a lagging measure at a time of storing, and can also be used as a leading measure in the future.

The control block 160 acquires the control command from the planning block 120. The control block 160 acquires determination information regarding the safety envelope from the risk monitoring block 140. That is, the control block 160 realizes a DDT function that controls the movement of the host vehicle 2. The control block 160 executes the planned driving control of the host vehicle 2 in accordance with the control command when the control block 160 acquires the determination information in that the safety envelope is not violated.

On the other hand, when the control block 160 acquires the determination information indicating that the safety envelope is violated, the control block 160 imposes a constraint/restriction on the planned driving control of the host vehicle 2 according to the driving policy based on the determination information. A constraint/restriction on the driving control may be a functional restriction. A constraint/restriction on the driving control may be degraded constraint. The constraint/restriction on the driving control may be a constraint/restriction different from these. The constraint/restriction is applied to the driving control by constraining the control command. When a reasonable scenario is simulated by the risk monitoring block 140, the control block 160 may limit the control command according to the scenario. At this time, when a limit value is set for the kinematic property of the host vehicle 2, a control parameter of a motion actuator included in the control command may be corrected based on the limit value.

Among the target moving objects 3, the processing device 1a, the sensor system 5, the communication system 6, the map DB 7, and the information presentation system 4, in accordance with the host vehicle 2 may be mounted in a target vehicle 3a illustrated in FIG. 7. In this case, from the viewpoint of the remote center 8, it can be considered that the host vehicle 2 corresponds to a "first host moving object", and the target vehicle 3a, which is another host vehicle 2, corresponds to a "second host moving object". In this case, the processing system 1 may be constructed including at least the communication system 6, among the sensor system 5, the communication system 6, the map DB 7, and the information presentation system 4 in the target vehicle 3a.

As illustrated in FIG. 6, the remote center 8 is constructed mainly with at least one type of, for example, a cloud server, an edge server, and the like, which includes a communication system 8b together with the processing device 8a. The communication system 8b forms at least a part of a V2X system that can communicate with the communication system 6 of the host vehicle 2. The communication system 8b may be able to communicate with the communication system 6 when mounted in the target vehicle 3a. The processing device 8a is connected to the communication system 8b via at least one type of a wired communication line and a wireless communication line. The processing device 8a includes at least one dedicated computer. In the processing device 8a, an output control process such as displaying information on a road user including the host vehicle 2, which can be communicated through the communication system 8b, to an operator of the remote center 8, for example, may be executed. In the processing device 8a, an input control process such as receiving information fed back to the communicable road user from the operator of the remote center 8, for example, may be executed.

The dedicated computer constituting the processing device 8a has at least one memory 80 and at least one processor 82. The memory 80 and processor 82 of the processing device 8a conform to the memory 10 and processor 12 of the processing device 1a. The processor 82 executes multiple instructions included in a processing program stored as software in the memory 80. Accordingly, the processing device 8a constructs functional blocks for performing the driving-related process of the host vehicle 2 in cooperation with the processing device 1a. The processing device 8a may construct functional blocks for performing the driving-related process of the target vehicle 3a in cooperation with the processing device 1a when mounted in the target vehicle 3a.

In this manner, in the processing device 8a, the processing program stored in the memory 80 causes the processor 82 to execute multiple instructions to perform the driving-related process of the host vehicle 2 or the like, thereby constructing the functional blocks. From the viewpoint of the processing system 1 as a whole, it can be considered that the processing programs stored in the memory 10 and the memory 80 respectively cause the processors 12 and 82 to cooperatively execute the instructions, thereby constructing the functional blocks of each of the devices 1a and 8a. At this time, in the processing system 1 constructed including the communication device 6a constituting the communication system 6 in the host vehicle 2 or the like, the processing programs respectively stored in the memories 10, 80, and 60 may cause the processors 12, 62, and 82 to cooperatively execute the instructions.

On the other hand, from the viewpoint of the processing system 1 as a whole, a processing program stored in one of the memories 10 and 80 (in particular, the memory 80 of a cloud server) may cause the processors 12 and 82 to collaboratively execute the instructions for constructing the functional blocks of each of the devices 1a and 8a. At this time, in the processing system 1 when constructed including the communication device 6a constituting the communication system 6 in the host vehicle 2 or the like, the processing program stored in one of the memories 10 and 80 and the processing program stored in the memory 60 may cause the processors 12, 62, and 82 to cooperatively execute the instructions.

In any of the above cases, the processor 12 and memory 10 of the host vehicle 2 or the like correspond to a "first processor" and a "first storage medium", respectively, and the processor 82 and memory 80 of the remote center 8 correspond to a "second processor" and a "second storage medium", respectively.

As illustrated in FIG. 9, the functional blocks constructed by the processing device 8a include a center management block 880. The center management block 880 manages a traffic environment in which there are multiple road users including the host vehicle 2. The center management block 880 may acquire scenario information on a traveling scenario of a communicable road user in real time through the communication system 8b, and use the scenario information for managing the traffic environment. The center management block 880 may transmit feedback information for feedback to the communicable road user through the communication system 8b in real time or after the fact to manage the traffic environment based on the scenario information. FIG. 9 illustrates an example in which between the center management block 880 constructed by the processing device 8a of the remote center 8 and the risk monitoring block 140 constructed by the processing device 1a of the host vehicle 2, necessary information is transmitted and received via the communication systems 8b and 6.

Hereinafter, details of the first embodiment will be described.

In the first embodiment as illustrated in FIG. 10, a lane structure Ls with separated lanes is assumed. The lane structure Ls regulates movement of the host vehicle 2 and the target moving object 3 with a direction in which the lane extends as the longitudinal direction. The lane structure Ls regulates the movement of the host vehicle 2 and the target moving object 3 with a width direction or a direction in which the lanes line up as the lateral direction.

A driving policy between the host vehicle 2 and the target moving object 3 in the lane structure Ls is defined by the following (1) to (5) and the like, when the target moving object 3 is the target vehicle 3a, for example. A front direction with the host vehicle 2 as a reference means, for example, a traveling direction of the host vehicle 2 on a turning circle at a current steering angle, a traveling direction of a straight line passing through a center of gravity of the vehicle perpendicular to a vehicle axle of the host vehicle 2, a traveling direction on an axis of focus of expansion (FOE) of the same camera from a front camera module in the sensor system 5 of the host vehicle 2, or the like.

(1) Do not hit a vehicle traveling in front from behind. (Do not hit a car in front of you)

(2) Do not cut in recklessly between other vehicles. (Do not cut in recklessly)

(3) Yield to another vehicle even when own vehicle has a priority. (Right of way is given, not taken)

(4) Be cautious in areas with limited visibility.

(5) If the host vehicle can avoid a crash without causing another one, take a reasonable action for that purpose. (If you can avoid a crash without causing another one, you must)

With a model following a driving policy, a safety model by modeling by the SOTIF assumes an action of a road user that does not lead to an unreasonable situation as an appropriate and reasonable action to be taken. The unreasonable situation between the host vehicle 2 and the target moving object 3 in the lane structure Ls includes head-on collision, rear-end collision, and side-surface collision. The reasonable action in the head-on collision includes, for example, a brake or the like of a vehicle traveling in an opposite direction when the target moving object 3 with respect to the host vehicle 2 is the target vehicle 3a. The reasonable action in the rear-end collision includes, for example, that a vehicle traveling in front does not brake more than a certain amount suddenly, a vehicle traveling behind avoids the rear-end collision, and the like when the target moving object 3 with respect to the host vehicle 2 is the target vehicle 3a. The reasonable action in the side-surface collision includes, for example, that vehicles running side by side steer in directions in which the vehicles are away from each other and the like when the target moving object 3 with respect to the host vehicle 2 is the target vehicle 3a. When assuming the reasonable action, a state amount related to the host vehicle 2 and the target moving object 3 is converted into an orthogonal coordinate system that defines the longitudinal direction and the lateral direction, assuming the straight and planar shape lane structure Ls, in any of the lane structure Ls having curved lanes or the lane structure Ls having high and low lanes.

The safety model is preferably designed according to accident liability rules, which assume that a moving object without a reasonable action is responsible for an accident. The safety model used to monitor a risk between the host vehicle 2 and the target moving object 3 under the accident liability rule in the lane structure Ls sets a safety envelope for the host vehicle 2 to the host vehicle 2 such that the reasonable action avoids potential accident liability. Therefore, the risk monitoring block 140 in a situation in which the processing device 1a as a whole is normal compares an actual distance between the host vehicle 2 and the target moving object 3 with a safety distance based on the safety model for each traveling scene or scenario to determine whether the safety envelope is violated. When the safety envelope is violated, the risk monitoring block 140 simulates a scenario for giving a reasonable action to the host vehicle 2. With the simulation, the risk monitoring block 140 sets, as a constraint/restriction on the driving control in the control block 160, a limit value relating to at least one of a speed, an acceleration, and the like, for example.

Figure 11:
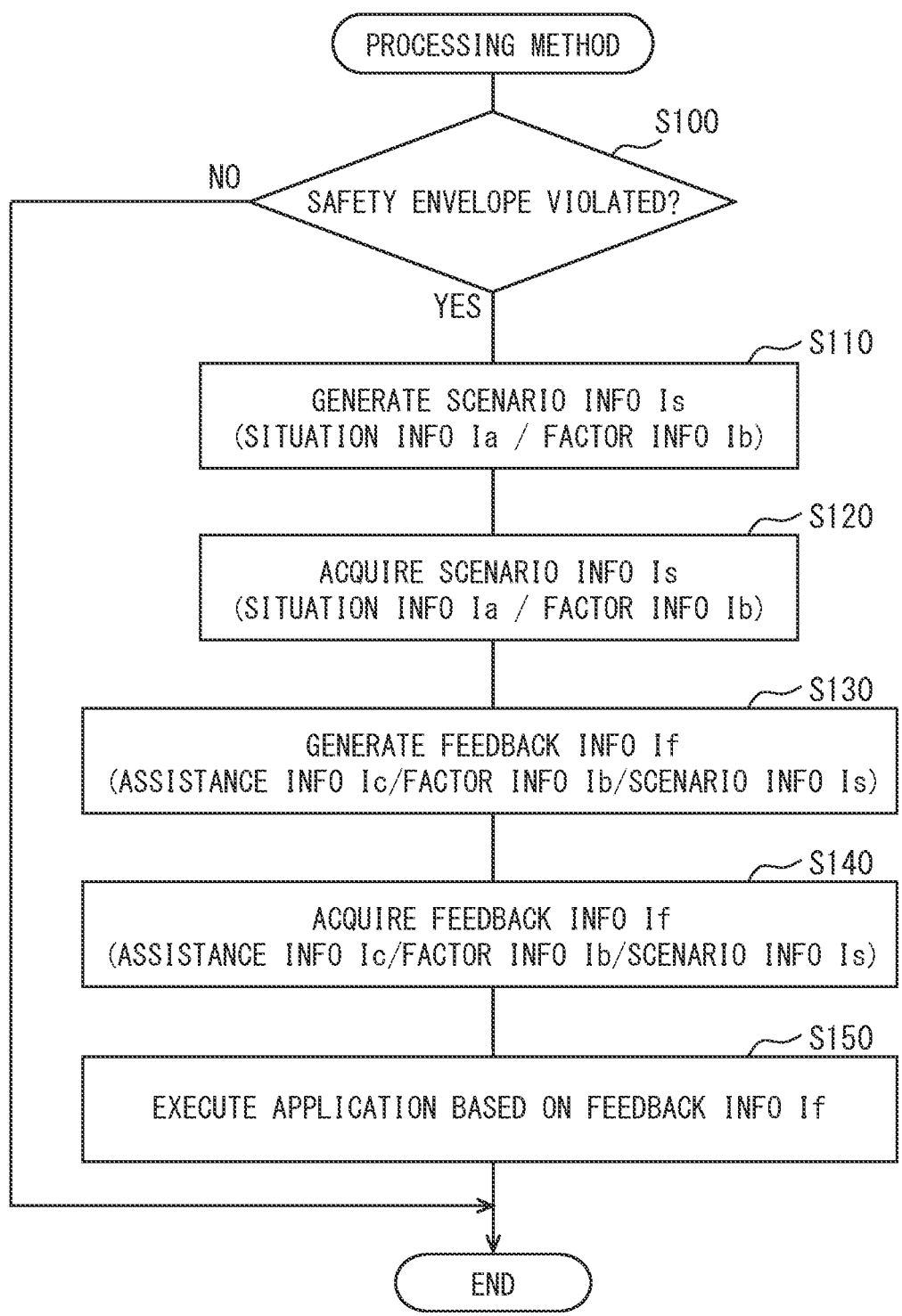
FIG. 11 is a flowchart illustrating a processing method of the first embodiment.

In the first embodiment, a processing method of performing a driving-related process according to a flowchart illustrated in FIG. 11 is executed jointly by multiple functional blocks. The processing method of the first embodiment is executed repeatedly in both manual driving and autonomous driving as planned by the planning block 120, or regardless of intervention of one of them over the other. Each "S" in the processing method herein represents multiple steps executed by multiple instructions included in a processing program stored in at least one of the memories 10 and 80, respectively. When the processing system 1 including the communication device 6a constituting the communication system 6 is constructed in the host vehicle 2 or the like, each "S" of the processing method may mean each of multiple steps executed by multiple instructions included in a processing program stored in the memory 60, in addition to the processing program stored in at least one of the memories 10 and 80.

In S100 of the processing method, the risk monitoring block 140 monitors a safety envelope violation with respect to a safety envelope in which the SOTIF is set according to a driving policy, in the host vehicle 2 in one of manual driving and autonomous driving, selected by the planning block 120. In S100, when the risk monitoring block 140 determines that the safety envelope violation has not occurred (for example, no safety envelope violation), the current flow of the processing method is ended. On the other hand, when the risk monitoring block 140 determines that the safety envelope violation has occurred (for example, safety envelope violation exists) in S100, the processing method is shifted to S110.

In S110 of the processing method, the risk monitoring block 140 generates scenario information Is representing a violation scenario, which is a scenario of the safety envelope violation occurring in the host vehicle 2 of the selected manual driving or autonomous driving, to transmit the scenario information Is from the host vehicle 2 to the remote center 8 through the communication system 6. The scenario information Is may be information at an occurrence time of the safety envelope violation. The scenario information Is may include information before and after a timing when the safety envelope violation has occurred, from the viewpoint of an event data recorder (EDR) and the like, for example. The scenario information Is includes situation information Ia which is generated based on detection information by the sensing block 100, and represents a situation of the safety envelope violation.

The situation information Ia may represent at least one type actual value of, for example, a speed, acceleration and deceleration, and the like of the host vehicle 2 illustrated in FIG. 12, as a kinematic property of the safety envelope violation, out of a limit value by a constraint/restriction setting of the risk monitoring block 140. As the kinematic property represented by the situation information Ia, a difference between the longitudinal direction and the lateral direction in the lane structure Ls is also taken into consideration. The situation information Ia may represent, as a state of the host vehicle 2 in the violation scene or scenario, at least one type of, for example, self-state amount including a position (that is, localization estimation value), a vector, an accumulated travel distance, an accumulated travel time, a load weight, a tire state including abrasion, a maintenance state, an operation state of the driving actuator, a vehicle type, and the like. The situation information Ia may include an image or a video captured by a camera as the external sensor 50 in the host vehicle 2.

The situation information Ia may represent at least one type of, for example, a path, a track, a control parameter, levels of driving automation (including a case where level 0 is set in manual driving), and the like, as a planning situation in the planning block 120 of the host vehicle 2 in the violation scene or scenario. The path planning situation represented by the situation information Ia may include, for example, a planning result relating to at least one type of a route to a destination, a traveling lane in a multiple-lane structure, and the like. The situation information Ia in manual driving may represent, as a state of a driver operating the host vehicle 2 in the violation scene or scenario at least one type of, for example, a driving tendency including a driving score before the violation scene or scenario, a history of a travel distance, a history of a travel time, a history of a safety envelope violation, a physical state, and the like.

The situation information Ia may represent at least one type of, for example, a position, a distance, a speed, acceleration and deceleration, a relative speed, relative acceleration, an estimation state including their vectors, and the like, as a state of the target moving object 3 in the violation scene or scenario. When the type of the target moving objects 3 are vulnerable road users, the situation information Ia may represent at least one type of, for example, age, physical state, and the like of a person who is at least a part of the road users.

The situation information Ia may represent, for example, a risk type, as a relative state between the host vehicle 2 and the target moving object 3. The risk type represented by the situation information Ia may be at least one type of, for example, rear-end collision risk, head-on collision risk, side-surface collision risk, crossing risk, blind spot risk, and their detailed situations, assumed in a safety model that defines a safety envelope with a reference for determining a safety envelope violation, as illustrated in FIG. 12. The situation information Ia may represent at least one type of, for example, a traffic rule, a sign, a road structure, a location, a section, a road surface condition, a light and shade condition, a construction condition, a traffic congestion situation, an existence situation of an obstacle including a falling object, a feature structure around a road, a blind spot caused by the feature structure or a moving object type, and the like, as a road situation of the violation scene or scenario. The moving object type is a distinction between vehicles, such as automobiles, trucks, and buses, for example. The situation information Ia representing a road situation may include map data associated with the road situation. The situation information Ia may represent at least one type of a time of a violation scene or scenario, a time period of the violation scene or scenario including day and night, a climate situation (that is, weather) of the violation scene or scenario, and the like.

In S110, the risk monitoring block 140 may determine a factor of the safety envelope violation, and in this case, the scenario information Is may include factor information Ib representing the factor. As illustrated in FIG. 12, the factor information Ib is preferably generated for at least one of the host vehicle 2 and the target moving object 3, which is determined to have the safety envelope violation (that is, self-blame and other-blame). The factor information Ib may be generated to specify erroneous determination in manual driving or erroneous control in autonomous driving, as a factor of a safety envelope violation that is determined to cause an unreasonable risk, for at least one type of an operation timing, a vehicle-to-vehicle distance, a traffic priority, a speed, and the like, for example. The factor information Ib may be generated to specify a driving policy that is not complied with due to the safety envelope violation in manual driving or autonomous driving, as the factor of the safety envelope violation determined to cause an unreasonable risk. FIG. 12 illustrates a result of specifying a violated driving policy, among the driving policy numbers (1) to (5) when the target moving object 3 is the target vehicle 3a.

The scenario information Is generated by the risk monitoring block 140 in S110 can be transmitted to be uploaded to the remote center 8 according to transmission control of the communication system 6 (the processor 62 of the communication device 6a) by the risk monitoring block 140 after completion of authentication by the remote center 8 for a user ID including an authentication key. In S110, the risk monitoring block 140 may store the generated scenario information Is in the memory 10. The scenario information Is may be accumulated at multiple time points in the memory 10, by storing the scenario information Is in the memory 10 in association with a time stamp representing a generation time by the risk monitoring block 140. The scenario information Is may be encrypted or hashed when stored in the memory 10. When the stored scenario information Is is hashed, a hash value forming a part of the scenario information Is may be transmitted to the remote center 8.

In the target vehicle 3a assumed to be another host vehicle 2 from the viewpoint of the remote center 8, in S110, the risk monitoring block 140 may execute the generation of the scenario information Is and transmission control from the target vehicle 3a through the communication system 6. The scenario information Is in this assumed case is information representing a scenario of a safety envelope violation occurring in the target vehicle 3a, for example, a violation scenario.

In S120 of the processing method illustrated in FIG. 11, the center management block 880 acquires the scenario information Is uploaded from the risk monitoring block 140 from the selected host vehicle 2 of manual driving or autonomous driving through the communication system 8b. In the target vehicle 3a assumed to be another host vehicle 2 from the viewpoint of the remote center 8, in S120, the center management block 880 also acquires the scenario information Is from the target vehicle 3a through the communication system 8b.

In S120, the center management block 880 may store the acquired scenario information Is in the memory 80. The scenario information Is may be accumulated at multiple time points in the memory 80 by storing the scenario information Is in the memory 80 in association with a time stamp representing a generation time by the risk monitoring block 140 or an acquisition time by the center management block 880. The scenario information Is may be encrypted or hashed when stored in the memory 80. When the scenario information Is is encrypted at the time of acquisition, the encrypted scenario information Is may be stored in the memory 80 after a decryption process. When the scenario information Is is a hash value at the time of acquisition, the hash value may be temporarily stored in the memory 80. The hash value stored in the memory 80 is collated with a hash value for the scenario information Is stored in the memory 10 of the processing device 1*a* when using the scenario information Is in S130, which will be described below, thereby enabling secure acquisition of the scenario information Is.

In S130 of the processing method, the center management block 880 generates feedback information If for feedback to the host vehicle 2 based on the acquired scenario information Is to transmit the feedback information If from the remote center 8 to the host vehicle 2 through the communication system 8*b*. The feedback information If may be information generated to realize verification and validation on-board in the host vehicle 2. The feedback information If may be information generated based on a concept of a feedback loop between the host vehicle 2 and the remote center 8. The feedback information If may be generated in real-time in response to acquisition of the scenario information Is based on the scenario information Is of the acquisition. In S130, the center management block 880 may perform a statistical analysis process including a tallying process on the scenario information Is at multiple time points when accumulated in the memory 80. In this case, the feedback information If may be generated after the fact based on an output result of the statistical analysis process. The generation after the fact of the feedback information If may be executed in at least one type of, for example, span of daily, weekly, monthly, and every predetermined number of trips (that is, operations).

The scenario information Is stored in the memory 80 may be deleted in response to the generation or transmission of the feedback information If. The scenario information Is stored in the memory 80 may be deleted by using at least one type of, for example, a setting period, an operator's instruction, a non-occurrence period of a safety envelope violation in the same scene or scenario or in the same location, and the like, as a trigger.

The feedback information If includes assistance information Ic representing assistance contents for driving the host vehicle 2, determined based on the scenario information Is. The assistance information Ic may represent an approval command for approving a constraint/restriction set by the risk monitoring block 140 on driving control of a safety envelope violation planned in the host vehicle 2. The constraint/restriction approval command represented by the assistance information Ic may be set to approve at least one type of a speed limit, acceleration and deceleration limit, and the like of the host vehicle 2, for example. The assistance information Ic may represent a change command of a parameter of setting or a parameter of learning in a safety model that defines a safety envelope that is a determination reference for the safety envelope violation in the host vehicle 2.

The assistance information Ic may represent an update command or a parameter adjustment command for a detection algorithm related to at least one type of, for example, fusion, object detection, roadway detection, sign detection, localization, and the like, by the sensing block 100 of the host vehicle 2. The assistance information Ic may represent an adjustment command for at least one of an internal parameter and an external parameter in the sensor system 5 of the host vehicle 2.

The assistance information Ic may represent a change command to transition to a minimal risk condition with respect to at least one type of, for example, a path, a track, levels of driving automation (including a case where level 0 is set in manual driving), an operational design domain, a control parameter, and the like, by the planning block 120 of the host vehicle 2. The path change command represented by the assistance information Ic may include, for example, a selection result of determining a path with a less violation for the safety envelope with respect to at least one type of, for example, a path to a destination, a traveling lane in a multiple-lane structure, and the like. The control parameter change command represented by the assistance information Ic may be set to plan at least one type of, for example, a speed limit, an acceleration and deceleration limit, brake intervention, steering intervention, autocruise control intervention, traction control intervention, and the like. At this time, the setting of the change command is preferably executed related to at least one type of, for example, intrinsic or specific control parameter among a moving object type with many safety envelope violations, a climate situation with many safety envelope violations, a time period with many safety envelope violations, and the like. The assistance information Ic for the host vehicle 2 in manual driving may represent a warning command to the driver who violates the safety envelope. The assistance information Ic for the host vehicle 2 in manual driving may represent an autonomous driving intervention command by the planning block 120 of the host vehicle 2.

In S130, the center management block 880 may determine a factor of the safety envelope violation based on the scenario information Is. In this case, the feedback information If may include the factor information Ib representing the factor, as illustrated in FIG. 12. The factor information Ib is preferably generated in accordance with S110 described above. The center management block 880 constructed by the processing device 8*a* of the remote center 8 can generate the factor information Ib by a highly accurate and detailed factor analysis (including the statistical analysis described above), as compared with the risk monitoring block 140 constructed by the processing device 1*a* of the host vehicle 2. This is because the processing device 8*a* (in particular, the cloud server-based processing device 8*a*) has a higher degree of freedom in computer design than the processing device 1*a*. In the center management block 880 of the processing device 8*a*, when information on vehicles falling into an unreasonable risk state is uploaded, the information is synthesized to determine which vehicle is responsible for the accident and it is possible to give a third party viewpoint.

In the feedback information If including the factor information Ib, an assistance content represented by the assistance information Ic is preferably commanded in association with a factor represented by the factor information Ib. In one specific example, an assistance content for a safety envelope violation with an overspeed as a factor may be a command to give the host vehicle 2 an acceleration and deceleration limit or the like according to a constraint/restriction setting or a driving control plan. In another specific example, an assistance content for a safety envelope violation with erroneous determination or erroneous control of a crossing timing as a factor may be a command to give the host vehicle 2 an acceleration and deceleration limit, brake intervention, steering intervention, or the like, according to a constraint/ restriction setting or a driving control plan.

The feedback information If when the factor information Ib is included may include, for example, a video or the like for verifying a factor determined by the center management block 880 in the scenario information Is acquired by the center management block 880. The scenario information Is for verifying a factor for the host vehicle 2 in manual driving preferably includes a video imaging a violation scene or scenario in which a driver is to violate a safety envelope, such as a merging scene or scenario at a short-distance merging portion and a scene or scenario of entering a blind spot at which a traffic congestion end is located, for example.

The feedback information If generated by the center management block 880 in S130 can be transmitted to the host vehicle 2 under the control of the communication system 8*b* by the center management block 880 after completion of authentication by the remote center 8 for a user ID including an authentication key. A transmission timing of the feedback information If may be controlled in real-time or after the fact with respect to the safety envelope violation, based on a generation timing of the feedback information If described above. The transmission timing of the feedback information If may be controlled to respond to a request from the host vehicle 2, which will be described below. After the execution in S130 is completed when the feedback information If is generated or transmitted after the fact or transmitted in response to the request from the host vehicle 2, the processing method may not shift to S140 and S150 in the flow this time, and the shift may be realized as necessary.

In S130, the center management block 880 may store the generated feedback information If in the memory 80. The feedback information If may be accumulated in the memory 80 at multiple time points by storing the feedback information If in the memory 80 in association with a time stamp representing a generation time by the center management block 880. The feedback information If may be encrypted or hashed, and then stored in the memory 80. The feedback information If stored in the memory 80 may be deleted in response to generation or transmission of the feedback information If. The feedback information If stored in the memory 80 may be deleted by using at least one type of, for example, a setting period, an operator's instruction, a non-occurrence period of a safety envelope violation in the same scene or scenario or in the same location, and the like, as a trigger.

In the target vehicle 3*a* assumed to be another host vehicle 2 from the viewpoint of the remote center 8, in S130, the center management block 880 may execute the generation of the feedback information If and transmission control to the target vehicle 3*a* through the communication system 8*b*. The feedback information If in this assumed case is information fed back to the target vehicle 3*a* based on the scenario information Is. In addition, the feedback information If in this assumed case may be generated to be distributed to at least one type of, for example, each vehicle among a location with a high probability of occurrence of a safety envelope violation, a factor of the safety envelope violation, assistance contents for avoiding the safety envelope violation, and the like.

In S140 of the processing method illustrated in FIG. 11, the risk monitoring block 140 acquires the feedback information If downloaded from the center management block 880 in the host vehicle 2 in selected manual driving or autonomous driving according to reception control of the communication system 6 (the processor 62 of the communication device 6*a*). The feedback information If may be acquired by transmission from the center management block 880 in real-time or after the fact for the safety envelope violation occurring in the host vehicle 2. The feedback information If may be acquired by transmission from the center management block 880 in response to a request from the host vehicle 2, for example, at any timing or within a predetermined range on the path and the like. When the target vehicle 3*a* is assumed to be another host vehicle 2 from the viewpoint of the remote center 8, in S140, the risk monitoring block 140 acquires the feedback information If from the center management block 880 to the target vehicle 3*a* through the communication system 6 in the same manner.

In S140, the risk monitoring block 140 may store the acquired feedback information If in the memory 10. The feedback information If may be accumulated at multiple time points in the memory 10 by storing the feedback information If in the memory 10 in association with a time stamp representing a generation time by the center management block 880 or an acquisition time by the risk monitoring block 140. The feedback information If may be encrypted or hashed when stored in the memory 10. When the feedback information If is encrypted at the time of acquisition, the encrypted feedback information If may be stored in the memory 10 after a decryption process. When the feedback information If is a hash value at the time of acquisition, the hash value may be temporarily stored in the memory 10. The hash value stored in the memory 10 is collated with a hash value for the feedback information If stored in the memory 80 of the processing device 8*a* when using the feedback information If in S150, which will be described below, thereby enabling secure acquisition of the feedback information If.

In S140, the risk monitoring block 140 may delete the scenario information Is stored in the memory 10, in response to acquisition of the feedback information If, at the time of the acquisition or after the feedback information If is used in S150. In S140, the risk monitoring block 140 may delete the scenario information Is stored in the memory 80 by using at least one type of, for example, a setting period, a non-occurrence period of the safety envelope violation in the same scene or scenario or the same location, and the like, as a trigger.

In S150 of the processing method, at least one block of the risk monitoring block 140, the sensing block 100, and the planning block 120 executes an application selected based on the acquired feedback information If. In S150, among the risk monitoring block 140, the sensing block 100, and the planning block 120, a block corresponding to an assistance content represented by the assistance information Ic included in the feedback information If may execute an application for realizing the assistance content. At this time, when the feedback information If further includes at least one of the factor information Ib and the scenario information Is, at least one of the information is preferably reflected in the execution of the application by the corresponding block of the assistance content. In particular, when the assistance information Ic of the feedback information If represents an approval command for a constraint/restriction on the planned driving control of the safety envelope violation, in S150, the risk monitoring block 140 gives the constraint/restriction on the driving control executed by the control block 160.

In S150, the risk monitoring block 140 may execute an application capable of recognizing the appropriate degree of determination on the safety envelope violation based on the feedback information If. It can be said that the appropriate degree recognition by executing the application in S150 is verification of the safety envelope violation determination. The execution of the application in S150 may be realized in real time in response to the acquisition of the feedback information If, or may be realized subsequently after the acquired feedback information If is accumulated in the memory 10. As described above, the current flow of the processing method is ended when the execution in S150 is completed. Meanwhile, in S150, the execution of the application after the fact may be put on hold until the next and subsequent flows, and the current flow of the processing method may be ended. In addition, in S150, the application includes not only a check-only application, but also an application for realizing the assistance content described above, which is secondarily or indirectly recognized.

Further, in the technique disclosed in JP 6708793 B2 described above, the constraint/restriction on driving control in the host vehicle is only assumed for autonomous driving. Therefore, safety of the host vehicle in manual driving is entrusted to a driver. Further, the technique disclosed in JP 6708793 B2 assumes that the determination of the host vehicle is appropriate when the constraint/restriction is applied to driving control. Therefore, even when the technique disclosed in JP 6708793 B2 is applied to manual driving, when the driver of the host vehicle makes an error in determination, the erroneous determination will influence safety. Further, the technique disclosed in JP 6708793 B2 assumes that the determination of the host vehicle is appropriate when the constraint/restriction is applied to driving control in autonomous driving. Therefore, when the host vehicle makes an error in determination, the erroneous determination influences driving precision in autonomous driving.

On the other hand, according to the first embodiment described above, in both manual driving and autonomous driving, the feedback information If is fed back from the remote center 8 to the host vehicle 2 based on the scenario information Is representing a scene or scenario of a safety envelope violation set in the SOTIF as a driving policy. Accordingly, the host vehicle 2 can recognize the appropriate degree of a determination for the safety envelope violation based on the feedback information If as a third party's determination. Therefore, in the host vehicle 2, it is possible to increase safety improvement in manual driving and ensure driving precision in autonomous driving. In the same manner, when the target vehicle 3a is assumed to be another host vehicle 2 from the viewpoint of the remote center 8, the target vehicle 3a as the "second host moving object" can increase safety improvement in manual driving, and ensure driving precision in autonomous driving.

Second Embodiment

A second embodiment is a modification of the first embodiment. In the following, the second embodiment will be described, focusing on a difference in driving-related process from the first embodiment in manual driving. Therefore, the driving-related process in manual driving described in the second embodiment may be incorporated in or executed in parallel with the corresponding steps in the driving-related process of the first embodiment, and may be executed instead of the driving-related process of the first embodiment.

Figure 13:
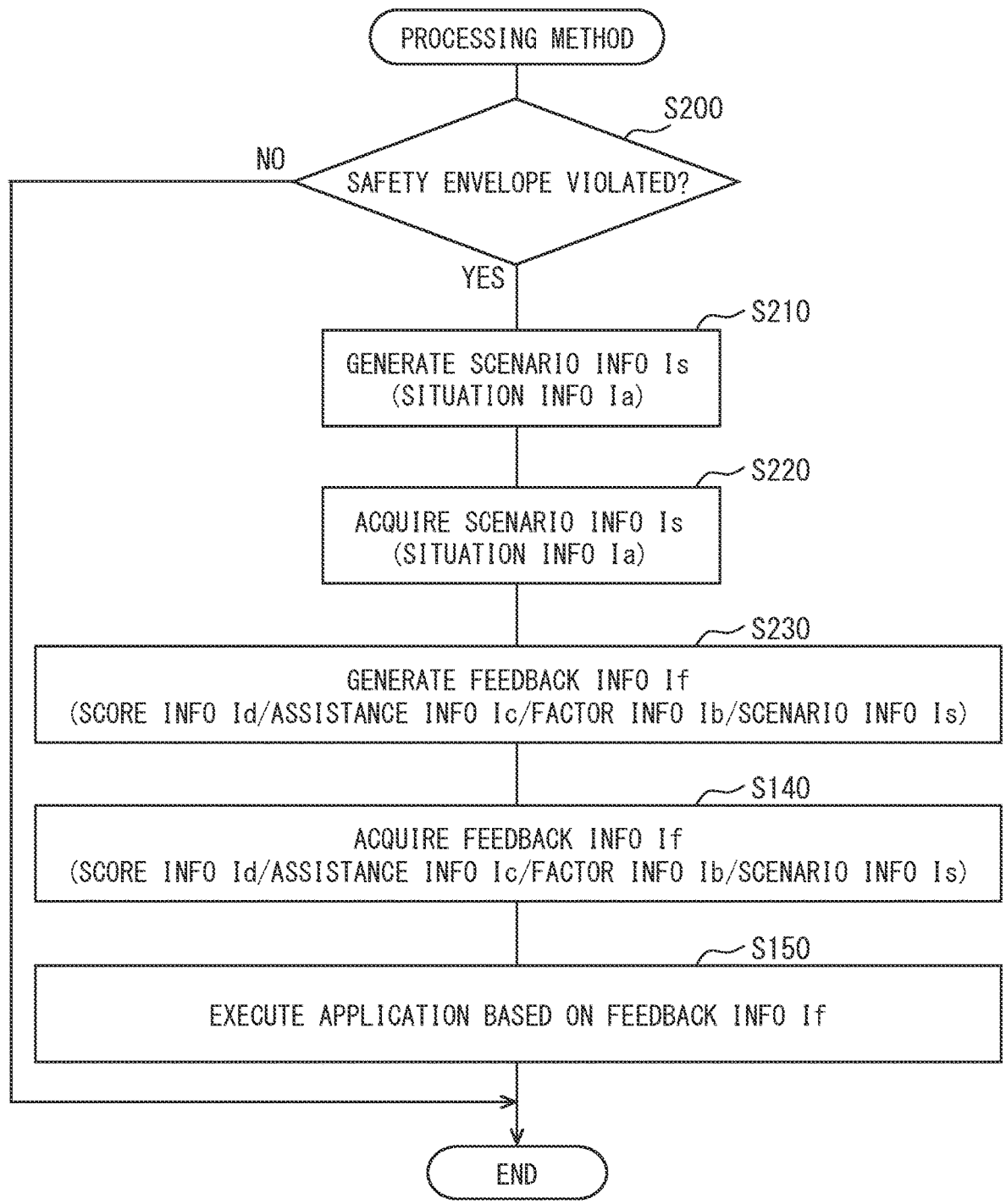
FIG. 13 is a flowchart illustrating a processing method of a second embodiment.
Figure 14:
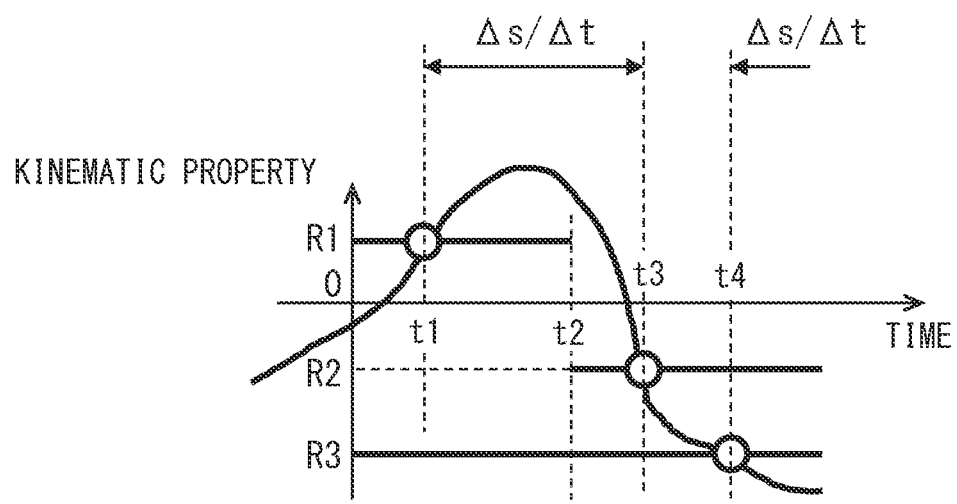
FIG. 14 is a graph describing the processing method of the second embodiment.

As illustrated in FIG. 13, in a processing method of the second embodiment, in S200 corresponding to S100, the risk monitoring block 140 monitors a safety envelope violation in the host vehicle 2 in manual driving. As illustrated in FIG. 14, in S200, the risk monitoring block 140 may determine that the safety envelope violation has occurred when an actual value of a kinematic property is out of a limit value R1 by a constraint/restriction setting.

In the processing method, in S210 corresponding to S110, the risk monitoring block 140 generates at least the situation information Ia, as the scenario information Is representing a violation scene or scenario in the host vehicle 2 in manual driving. In S210, the risk monitoring block 140 generates the situation information Ia to represent a driver state in the host vehicle 2 in association with the safety envelope violation, which is required for a calculation of a driving score. The driver state required for the driving score is at least one type of, for example, driving tendency including the driving score before a violation scene or scenario, a history of a travel distance, a history of a travel time, a history of the safety envelope violation, and the like. The situation information Ia necessary for the driving score may represent at least one type of, for example, a load weight, a tire state including abrasion, a maintenance state, an operation state of a driving actuator, a moving object type, and the like, as a state of the host vehicle 2 that influence the driver's determination of negligence.

In S210, the risk monitoring block 140 may generate the situation information Ia representing at least one type of, for example, a time, a location, a localization estimation value, and the like of the violation scene or scenario in which a kinematic property is out of the limit values R1 to R3 as illustrated in FIG. 14. In S210, as illustrated in FIG. 14, when a distance of a violation section Δs in which a kinematic property is out of the limit values R1 to R3 is out of a set range, the risk monitoring block 140 may generate the situation information Ia representing a track (that is, trajectory) of the host vehicle 2 in the violation section Δs in map data. In S210, as illustrated in FIG. 14, when a length of a violation time Δt in which the kinematic property is out of the limit values R1 to R3 is out of a set range, the risk monitoring block 140 may generate the situation information Ia representing the violation time Δt. The set range serving as a determination reference for the violation section Δs and the violation time Δt is set to a range equal to or less than a threshold value or less than the threshold value. In FIG. 14, an example is illustrated in which the kinematic property is out of the upper limit value R1 between times t1 and t2, the kinematic property is out of the changed upper limit value R2 between times t2 and t3, and the kinematic property is out of the upper limit value R3 after time t4.

As illustrated in FIG. 13, in the processing method, in S220 corresponding to S120, the center control block 880 acquires the scenario information Is from the host vehicle 2 in manual driving through the communication system 8b. In the processing method, in S230 corresponding to S130, the center control block 880 generates at least the score information Id, as the feedback information If for feedback to the host vehicle 2 based on the acquired scenario information Is. The score information Id represents a driving score for a driver of the host vehicle 2. The driving score is determined by the center control block 880 based on the scenario information Is. The driving score is preferably represented by a numerical value or a level, as a measure for objectively evaluating the driver who operates the host vehicle 2.

In S230, the center control block 880 may generate the assistance information Ic, as the feedback information If to represent a model command for manual driving recommended for avoiding the safety envelope violation. The model command represented by the assistance information Ic includes, for example, a command to advance a braking timing with respect to the target vehicle 3a in front in the longitudinal direction, to shorten a parallel running time with the target vehicle 3a in the lateral direction, or the like. In S230, the center control block 880 may generate at least one of the factor information Ib representing a factor of the safety envelope violation and the scenario information Is for verifying the factor, as the feedback information If associated with the assistance information Ic representing the model command.

In the processing method of the second embodiment, S140 of acquiring the feedback information If and S150 of executing the application based on the feedback information If are realized in the host vehicle 2. S200, S210, S220, S230, S140, and S150 of the processing method may also be realized in the target vehicle 3a assumed to be another host vehicle 2 from the viewpoint of the remote center 8. In this assumed case, in the center control block 880 in S220 and S230, the scenario information Is of the safety envelope violations may be accumulated and tallied in the memory 80 from at least one of the viewpoints of each of the vehicles 2 and 3a and each driver of each of the vehicles 2 and 3a, and the driving score may be calculated by a statistical analysis of the tallying result.

In the second embodiment described so far, each of transmission, storage, and deletion of the scenario information Is and the feedback information If conforms to the first embodiment. Accordingly, in S140, the feedback information If including at least the score information Id is acquired. According to the second embodiment described above, even a driver in manual driving can recognize the appropriate degree of the determination against the safety envelope violation based on the driving score represented by the score information Id in the feedback information If. Therefore, the second embodiment is advantageous in increasing safety improvement particularly in manual driving.

Third Embodiment

A third embodiment is another modification of the first embodiment. In the following, the third embodiment will be described, focusing on a difference in driving-related process from the first embodiment in manual driving. Therefore, the driving-related process in manual driving described in the third embodiment may be incorporated in or executed in parallel with the corresponding steps in the driving-related process of at least one of the first and second embodiments, and may be executed instead of the driving-related process of the first embodiment.

Figure 15:
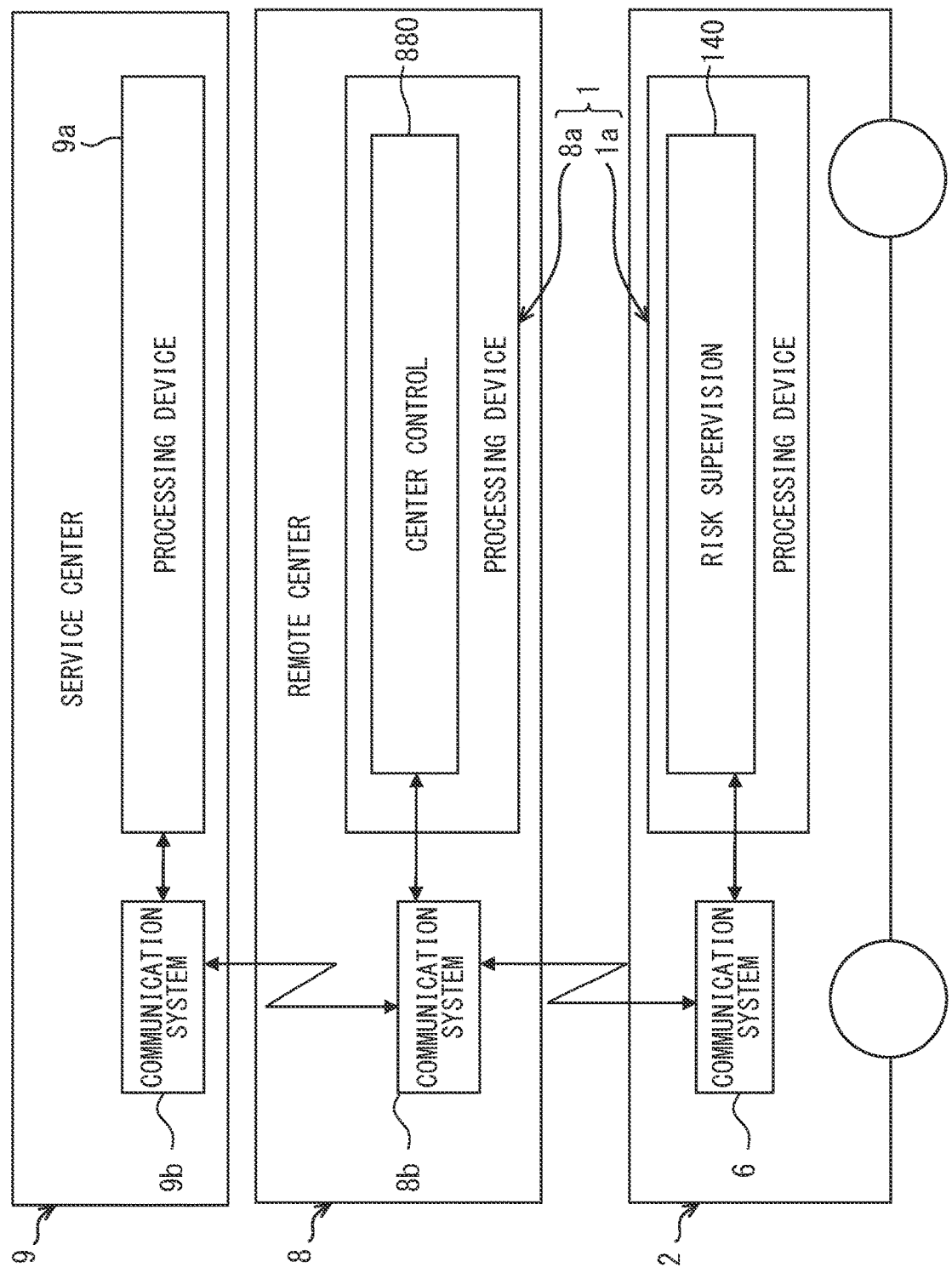
FIG. 15 is a block diagram illustrating a functional block of a third embodiment.

As illustrated in FIG. 15, the remote center 8 of the processing system 1 according to the third embodiment can communicate with a service center 9 through the communication system 8b. The service center 9 is managed by a service provider in a business of providing a service related to a road user including the host vehicle 2. The service provided by the service center 9 includes at least one type of, for example, a city planning service, a road maintenance service, a map information service, an operation management service, a traffic management service, a vehicle insurance service, a ride sharing service, a car-sharing service, and the like.

The service center 9 includes a processing device 9a and a communication system 9b configured in accordance with the remote center 8. Meanwhile, the processing device 9a acquires information provided from the remote center 8 through the communication system 9b by cooperating with a processing program in the remote center 8 or by executing an individual program that is a part of or different from the processing program. The service center 9 utilizes the information provided from the remote center 8 for the service of the service provider.

Figure 16:
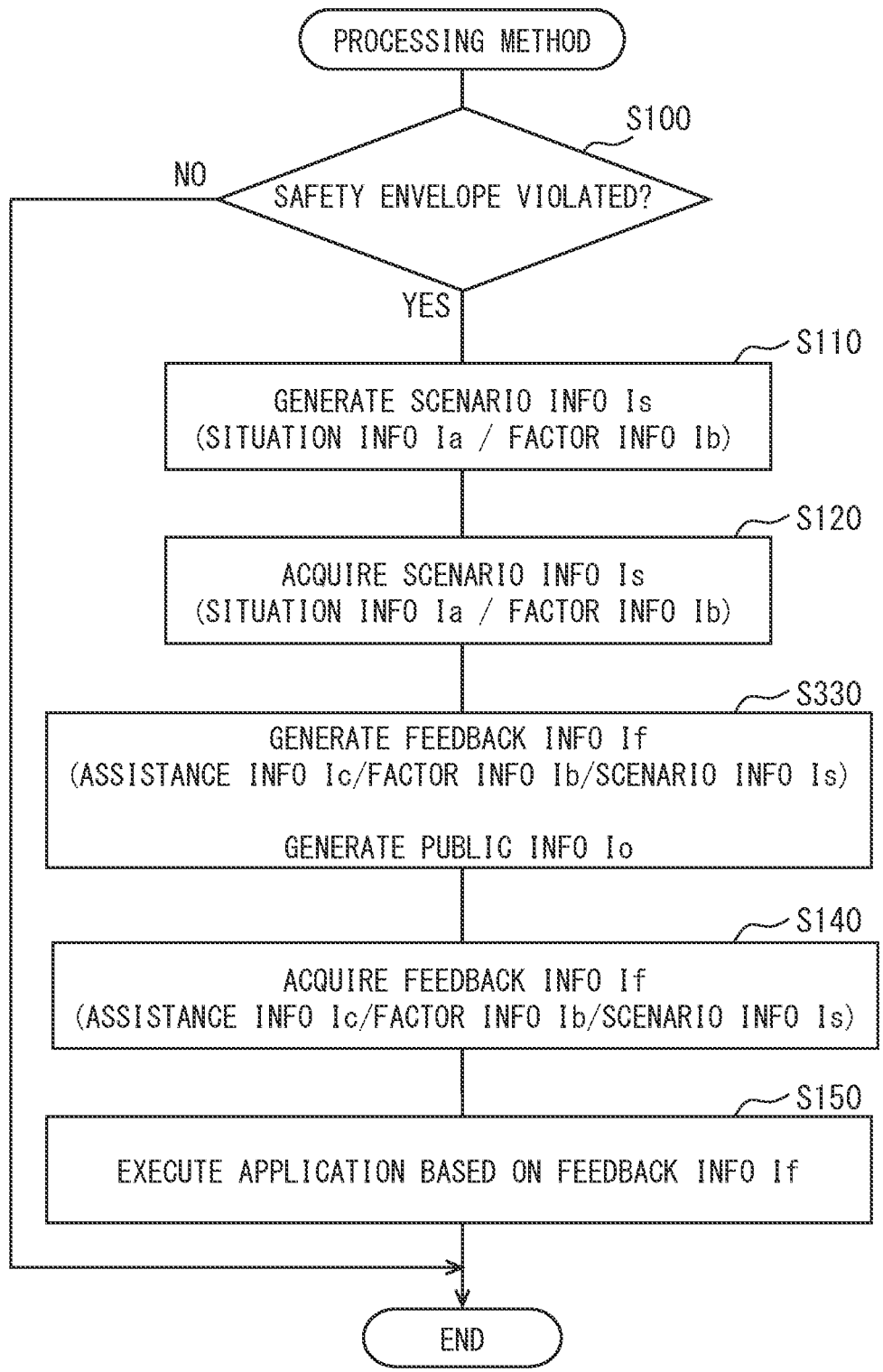
FIG. 16 is a flowchart illustrating a processing method of the third embodiment.

Therefore, as illustrated in FIG. 16, in a processing method of the third embodiment, in S330 corresponding to S130, the center control block 880 generates public information Io to be published to the service center 9 based on at least one of the scenario information Is and the feedback information If. The public information Io may be generated to publish a location with a high probability of a safety envelope violation to the service center 9 that provides a city planning service, a road maintenance service, a map information service, an operation management service, a traffic management service, or the like, for example. The public information Io may be generated to publish, for example, information serving as an assessment reference of a vehicle insurance to the service center 9 that provides the vehicle insurance service and the like.

The public information Io may be generated to publish, for example, a factor of the safety envelope violation associated with each driver in manual driving to the service center 9 that provides the ride sharing service, the car-sharing service, or the like. In this case, the public information Io may be generated to publish an assistance content further matched to the factor. In one specific example of the assistance content matched to the factor, when the factor is an erroneous determination for a priority given to an oncoming vehicle, a path with less on-street parking in which it is not necessary to extend into an oncoming lane is searched, and a result of the path search is provided as the public information Io. In another specific example of the assistance content matched to the factor, when the factor is an erroneous determination for a crossing timing, a path for passing through an intersection controlled by a traffic light system is searched, and a result of the path search is provided as the public information Io.

In the processing method of the third embodiment, S100, S110, S120, and S330 may be executed in accordance with S200, S210, S220, and S230 of the second embodiment. In S330 in accordance with S230, when the assistance content matched to the factor of the safety envelope violation is published by the public information Io generated as described above, a driving score may be calculated for each driver. In still another specific example of the assistance content matched to the factor, the public information Io for selecting a driver with a high driving score is provided to the service center 9 that provides the ride sharing service.

In such a third embodiment, the public information Io for the service center 9 is generated based on at least one of the scenario information Is and the feedback information If related to the safety envelope violation. Therefore, the third embodiment is advantageous in increasing safety improvement in manual driving, together with participation of the service provider.

Fourth Embodiment

A fourth embodiment is still another modification of the first embodiment. In the following, the fourth embodiment will be described, focusing on a difference in driving-related process from the first embodiment in autonomous driving. Therefore, the driving-related process in autonomous driving described in the fourth embodiment may be incorporated in or executed in parallel with the corresponding steps in the driving-related process of the first embodiment, and may be executed instead of the driving-related process of the first embodiment.

Figure 17:
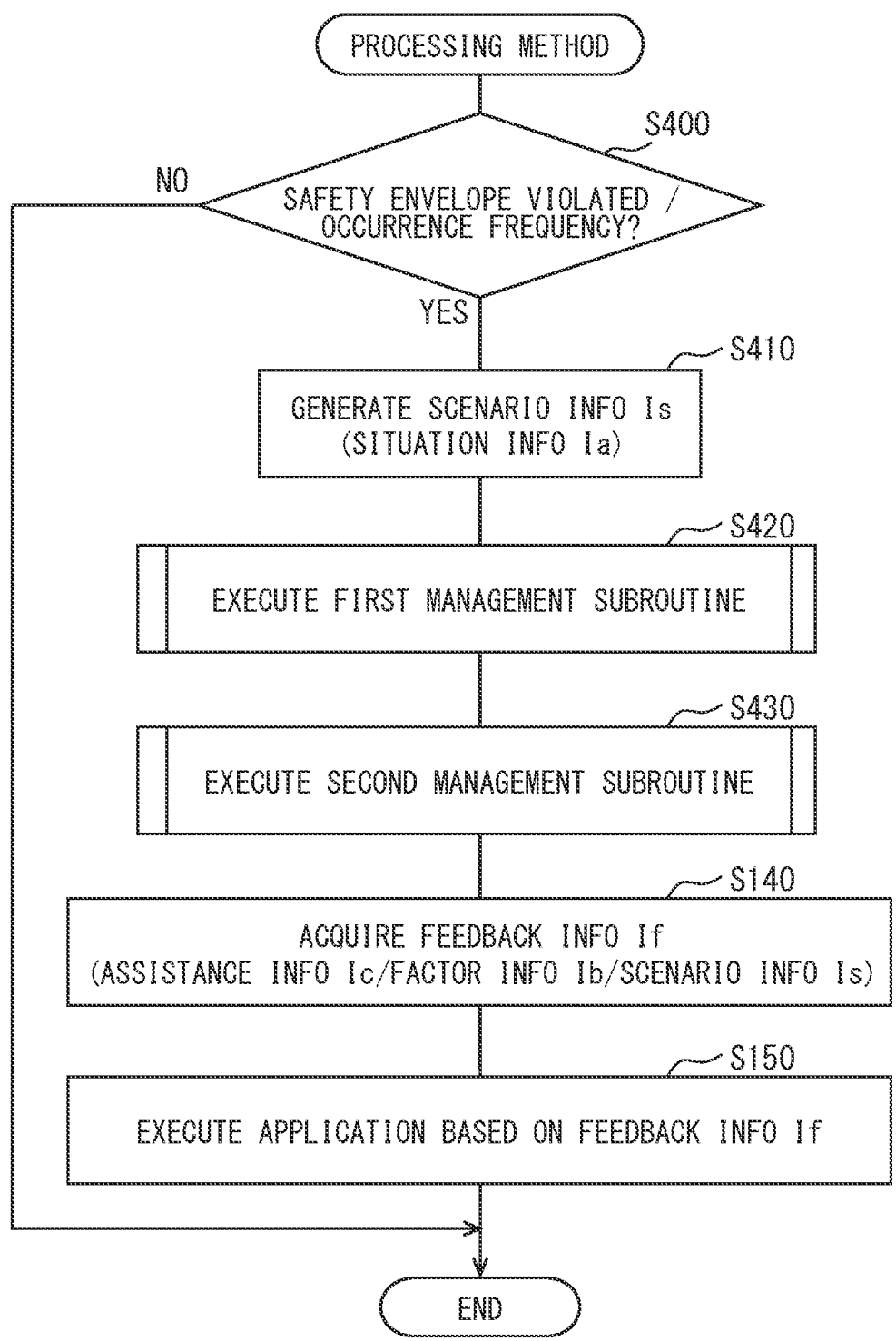
FIG. 17 is a flowchart illustrating a processing method of a fourth embodiment.
Figure 18:
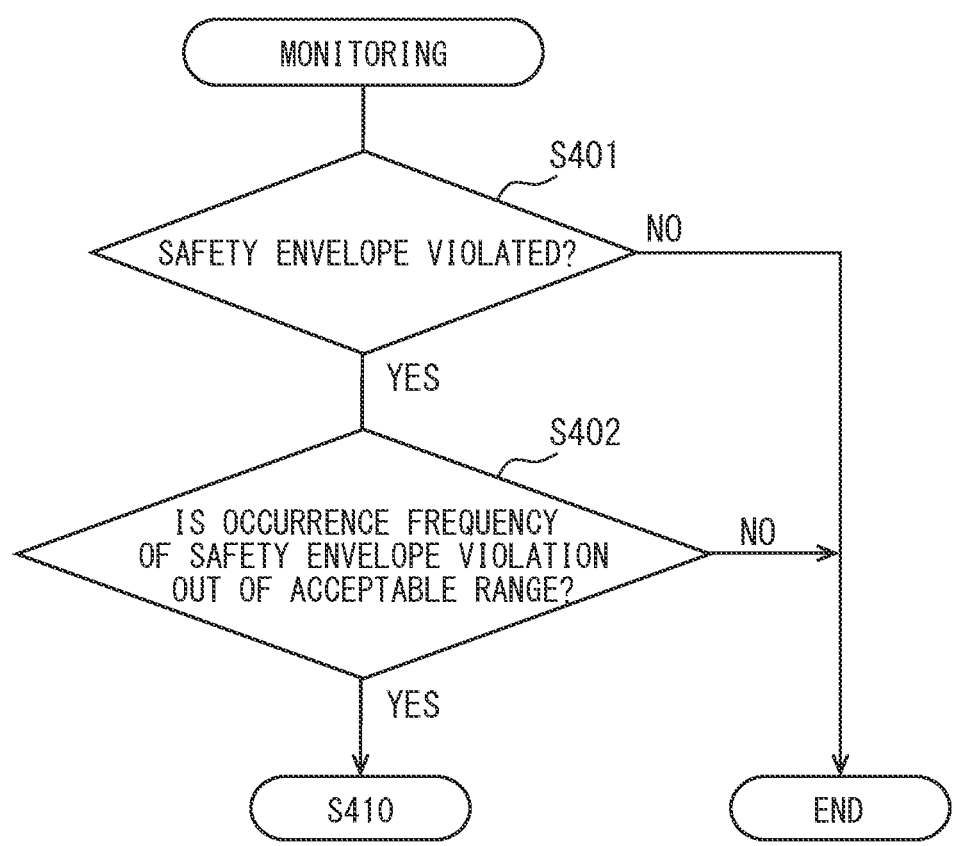
FIG. 18 is a flowchart illustrating the processing method of the fourth embodiment.

As illustrated in FIG. 17, in a processing method of the fourth embodiment, in S400 corresponding to S100, the risk monitoring block 140 executes a monitoring subroutine on the host vehicle 2 in autonomous driving. As illustrated in FIG. 18, in S401 of the monitoring subroutine, the risk monitoring block 140 monitors for a safety envelope violation in the host vehicle 2, in accordance with S100. In S401, when the risk monitoring block 140 determines that no safety envelope is violated, the monitoring subroutine and the current flow of the processing method are ended. On the other hand, in S401, when the risk monitoring block 140 determines that the safety envelope is violated, the monitoring subroutine is shifted to S402.

In S402, the risk monitoring block 140 determines whether an occurrence frequency of the safety envelope violation is out of an acceptable range. By using the number of times the safety envelope violation is allowed in succession as an upper limit value, the acceptable range, which is a reference for determining the occurrence frequency, may be set to the upper limit value or less. By using the number of times the safety envelope violation is allowed within a set time as an upper limit value, the acceptable range, which is a reference for determining the occurrence frequency, may be set to the upper limit value or less. In S402, when the risk monitoring block 140 determines that the occurrence frequency is within the acceptable range, the monitoring subroutine and the current flow of the processing method are ended. On the other hand, in S402, when the risk monitoring block 140 determines that the occurrence frequency is out of the acceptable range, the current flow of the monitoring subroutine is ended and the processing method is shifted to S410 illustrated in FIG. 17.

In the processing method, in S410 corresponding to S110, the risk monitoring block 140 generates at least the situation information Ia as the scenario information Is representing a violation scene or scenario in the host vehicle 2 in autonomous driving. In S410, the risk monitoring block 140 generates the situation information Ia to represent a high-frequency violation scene or scenario in which an occurrence frequency of the safety envelope violation is out of the acceptable range. In such a fourth embodiment, S400 and S410 are also executed in the target vehicle 3a assumed to be another host vehicle 2 from the viewpoint of the remote center 8. Meanwhile, the acceptable range, which is a reference for determining the occurrence frequency in the risk monitoring block 140 of the target vehicle 3a, may be set to the same or different range as in the risk monitoring block 140 of the host vehicle 2, for example, by an individual setting for each vehicle and the like.

Figure 19:
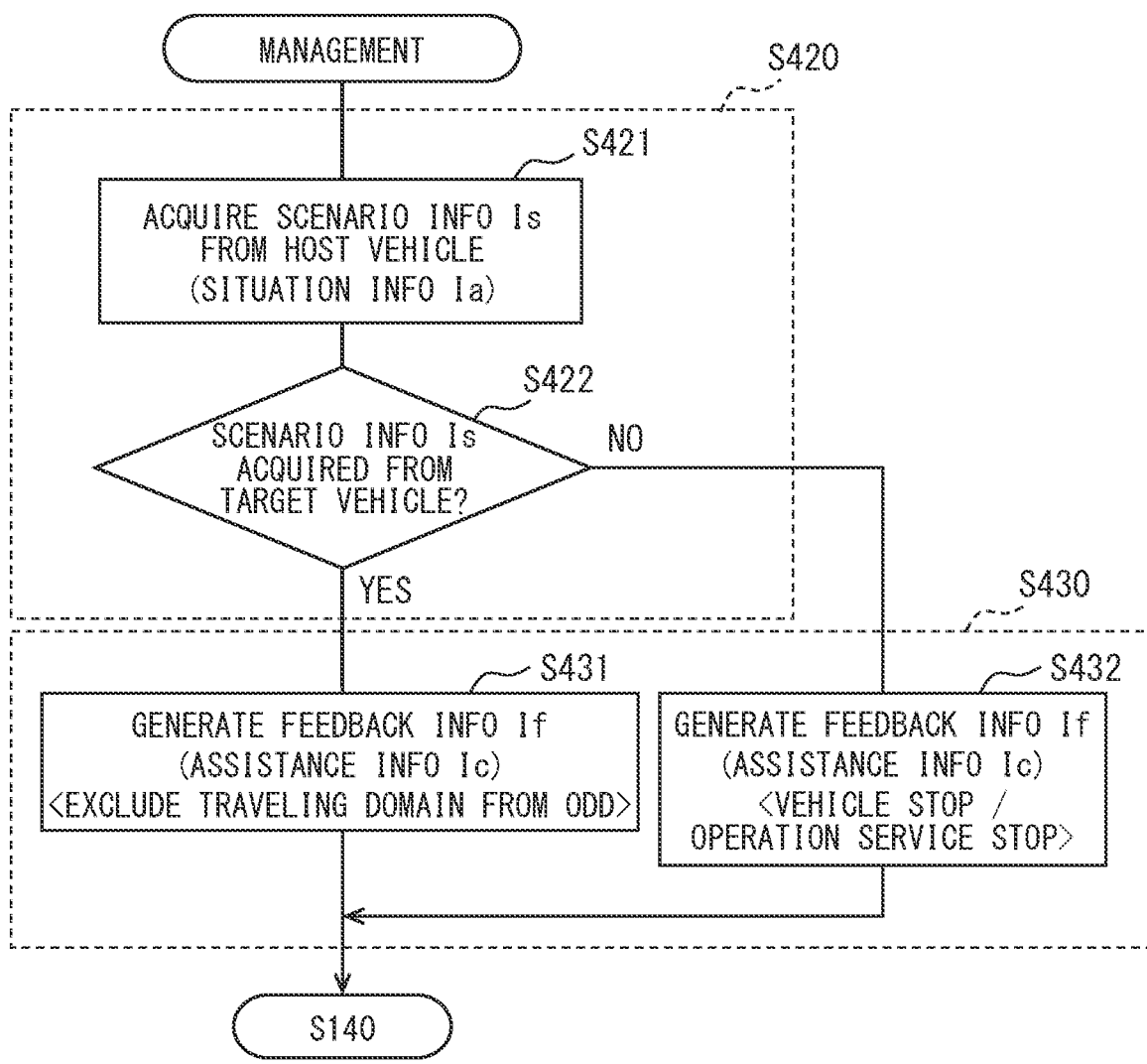
FIG. 19 is a flowchart illustrating the processing method of the fourth embodiment.

In the processing method, in S420 and S430 which respectively correspond to S120 and S130, the center control block 880 sequentially executes first and second management subroutines. As illustrated in FIG. 19, in S421 of the first management subroutine, the center control block 880 acquires the scenario information Is representing a high-frequency violation scene or scenario from the host vehicle 2 in autonomous driving, in accordance with S120.

In S422 of the first management subroutine, the center control block 880 determines whether the scenario information Is representing the high-frequency violation scene or scenario is also acquired from the target vehicle 3a in autonomous driving, in accordance with S120. At this time, with respect to the host vehicle 2 corresponding to a "first moving object", the target vehicle 3a from which the scenario information Is is acquired is defined by other road users existing around a set range, and corresponds to a "second moving object".

In S422, when the center control block 880 determines that the scenario information Is representing the high-frequency violation scene or scenario is acquired, the first management subroutine is ended and the process is shifted to S431 of the second management subroutine. That is, S431 is executed for the high-frequency violation scene or scenario of the host vehicle 2 when an occurrence frequency of a safety envelope violation in the target vehicle 3a is also out of an acceptable range. In S431, the center control block 880 generates at least the assistance information Ic as the feedback information If for feedback to the host vehicle 2 based on the acquired scenario information Is. In S431, the center control block 880 generates the assistance information Ic to represent a change command for excluding a traveling region of a specific violation scene or scenario from an ODD of the host vehicle 2 in autonomous driving. As described above, when the execution in S431 is completed, the current flow of the second management subroutine is ended, and the processing method is shifted to S140 illustrated in FIG. 17.

As illustrated in FIG. 19, in S422, when the center control block 880 determines that the scenario information Is representing the high-frequency violation scene or scenario is not acquired, the first management subroutine is ended and the process is shifted to S432 of the second management subroutine. That is, S432 is executed for the high-frequency violation scene or scenario of the host vehicle 2 when the occurrence frequency of the safety envelope violation in the target vehicle 3a is within the acceptable range. In S432, the center control block 880 generates at least the assistance information Ic as the feedback information If for feedback to the host vehicle 2 based on the acquired scenario information Is. In S432, the center control block 880 may generate the assistance information Ic to represent a stop command for stopping the host vehicle 2, such as an MRM, for example. For example, when the host vehicle 2 is a service car such as a bus or a taxi of which an operation service is managed by the remote center 8, the assistance information Ic may represent an operation command to stop the operation service and go to a service factory for inspection. As described above, when the execution in S432 is completed, the current flow of the second management subroutine is ended, and the processing method is shifted to S140 illustrated in FIG. 17. Transmission, storage, and deletion of each of the scenario information Is and the feedback information If conform to the first embodiment. Further, in the processing method of the fourth embodiment, S140 of acquiring the feedback information If and S150 of executing the application described above based on the feedback information If are realized in the host vehicle 2 and the target vehicle 3a.

In the fourth embodiment described so far, S420 and S430 in which the relationship between the host vehicle 2 and the target vehicle 3a is switched from the viewpoint of the remote center 8 may be executed in parallel. According to the fourth embodiment described above, based on the command represented by the assistance information Ic of the feedback information If, the appropriate degree of the determination on the safety envelope violation can be recognized even by the risk monitoring block 140 during autonomous driving. Therefore, the fourth embodiment is advantageous in ensuring driving precision particularly in autonomous driving.

Fifth Embodiment

A fifth embodiment is still another modification of the first embodiment. In the following, the fifth embodiment will be described, focusing on a difference in driving-related process from the first embodiment in autonomous driving. Therefore, the driving-related process in autonomous driving described in the fifth embodiment may be incorporated in or executed in parallel with the corresponding steps in the driving-related process of at least one of the first and fourth embodiments, and may be executed instead of the driving-related process of the first embodiment.

Figure 20:
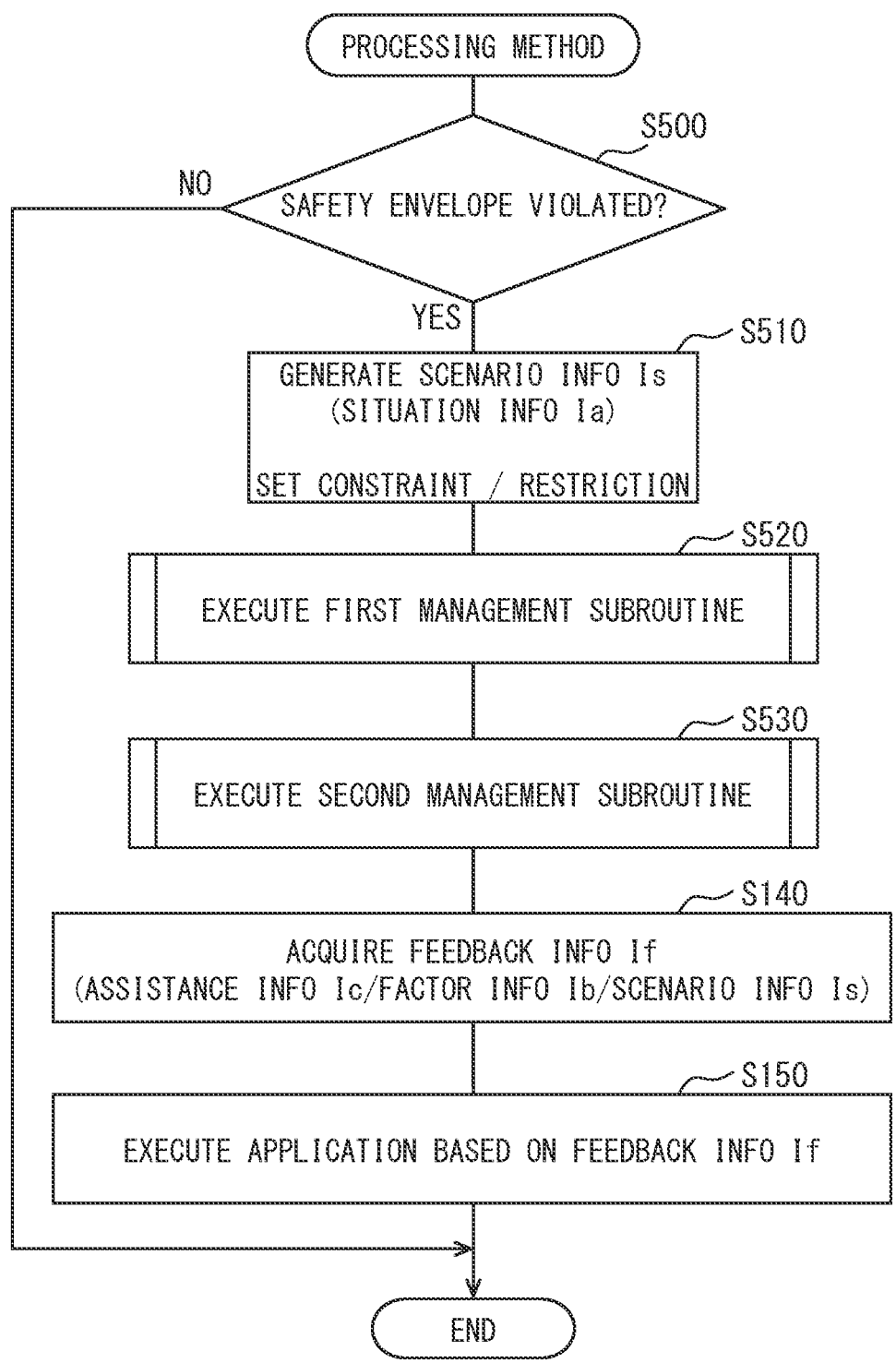
FIG. 20 is a flowchart illustrating a processing method of a fifth embodiment.

As illustrated in FIG. 20, in a processing method of the fifth embodiment, in S500 corresponding to S100, the risk monitoring block 140 monitors a safety envelope violation between the target vehicle 3a assumed to be another host vehicle 2 from the viewpoint of the remote center 8 and the host vehicle 2 in autonomous driving. In the processing method, in S510 corresponding to 110, the risk monitoring block 140 generates at least the situation information Ia as the scenario information Is representing a specific violation scene or scenario occurring between the host vehicle 2 and the target vehicle 3a. In S510, the risk monitoring block 140 sets the current latest constraint/restriction to driving of a safety envelope violation represented by the situation information Ia to be generated, prior to the generation. In such a fifth embodiment, S500 and S510 are also executed in the target vehicle 3a constituting the specific violation scene or scenario.

Figure 21:
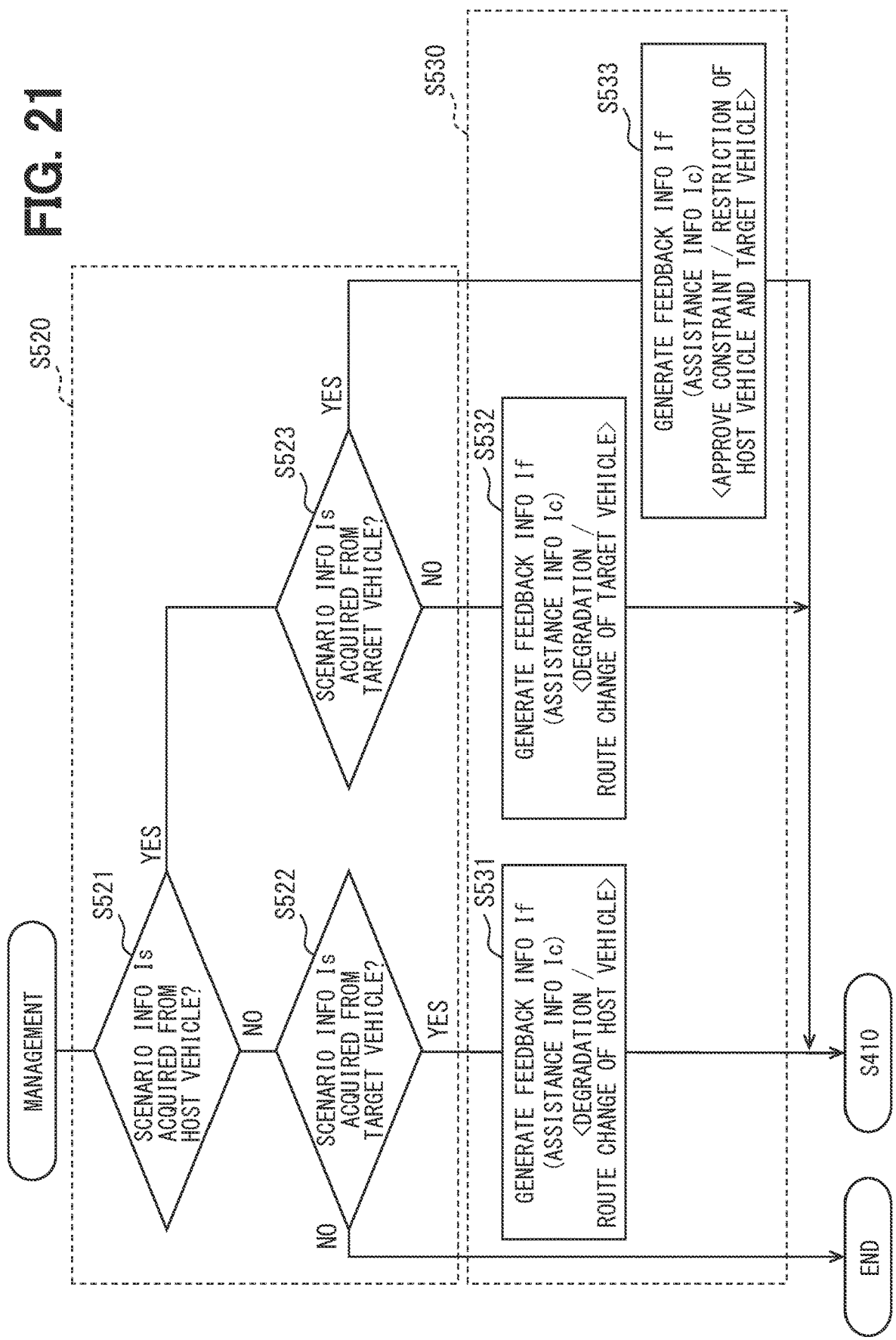
FIG. 21 is a flowchart illustrating the processing method of the fifth embodiment.

In the processing method, in S520 and S530 which respectively correspond to S120 and S130, the center control block 880 sequentially executes first and second management subroutines. As illustrated in FIG. 21, in S521 of the first management subroutine, the center control block 880 determines whether the scenario information Is representing the specific violation scene or scenario is acquired from the host vehicle 2 in autonomous driving, in accordance with S120.

When the center control block 880 determines in S521 that the scenario information Is representing the specific violation scene or scenario is not acquired from the host vehicle 2, the first management subroutine is shifted to S522. That is, S522 is executed when it is determined that a safety envelope violation with the target vehicle 3a has not occurred in the host vehicle 2. In S522, the center control block 880 determines whether the scenario information Is representing the specific violation scene or scenario is acquired from the target vehicle 3a in autonomous driving, in accordance with S120. At this time, with respect to the host vehicle 2 corresponding to a "first moving object", the target vehicle 3a from which the scenario information Is is acquired is defined by other road users existing around a set range, and corresponds to a "second moving object". In S522, when the center control block 880 determines that the scenario information Is representing the specific violation scene or scenario is not acquired from the target vehicle 3a, the first management subroutine and the current flow of the processing method are ended.

In S522, when the center control block 880 determines that the scenario information Is representing the specific violation scene or scenario is acquired from the target vehicle 3a, the first management subroutine is ended and the process is shifted to S531 of the second management subroutine. That is, S531 is executed when it is determined that a safety envelope violation with the target vehicle 3a has not occurred in the host vehicle 2, in a specific violation scene or scenario in which it is determined that a safety envelope violation with the host vehicle 2 has occurred in the target vehicle 3a. In S531, the center control block 880 generates at least the assistance information Ic, as the feedback information If for feedback based on the acquired scenario information Is.

In S531, the center control block 880 generates the assistance information Ic to represent a command to the host vehicle 2 determined to have no safety envelope violation, regardless of the specific violation scene or scenario in which the target vehicle 3a is determined to violate the safety envelope. The command represented by the assistance information Ic is at least one type of, for example, a degradation command to degrade to a minimal risk condition by a constraint/restriction setting or a driving control plan, a change command to change a path of the driving control plan, and the like. In particular, the degradation command may be at least one type of autonomous driving level down including takeover to manual driving, an MRM, and the like, for example. When the host vehicle 2 is a service car such as a bus or a taxi of which an operation service is managed by the remote center 8, for example, the assistance information Ic may represent the operation service to be provided from the remote center 8 to the host vehicle 2 according to a degradation command or a route change command.

In S531, the center control block 880 may generate the assistance information Ic to represent a notification command for notifying the target vehicle 3a determined to have the safety envelope violation, that the host vehicle 2 is determined to have no safety envelope violation. In S531, the center control block 880 may generate the assistance information Ic to represent an approval command for approving a constraint/restriction on driving in the safety envelope violation, set by the risk monitoring block 140 in S510, for the target vehicle 3a determined to have the safety envelope violation. In S531, the center control block 880 may also generate the assistance information Ic for the target vehicle 3a determined to have the safety envelope violation to represent the degradation command or the route change command in accordance with the case of the host vehicle 2 described above. As described above, when the execution in S531 is completed, the current flow of the second management subroutine is ended, and the processing method is shifted to S140 illustrated in FIG. 20.

As illustrated in FIG. 21, when the center control block 880 determines that the scenario information Is representing the specific violation scene or scenario is acquired from the host vehicle 2 in S521, the first management subroutine is shifted to S523. That is, S523 is executed when it is determined that a safety envelope violation with the target vehicle 3a has occurred in the host vehicle 2. In S523, the center control block 880 determines whether the scenario information Is representing the specific violation scene or scenario is also acquired from the target vehicle 3a in accordance with S120. At this time, with respect to the host vehicle 2 corresponding to a "first moving object", the target vehicle 3a from which the scenario information Is is acquired is defined by other road users existing around a set range and constituting the specific violation scene or scenario, and corresponds to a "second moving object".

In S523, when the center control block 880 determines that the scenario information Is representing the specific violation scene or scenario is not acquired from the target vehicle 3a, the first management subroutine is ended and the process is shifted to S532 of the second management subroutine. That is, S532 is executed when it is determined that the safety envelope violation with the host vehicle 2 has not occurred in the target vehicle 3a, in the specific violation scene or scenario in which it is determined that the safety envelope violation with the target vehicle 3a has occurred in the host vehicle 2. In S532, the center control block 880 generates at least the assistance information Ic, as the feedback information If for feedback based on the acquired scenario information Is. At this time, the generation of the assistance information Ic is executed in accordance with S531 in which a relationship between the host vehicle 2 and the target vehicle 3a is switched. As described above, when the execution in S532 is completed, the current flow of the second management subroutine is ended, and the processing method is shifted to S140 illustrated in FIG. 20.

As illustrated in FIG. 21, when the center control block 880 determines in S523 that the scenario information Is representing the specific violation scene or scenario is also acquired from the target vehicle 3a, the first management subroutine is ended, and the process is shifted to S533 of the second management subroutine. That is, S533 is executed when it is determined that the safety envelope violation with the host vehicle 2 also has occurred in the target vehicle 3a, in the specific violation scene or scenario in which it is determined that the safety envelope violation with the target vehicle 3a has occurred in the host vehicle 2. In S533, the center control block 880 generates at least the assistance information Ic, as the feedback information If for feedback based on the acquired scenario information Is. In S533, the center control block 880 generates the assistance information Ic to represent an approval command for approving a constraint/restriction on driving in the safety envelope violation, set by the risk monitoring block 140 in S510 in each of the host vehicle 2 and the target vehicle 3a. As described above, when the execution in S533 is completed, the current flow of the second management subroutine is ended, and the processing method is shifted to S140 illustrated in FIG. 20. Transmission, storage, and deletion of each of the scenario information Is and the feedback information If conform to the first embodiment. Further, in the processing method of the fifth embodiment, S140 of acquiring the feedback information If and S150 of executing the application based on the feedback information If are realized in the host vehicle 2 and the target vehicle 3a.

In the fifth embodiment described so far, S520 and S530 in which the relationship between the host vehicle 2 and the target vehicle 3a is switched from the viewpoint of the remote center 8 may be executed in parallel. On the other hand, from the viewpoint of the remote center 8, when the scenario information Is from one vehicle of multiple vehicles including the host vehicle 2 and the target vehicle 3a is acquired in S521, acquisition of the scenario information Is from the other vehicle may be determined in S523. In the latter case, the execution in S522 and S531 may be omitted by executing S532 and S533 in which the relationship between the host vehicle 2 and the target vehicle 3a is read as a relationship between the one vehicle and the other vehicle. According to the fifth embodiment described above, based on the command represented by the assistance information Ic of the feedback information If, the appropriate degree of the determination on the safety envelope violation can be recognized even by the risk monitoring block 140 during autonomous driving. Therefore, the fifth embodiment is advantageous in ensuring driving precision particularly in autonomous driving.

Sixth Embodiment

A sixth embodiment is still another modification of the first embodiment. Meanwhile, the sixth embodiment may be combined with the second to fifth embodiments.

Figure 22:
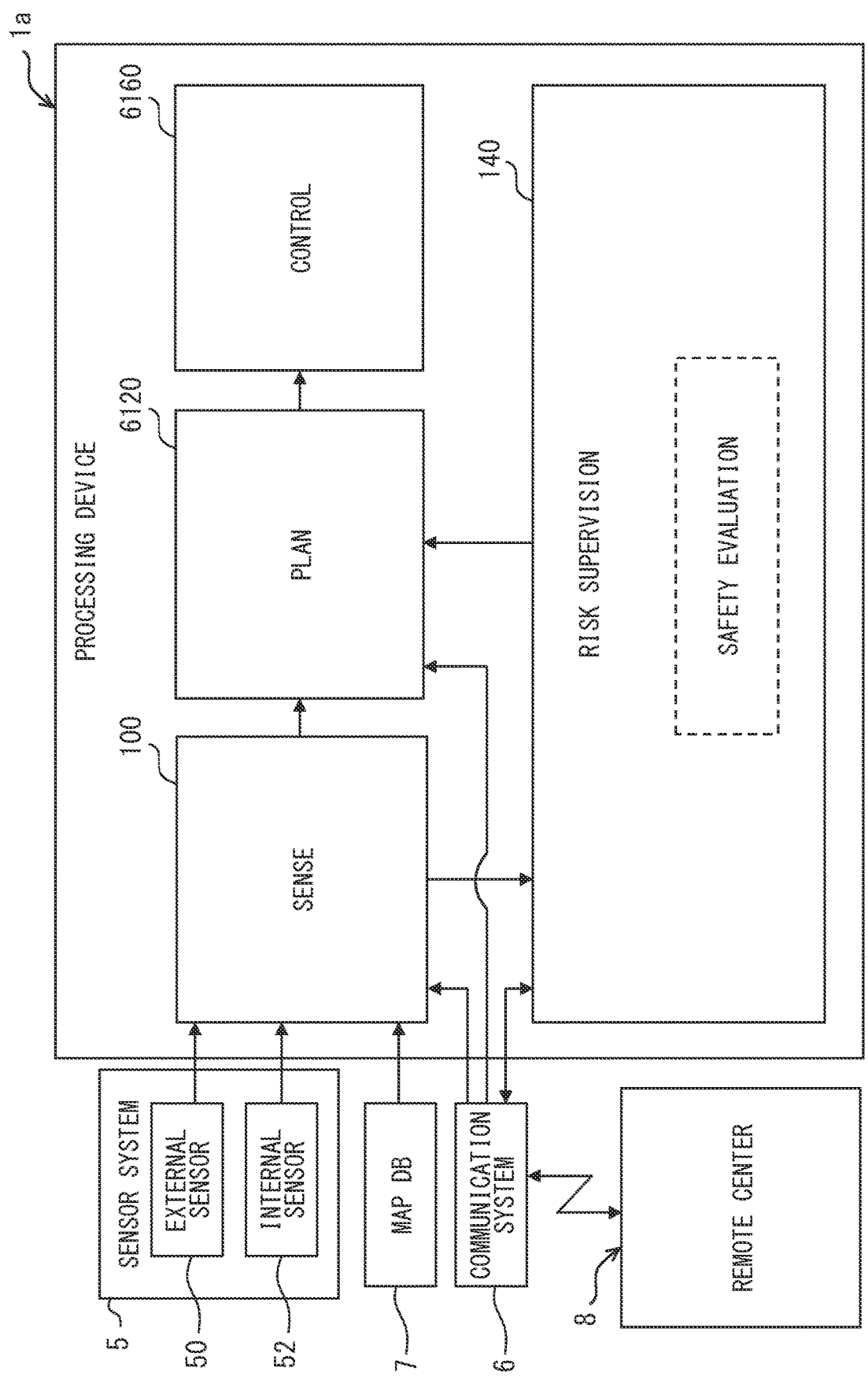
FIG. 22 is a block diagram illustrating a processing system of a sixth embodiment.

As illustrated in FIG. 22, in a control block 6160 of the sixth embodiment, acquisition processing of determination information regarding a safety envelope from the risk monitoring block 140 is omitted. Therefore, a planning block 6120 of the sixth embodiment acquires determination information regarding the safety envelope from the risk monitoring block 140. The planning block 6120 plans driving control of the host vehicle 2 in accordance with the planning block 120 when the determination information indicating that the safety envelope is not violated is acquired. On the other hand, when the determination information indicating that the safety envelope is violated is acquired, the planning block 6120 imposes a constraint/restriction on the driving control based on the determination information, in a stage of planning the driving control in accordance with the planning block 120. That is, the planning block 6120 provides a limit to the driving control to be planned. In either case, the control block 6160 executes the driving control of the host vehicle 2, planned by the planning block 6120.

In such a processing method of the sixth embodiment, for example, when the assistance information Ic of the feedback information If represents a change command for a setting parameter or a learning parameter in a safety model, the risk monitoring block 140 may execute the change command in S150. As described above, in the sixth embodiment, it is possible to increase safety improvement in manual driving and ensure driving precision in autonomous driving, by the principle in accordance with the first embodiment.

Seventh Embodiment

A seventh embodiment is still another modification of the first embodiment. Meanwhile, the seventh embodiment may be combined with the second to fifth embodiments.

Figure 23:
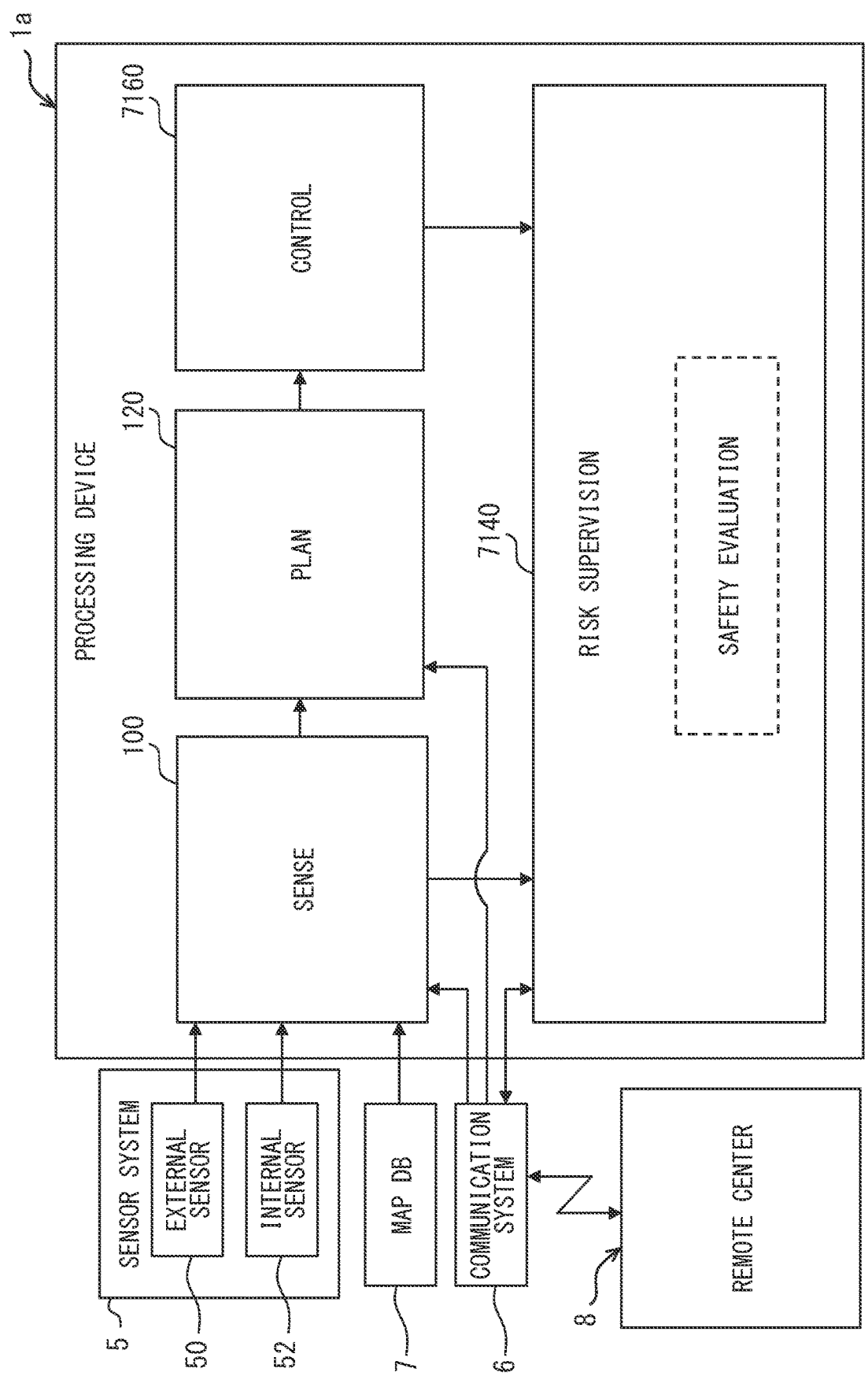
FIG. 23 is a block diagram illustrating a processing system of a seventh embodiment.

As illustrated in FIG. 23, in a control block 7160 of the seventh embodiment, acquisition processing of determination information regarding a safety envelope from the risk monitoring block 7140 is omitted. Therefore, a risk monitoring block 7140 of the seventh embodiment acquires information representing a result of driving control executed by the control block 7160 on the host vehicle 2. The risk monitoring block 7140 evaluates the driving control, by executing a safety determination based on the safety envelope related to the result of the driving control.

In such a processing method of the seventh embodiment, for example, when the assistance information Ic of the feedback information If represents a change command for a setting parameter or a learning parameter in a safety model, the risk monitoring block 140 may execute the change command in S150. These setting parameter and learning parameter may be changed by executing verification and validation at the remote center 8 or the like, or may be changed based on the concept of a feedback loop. As described above, in the seventh embodiment, it is possible to increase safety improvement in manual driving and ensure driving precision in autonomous driving, by the principle in accordance with the first embodiment.

Eighth Embodiment

An eighth embodiment is still another modification of the first embodiment. Meanwhile, the eighth embodiment may be combined with the second to fifth embodiments.

Figure 24:
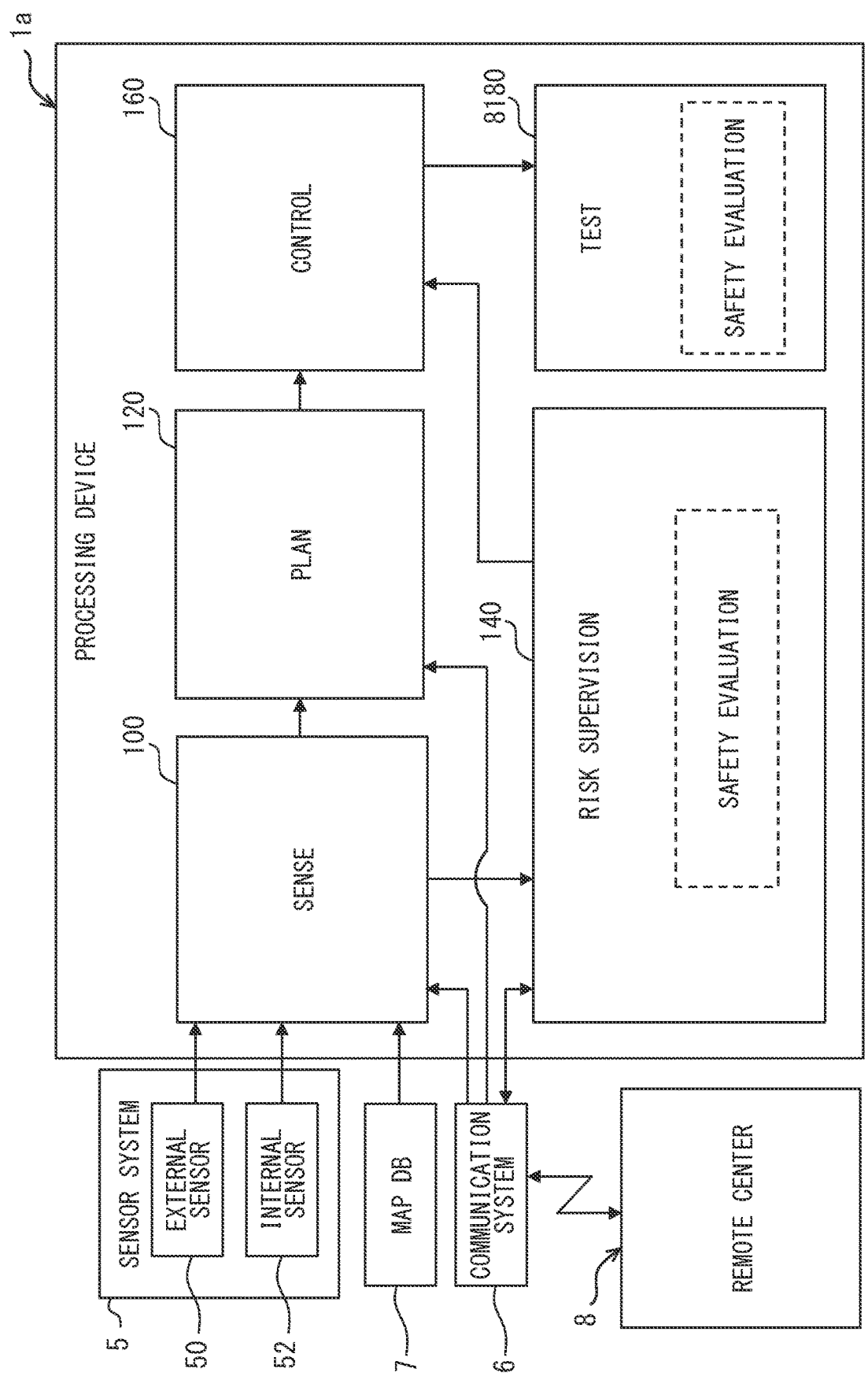
FIG. 24 is a block diagram illustrating a processing system of an eighth embodiment.
Figure 25:
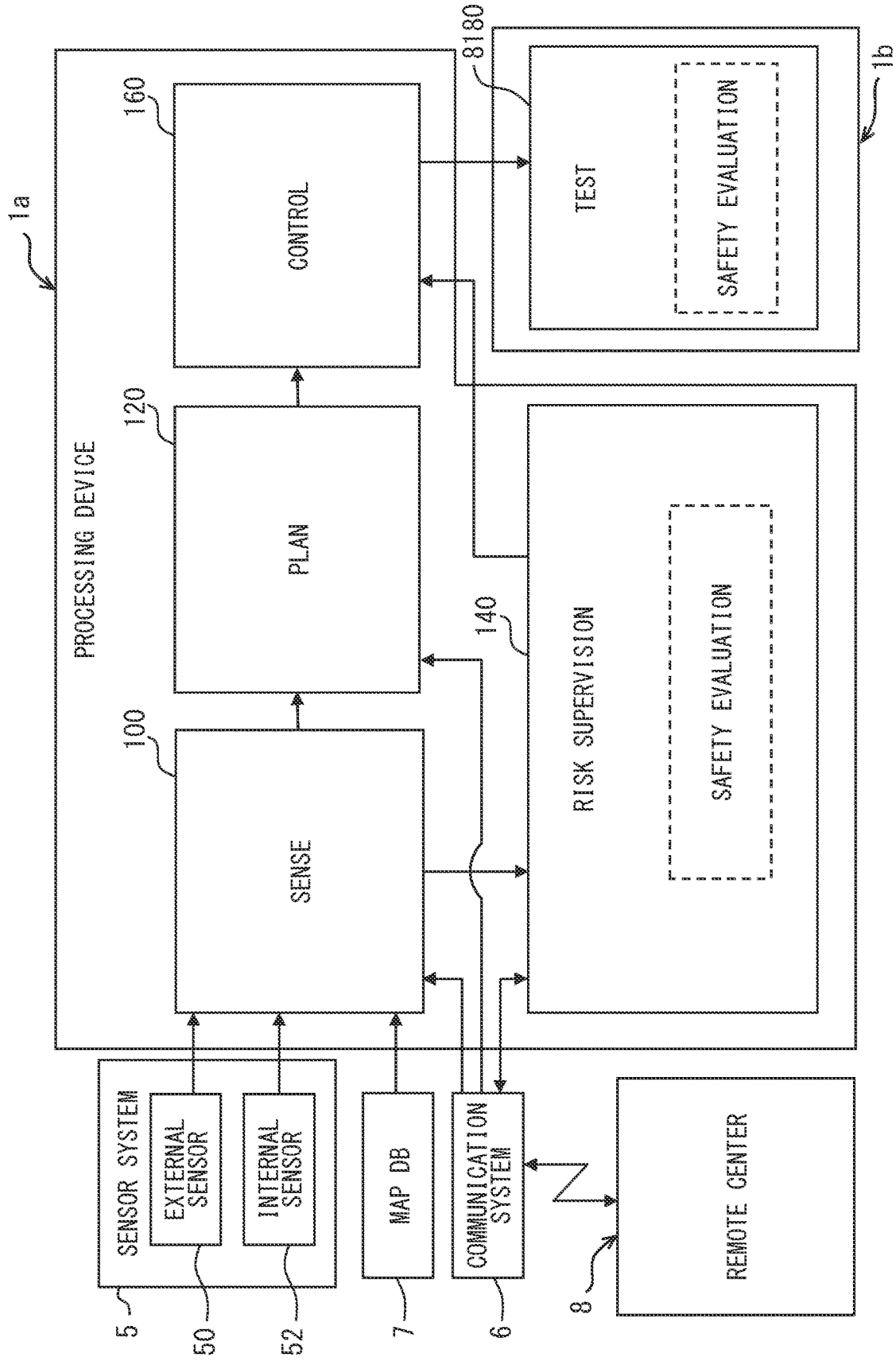
FIG. 25 is a block diagram illustrating the processing system of the eighth embodiment.
Figure 26:
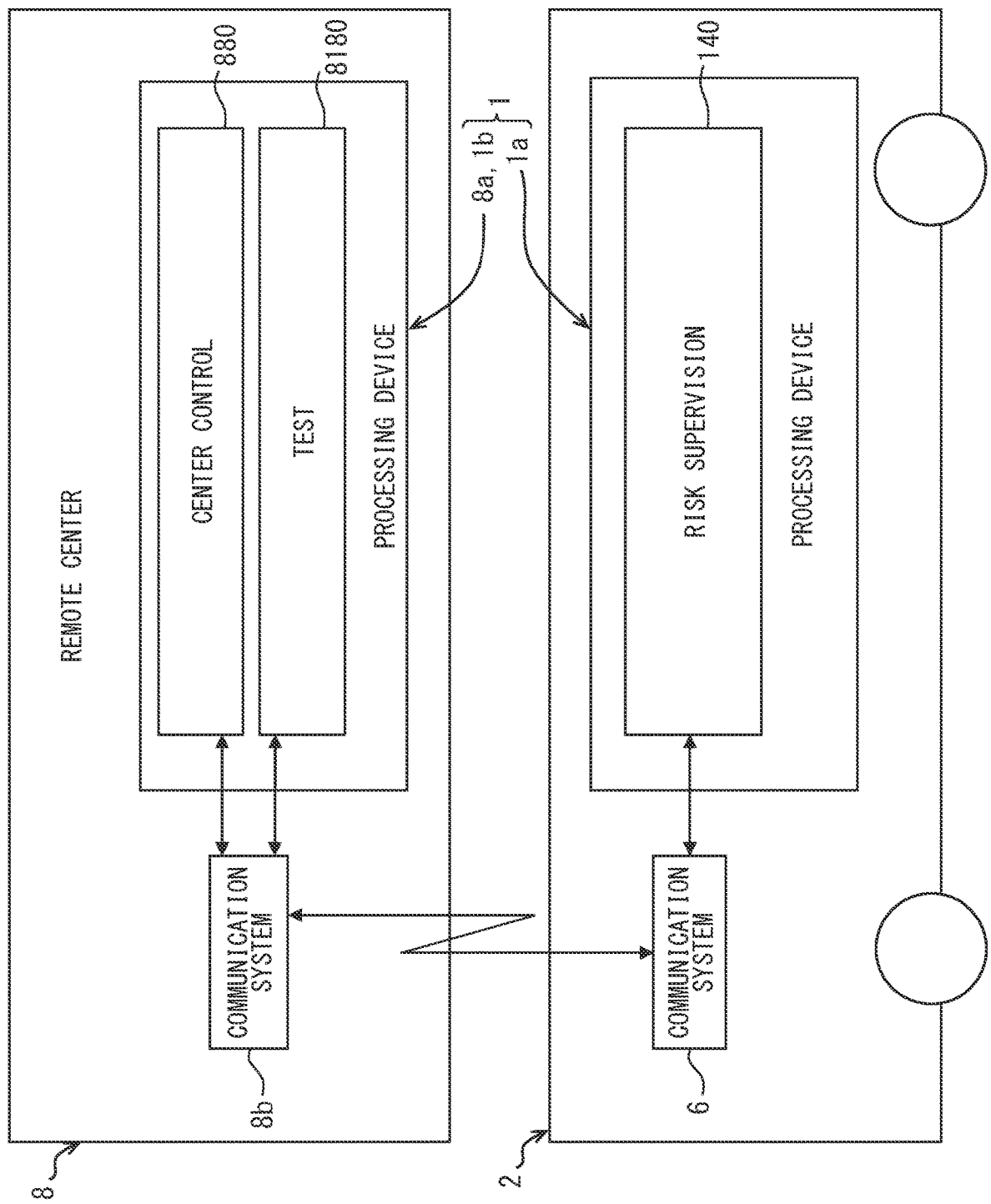
FIG. 26 is a block diagram illustrating the processing system of the eighth embodiment.

As illustrated in FIGS. 24 to 26, a test block 8180 that tests, for example, driving control for safety certification and the like by the processing device 1a is added to the eighth embodiment. The test block 8180 is provided with functions in accordance with the sensing block 100 and the risk monitoring block 140. The test block 8180 may be constructed by the processing device 1a illustrated in FIG. 24 executing a test program that is added to a processing program for constructing each of the blocks 100, 120, 140, and 160. The test block 8180 may be constructed by a test processing device 1b different from the processing device 1a as illustrated in FIGS. and 26 executing a test processing program different from the processing program for constructing each of the blocks 100, 120, 140, and 160. In the example in FIG. 25, the test processing device 1b is configured with at least one dedicated computer having the memory 10 and the processor 12, which is connected to the processing device 1a to test the driving control (the case of connection through the communication system 6 not illustrated). In the example in FIG. 26, the test processing device 1b is substituted by the processing device 8a of the remote center 8.

In such an eighth embodiment, by the principle in accordance with the first embodiment, the processing method by the processing system 1 and the processing device 1a is tested, and it is possible to increase safety improvement in manual driving and ensure driving precision in autonomous driving.

Ninth Embodiment

A ninth embodiment is a modification of the sixth embodiment. Meanwhile, the ninth embodiment may be combined with the second to fifth embodiments.

Figure 27:
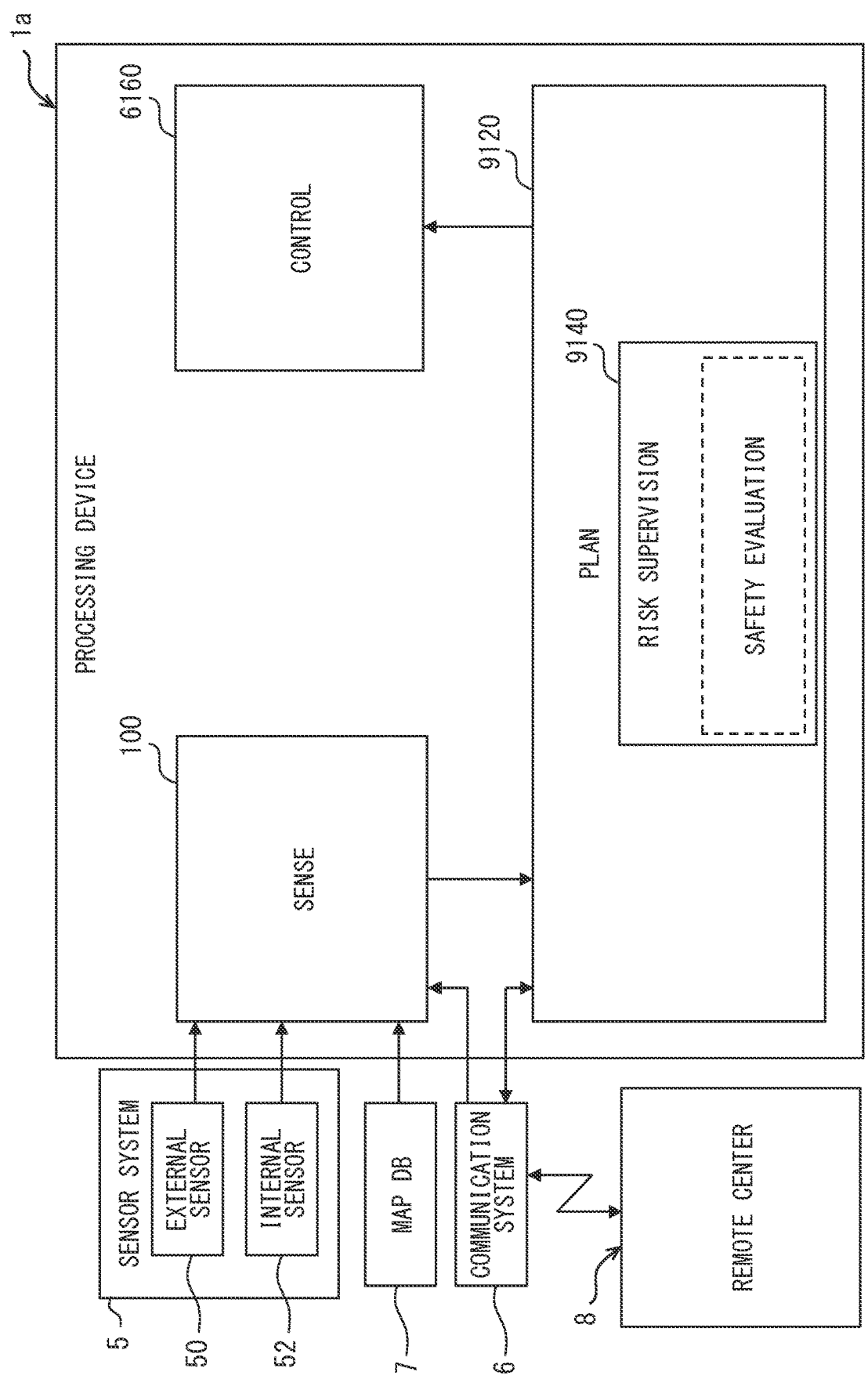
FIG. 27 is a block diagram illustrating a processing system of a ninth embodiment.

As illustrated in FIG. 27, in the processing device 1a according to the ninth embodiment, a function of the risk monitoring block 140 is incorporated in a planning block 9120, as a risk monitoring sub-block 9140. Therefore, when the risk monitoring sub-block 9140 acquires determination information indicating that a safety envelope is not violated, the planning block 9120 of the ninth embodiment plans driving control of the host vehicle 2 in accordance with the planning block 120. On the other hand, when the risk monitoring sub-block 9140 acquires the determination information indicating that the safety envelope is violated, the planning block 9120 gives a constraint/restriction based on the determination information to the driving control at a stage of planning the driving control in accordance with the planning block 120. That is, the planning block 9120 provides a limit on the driving control to be planned. In either case, the control block 6160 executes the driving control of the host vehicle 2 planned by the planning block 9120.

In such a processing method of the ninth embodiment, for example, when the assistance information Ic of the feedback information If represents a change command for a setting parameter or a learning parameter in a safety model, the risk monitoring sub-block 9140 may execute the change command in S150. As described above, in the ninth embodiment, it is possible to increase safety improvement in manual driving and ensure driving precision in autonomous driving, by the principle in accordance with the first embodiment.

Tenth Embodiment

A tenth embodiment is still another modification of the first embodiment.

Figure 28:
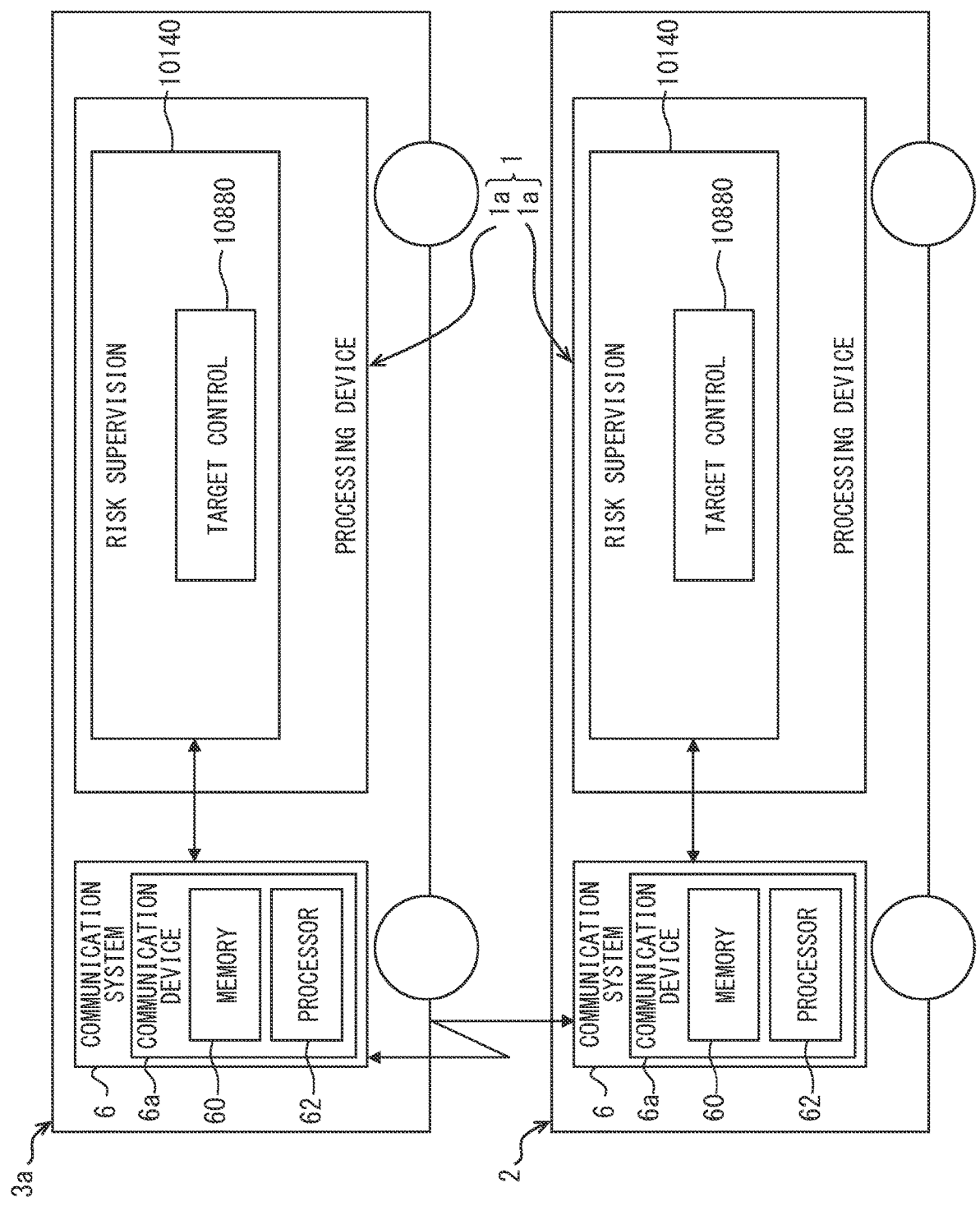
FIG. 28 is a block diagram illustrating a processing system of a tenth embodiment.

As illustrated in FIG. 28, the processing system 1 of the tenth embodiment is constructed to include the processing device 1a mounted in each of the host vehicle 2 and the target vehicle 3a. The processing system 1 of the tenth embodiment may be constructed to include at least the communication system 6 among the sensor system 5, the communication system 6, the map DB 7, and the information presentation system 4, for each of the vehicles 2 and 3a. In this case, communication enabled between the communication devices 6a constituting the communication systems 6 in the respective vehicles 2 and 3a may be realized directly by V2V communication or the like, for example, or indirectly via a remote center such as a cloud server, or may be realized via a mesh network configured between multiple vehicles including the vehicles 2 and 3a. In the tenth embodiment, the vehicle 3a corresponds to a target moving object from the viewpoint of the vehicle 2 as a host moving object, and the vehicle 2 corresponds to the target moving object with respect to the vehicle 3a as the host moving object from the opposite viewpoint.

In the processing device 1a of each of the vehicles 2 and 3a according to the tenth embodiment, in order to perform a driving-related process for each of the vehicles 2 and 3a, each functional block is individually constructed by a processing program stored in each memory 10 causing each processor 12 to execute a command. From the viewpoint of the processing system 1 as a whole, it can be considered that the functional block is constructed for each of the vehicles 2 and 3a by the processing program stored in the memory 10 of each of the vehicles 2 and 3a causing the processor 12 of each of the vehicles 2 and 3a to cooperatively execute the command. At this time, in the processing system 1 constructed to include the communication device 6a for each of the vehicles 2 and 3a, the processing program stored in the memories 10 and 60 for each of the vehicles 2 and 3a may cause the processors 12 and 62 for each of the vehicles 2 and 3a to cooperatively execute the command. In such a tenth embodiment, a function of the center control block 880 is incorporated as the target management sub-block 10880 into a risk monitoring block 10140 constructed in each processing device 1a in each of the vehicles 2 and 3a.

Therefore, in a processing method of the tenth embodiment, when S100, 110, S140, and S150 are executed by the risk monitoring block 140 or the like of the vehicle 2, S120 and S130 are preferably executed by the target management sub-block 10880 of the vehicle 3a. In this case, in S120, the target management sub-block 10880 may acquire the scenario information Is from the vehicle 2 in the vehicle 3a according to reception control of the processor 62 of the communication device 6a and store the scenario information Is in the memory 10, preferably. In this case, in S130, the target management sub-block 10880 may generate the feedback information If to include at least the assistance information Ic, as information that can be acquired by the vehicle 3a among the information Ic, Ib, and Is. In this case, in S130, in the vehicle 3a, the target management sub-block 10880 preferably transmits the generated feedback information If to the vehicle 2 in accordance with transmission control of the processor 62 of the communication device 6a, and stores the feedback information If in the memory 10.

On the other hand, when S100, 110, S140, and S150 are executed by the risk monitoring block 140 and the like of the vehicle 3a, in the processing method of the tenth embodiment, S120 and S130 may be executed by the target management sub-block 10880 of the vehicle 2. In this case, in S120, the target management sub-block 10880 should acquire the scenario information Is from the vehicle 3a in the vehicle 2 according to reception control of the processor 62 of the communication device 6a and store the scenario information Is in the memory 10. In this case, in S130, the target management sub-block 10880 may generate the feedback information If to include at least the assistance information Ic, as information that can be acquired by the vehicle 2 among the information Ic, Ib, and Is. In this case, in S130, the target management sub-block 10880 transmits the generated feedback information If from the vehicle 2 to the vehicle 3a, and stores the feedback information If in the memory according to transmission control of the processor 62 of the communication device 6a, preferably.

In addition, in any case, in the processing method of the tenth embodiment, when the assistance information Ic as the feedback information If from, for example, one of the vehicles 3a and 2 represents a change command for changing a setting parameter or a learning parameter in a safety model, the other risk monitoring sub-block 10140 of the vehicles 3a and 2 preferably executes the change command in S150. As described above, in the tenth embodiment, in any of the vehicles 2 and 3a, one of which is a host moving object for the other target moving object, it is possible to increase safety improvement in manual driving and ensure driving precision in autonomous driving, by the principle in accordance with the first embodiment. Such a tenth embodiment may be combined with the second to ninth embodiments.

Figure 29:
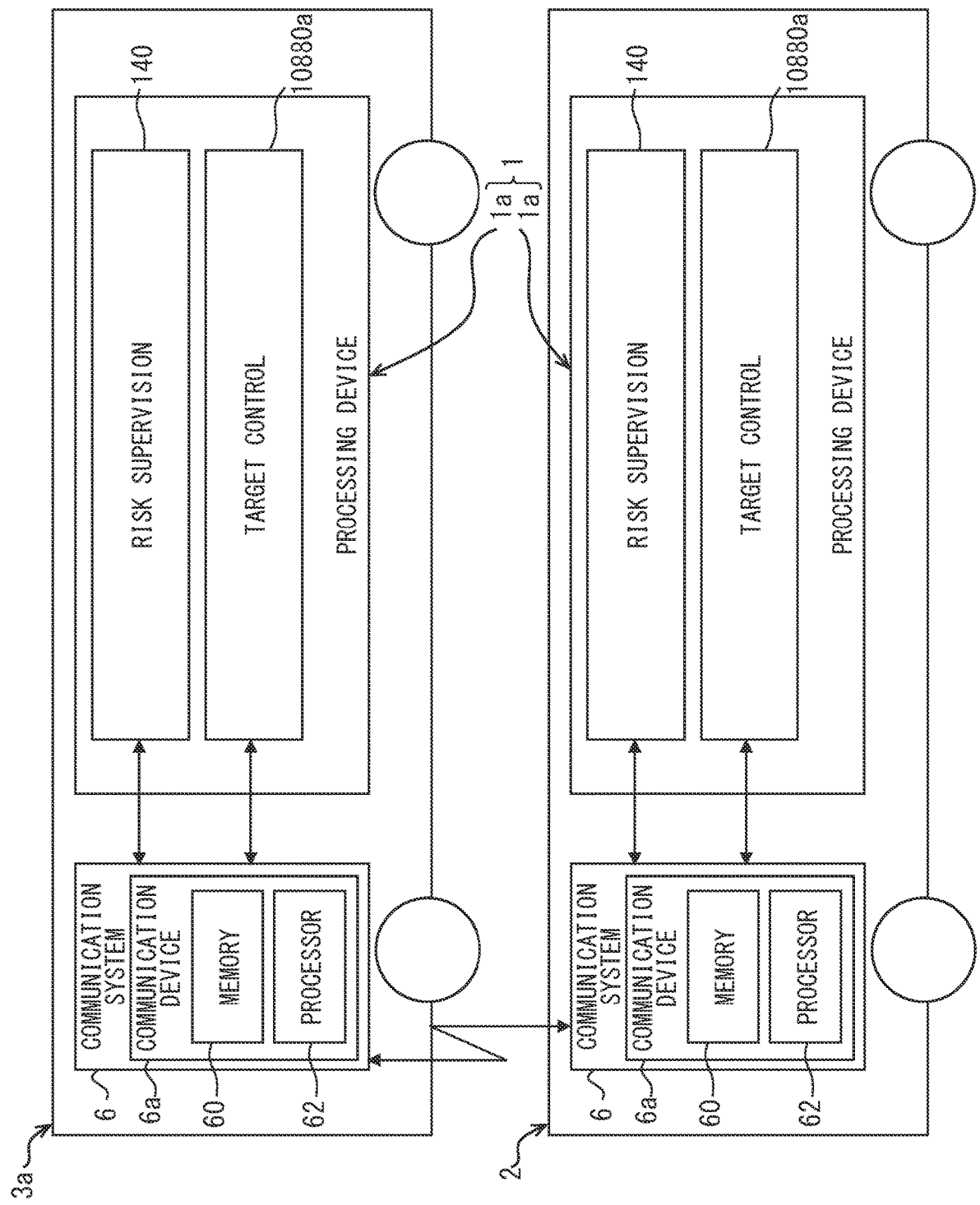
FIG. 29 is a block diagram illustrating a processing system of a modification of the tenth embodiment.

In a further modification of the tenth embodiment described so far, as illustrated in FIG. 29, apart from the risk monitoring block 140 which does not incorporate the function of the center control block 880 according to the first embodiment, a target management block 10880a that realizes the function of the target management sub-block 10880 may be constructed in the processing device 1a of each of the vehicles 2 and 3a. Such a modification of the tenth embodiment may be combined with the second to ninth embodiments.

Other Embodiments

Although multiple embodiments have been described above, the present disclosure is not construed as being limited to these embodiments, and can be applied to various embodiments and combinations within a scope that does not depart from the gist of the present disclosure.

In the modification, the dedicated computer forming at least one type of the devices 1a, 8a, and 6a may include a digital circuit and/or an analog circuit as a processor. The digital circuit is at least one type of, for example, an application specific integrated circuit (ASIC), a field programmable gate array (FPGA), a system on a chip (SOC), a programmable gate array (PGA), a complex programmable logic device (CPLD), and the like. Such a digital circuit may also have a memory in which a program is stored.

In addition to the embodiments described so far, the processing device 1a according to the embodiments and modifications described above may be executed as a semiconductor device (for example, a semiconductor chip or the like) having at least one processor 12 and at least one memory 10. The processing device 8a according to the embodiments and modifications described above may be executed as a semiconductor device (for example, a semiconductor chip or the like) having at least one processor 82 and at least one memory 80. Further, the communication device 6a according to the embodiments and modifications described above may be executed as a semiconductor device (for example, a semiconductor chip or the like) having at least one processor 62 and at least one memory 60.

(Appendix)

The technical features of the respective embodiments described above are summarized as follows.

(Technical Feature 1)

A processing device (1a) for performing processing related to driving of a host moving object (2, 3a) capable of communicating with a remote center (8), comprising:
  a processor (12) configured to execute:
    monitoring a safety envelope violation, which is a violation of a safety envelope in which safety of the intended functionality (SOTIF) is set according to a driving policy, in the host moving object in manual driving;
    generating, when it is determined that the safety envelope violation has occurred, scenario information representing a scene or scenario of the safety envelope violation to transmit the scenario information to the remote center; and
    acquiring feedback information which is fed back based on the scenario information, from the remote center.

(Technical Feature 2)

The processing device according to technical feature 1, wherein the generating of the scenario information includes generating situation information as the scenario information representing a situation of the safety envelope violation.

(Technical Feature 3)

The processing device according to technical feature 1 or 2, wherein the acquiring of the feedback information includes acquiring assistance information as the feedback information representing an assistance content for the driving determined based on the scenario information.

(Technical Feature 4)

The processing device according to any one of technical features 1 to 3, wherein the acquiring of the feedback information includes acquiring factor information as the feedback information representing a factor of the safety envelope violation determined based on the scenario information.

(Technical Feature 5)

The processing device according to any one of technical features 1 to 4, wherein the acquiring of the feedback information includes acquiring score information as the feedback information representing a driving score determined based on the scenario information, of a driver of the host moving object.

(Technical Feature 6)

The processing device according to any one of technical features 1 to 5, wherein the generating of the scenario information includes storing the generated scenario information in a storage medium (10) of the host moving object, and the acquiring of the feedback information includes deleting the scenario information from the storage medium in response to the acquiring of the feedback information.

(Technical Feature 7)

A processing method executed by a processor (12) for performing processing related to driving of a host moving object (2, 3a) capable of communicating with a remote center (8), comprising:
  monitoring a safety envelope violation, which is a violation of a safety envelope in which safety of the intended functionality is set according to a driving policy, in the host moving object in manual driving;
  generating, when it is determined that the safety envelope violation has occurred, scenario information representing a scene or scenario of the safety envelope violation to transmit the scenario information to the remote center; and
  acquiring feedback information which is fed back based on the scenario information, from the remote center.

(Technical Feature 8)

A processing program stored in a storage medium (10) for performing processing related to driving of a host moving object (2, 3*a*) capable of communicating with a remote center (8), causing a processor (12) to execute a command comprising:

monitoring a safety envelope violation, which is a violation of a safety envelope in which safety of the intended functionality is set according to a driving policy, in the host moving object in manual driving;

generating, when it is determined that the safety envelope violation has occurred, scenario information representing a scene or scenario of the safety envelope violation to transmit the scenario information to the remote center; and acquiring feedback information which is fed back based on the scenario information, from the remote center.

(Technical Feature 9)

A processing device (8*a*) for performing processing related to driving of a host moving object (2, 3*a*) at a remote center (8) capable of communicating with the host moving object, comprising:

a processor (82) configured to execute:

acquiring scenario information representing a scene or scenario of a safety envelope violation, which is a violation of a safety envelope in which safety of the intended functionality is set according to a driving policy, from the host moving object in manual driving; and generating feedback information which is fed back based on the scenario information to transmit the feedback information to the host moving object.

(Technical Feature 10)

The processing device according to technical feature 9, wherein the acquiring of the scenario information includes acquiring situation information as the scenario information representing a situation of the safety envelope violation.

(Technical Feature 11)

The processing device according to technical feature 9 or 10, wherein the generating of the feedback information includes generating assistance information as the feedback information representing an assistance content for the driving determined based on the scenario information.

(Technical Feature 12)

The processing device according to any one of technical features 9 to 11, wherein the generating of the feedback information includes generating factor information as the feedback information representing a factor of the safety envelope violation determined based on the scenario information.

(Technical Feature 13)

The processing device according to any one of technical features 9 to 12, wherein the generating of the feedback information includes generating score information as the feedback information representing a driving score determined based on the scenario information, of a driver of the host moving object.

(Technical Feature 14)

The processing device according to any one of technical features 9 to 13, wherein the remote center is capable of communicating with a service center (9) that provides a service related to the host moving object, and the generating of the feedback information includes generating public information to be published to the service center, based on at least one of the scenario information and the feedback information.

(Technical Feature 15) The processing device according to any one of technical features 9 to 14, wherein the generating of the feedback information includes generating the feedback information in response to the acquiring of the scenario information.

(Technical Feature 16)

The processing device according to any one of technical features 9 to 15, wherein the acquiring of the scenario information includes accumulating the scenario information acquired at a plurality of time points in a storage medium (80) of the remote center, and the generating of the feedback information includes generating the feedback information based on a statistical analysis of the scenario information at the plurality of time points stored in the storage medium.

(Technical Feature 17)

The processing device according to technical feature 16, wherein the generating of the feedback information includes deleting the scenario information at the plurality of time points from the storage medium in response to the generating or the transmitting of the feedback information.

(Technical Feature 18)

A processing method executed by a processor (82) for performing processing related to driving of a host moving object (2, 3*a*) at a remote center (8) capable of communicating with the host moving object, comprising:

acquiring scenario information representing a scene or scenario of a safety envelope violation, which is a violation of a safety envelope in which safety of the intended functionality is set according to a driving policy, from the host moving object in manual driving; and generating feedback information which is fed back based on the scenario information to transmit the feedback information to the host moving object.

(Technical Feature 19)

A processing program stored in a storage medium (80) for performing processing related to driving of a host moving object (2, 3*a*) at a remote center (8) capable of communicating with the host moving object, causing a processor (82) to execute a command comprising:

acquiring scenario information representing a scene or scenario of a safety envelope violation, which is a violation of a safety envelope in which safety of the intended functionality is set according to a driving policy, from the host moving object in manual driving; and generating feedback information which is fed back based on the scenario information to transmit the feedback information to the host moving object.

(Technical Feature 20)

A processing system (1) for performing processing related to driving of a host moving object (2, 3*a*) capable of communicating with a remote center (8), comprising:

a first processor (12) of the host moving object; and a second processor (82) of the remote center, the first processor configured to execute:

monitoring a safety envelope violation, which is a violation of a safety envelope in which safety of the intended functionality is set according to a driving policy, in the host moving object in manual driving; and generating, when it is determined that the safety envelope violation has occurred, scenario information representing a scene or scenario of the safety envelope violation to transmit the scenario information from the host moving object to the remote center, and the second processor configured to execute:
  generating feedback information which is fed back based on the scenario information to transmit the feedback information from the remote center to the host moving object.

(Technical Feature 21)

A processing method executed in cooperation with a first processor (12) of a host moving object (2, 3a) capable of communicating with a remote center (8) and a second processor (82) of the remote center for performing processing related to driving of the host moving object, comprising:
  monitoring a safety envelope violation, which is a violation of a safety envelope in which safety of the intended functionality is set according to a driving policy, in the host moving object in manual driving;
  generating, when it is determined that the safety envelope violation has occurred, scenario information representing a scene or scenario of the safety envelope violation to transmit the scenario information from the host moving object to the remote center; and
  generating feedback information which is fed back based on the scenario information to transmit the feedback information from the remote center to the host moving object.

(Technical Feature 22)

A processing program stored in at least one of a first storage medium (10) of a host moving object (2, 3a) capable of communicating with a remote center (8) and a second storage medium (80) of the remote center for performing processing related to driving of the host moving object, causing a first processor (12) of the host moving object and a second processor (82) of the remote center to cooperatively execute a command comprising:
  monitoring a safety envelope violation, which is a violation of a safety envelope in which safety of the intended functionality is set according to a driving policy, in the host moving object in manual driving;
  generating, when it is determined that the safety envelope violation has occurred, scenario information representing a scene or scenario of the safety envelope violation to transmit the scenario information from the host moving object to the remote center; and
  generating feedback information which is fed back based on the scenario information to transmit the feedback information from the remote center to the host moving object.

(Technical Feature 23)

A communication device (6a) capable of communicating with a remote center (8) for performing processing related to driving of a host moving object (2, 3a) in cooperation with the processing device (1a) according to any one of technical features 1 to 6, comprising:
  a processor (62) configured to execute:
  transmitting, when the processing device determines that a safety envelope violation has occurred in the host vehicle in manual driving, scenario information to the remote center and receiving feedback information from the remote center.

(Technical Feature 24)

A communication device (6a) capable of communicating with a remote center (8) for performing processing related to driving of a host moving object (2, 3a), comprising:
  a processor (62) configured to execute:
  transmitting, when a safety envelope violation, which is a violation of a safety envelope in which safety of the intended functionality is set according to a driving policy, has occurred in the host vehicle in manual driving, scenario information representing a scene or scenario of the safety envelope violation to the remote center, and receiving feedback information which is fed back based on the scenario information from the remote center.

(Technical Feature 25)

A processing method executed by a processor (62) for performing processing related to driving of a host moving object (2, 3a) at a communication device (6a) capable of communicating with a remote center (8), comprising:
  transmitting, when a safety envelope violation, which is a violation of a safety envelope in which safety of the intended functionality is set according to a driving policy, has occurred in the host vehicle in manual driving, scenario information representing a scene or scenario of the safety envelope violation to the remote center, and receiving feedback information from the remote center which is fed back based on the scenario information.

(Technical Feature 26)

A processing program stored in a storage medium (60) for performing processing related to driving of a host moving object (2, 3a) at a communication device (6a) capable of communicating with a remote center (8), causing a processor (62) to execute a command comprising:
  transmitting, when a safety envelope violation, which is a violation of a safety envelope in which safety of the intended functionality is set according to a driving policy has occurred in the host vehicle in manual driving, scenario information representing a scene or scenario of the safety envelope violation to the remote center, and receiving feedback information which is fed back based on the scenario information from the remote center.

(Technical Feature 27)

A processing system (1) for performing processing related to driving of a host moving object (2, 3a) capable of communicating with a remote center (8), comprising:
  a processor (12, 62) configured to execute:
  monitoring a safety envelope violation, which is a violation of a safety envelope in which safety of the intended functionality is set according to a driving policy, in the host moving object in manual driving;
  transmitting, when it is determined that the safety envelope violation has occurred, scenario information representing a scene or scenario of the safety envelope violation to the remote center; and
  receiving feedback information which is fed back based on the scenario information, from the remote center.

(Technical Feature 28)

A processing method executed by a processor (12, 62) for performing processing related to driving of a host moving object (2, 3a) capable of communicating with a remote center (8), comprising:
  monitoring a safety envelope violation, which is a violation of a safety envelope in which safety of the intended functionality is set according to a driving policy, in the host moving object in manual driving;
  transmitting, when it is determined that the safety envelope violation has occurred, scenario information representing a scene or scenario of the safety envelope violation to the remote center; and
  receiving feedback information which is fed back based on the scenario information, from the remote center.

(Technical Feature 29)

A processing program stored in a storage medium (10, 60) for performing processing related to driving of a host moving object (2, 3*a*) capable of communicating with a remote center (8), causing a processor (12, 62) to execute a command comprising:

monitoring a safety envelope violation, which is a violation of a safety envelope in which safety of the intended functionality is set according to a driving policy, in the host moving object in manual driving;

transmitting, when it is determined that the safety envelope violation has occurred, scenario information representing a scene or scenario of the safety envelope violation to the remote center; and receiving feedback information which is fed back based on the scenario information, from the remote center.

(Technical Feature 30)

A processing device (1*a*) for performing processing related to driving of a host moving object (2, 3*a*) capable of communicating with a target moving object (3*a*, 2), comprising:

a processor (12) configured to execute:

monitoring a safety envelope violation, which is a violation of a safety envelope in which safety of the intended functionality is set according to a driving policy, in the host moving object in manual driving;

generating, when it is determined that the safety envelope violation has occurred, scenario information representing a scene or scenario of the safety envelope violation to transmit the scenario information to the target moving object; and acquiring feedback information which is fed back based on the scenario information, from the target moving object.

(Technical Feature 31)

A processing method executed by a processor (12) for performing processing related to driving of a host moving object (2, 3*a*) capable of communicating with a target moving object (3*a*, 2), comprising:

monitoring a safety envelope violation, which is a violation of a safety envelope in which safety of the intended functionality is set according to a driving policy, in the host moving object in manual driving;

generating, when it is determined that the safety envelope violation has occurred, scenario information representing a scene or scenario of the safety envelope violation to transmit the scenario information to the target moving object; and acquiring feedback information which is fed back based on the scenario information, from the target moving object.

(Technical Feature 32)

A processing program stored in a storage medium (10) for performing processing related to driving of a host moving object (2, 3*a*) capable of communicating with a target moving object (3*a*, 2), causing a processor (12) to execute a command comprising:

monitoring a safety envelope violation, which is a violation of a safety envelope in which safety of the intended functionality is set according to a driving policy, in the host moving object in manual driving;

generating, when it is determined that the safety envelope violation has occurred, scenario information representing a scene or scenario of the safety envelope violation to transmit the scenario information to the target moving object; and acquiring feedback information which is fed back based on the scenario information, from the target moving object.

(Technical Feature 33)

A communication device (6*a*) capable of communicating with a target moving object (3*a*, 2) for performing processing related to driving of a host moving object (2, 3*a*) in cooperation with the processing device (1*a*) according to technical feature 30, comprising:

a processor (62) configured to execute:

transmitting, when the processing device determines that a safety envelope violation has occurred in the host vehicle in manual driving, scenario information to the target moving object and receiving feedback information from the target moving object.

(Technical Feature 34)

A communication device (6*a*) capable of communicating with a target moving object (3*a*, 2) for performing processing related to driving of a host moving object (2, 3*a*), comprising:

a processor (62) configured to execute:

transmitting, when a safety envelope violation, which is a violation of a safety envelope in which safety of the intended functionality is set according to a driving policy, has occurred in the host vehicle in manual driving, scenario information representing a scene or scenario of the safety envelope violation to the target moving object, and receiving feedback information which is fed back based on the scenario information from the target moving object.

(Technical Feature 35)

A processing method executed by a processor (62) for performing processing related to driving of a host moving object (2, 3*a*) at a communication device (6*a*) capable of communicating with a target moving object (3*a*, 2), comprising:

transmitting, when a safety envelope violation, which is a violation of a safety envelope in which safety of the intended functionality is set according to a driving policy, has occurred in the host vehicle in manual driving, scenario information representing a scene or scenario of the safety envelope violation to the target moving object, and receiving feedback information from the target moving object which is fed back based on the scenario information.

(Technical Feature 36)

A processing program stored in a storage medium (60) for performing processing related to driving of a host moving object (2, 3*a*) at a communication device (6*a*) capable of communicating with a target moving object (3*a*, 2), causing a processor (62) to execute a command comprising:

transmitting, when a safety envelope violation, which is a violation of a safety envelope in which safety of the intended functionality is set according to a driving policy has occurred in the host vehicle in manual driving, scenario information representing a scene or scenario of the safety envelope violation to the target moving object, and receiving feedback information which is fed back based on the scenario information from the target moving object.

(Technical Feature 37)

A processing system (1) for performing processing related to driving of a host moving object (2, 3*a*) capable of communicating with a target moving object (3*a*, 2), comprising:

a processor (12, 62) configured to execute:

monitoring a safety envelope violation, which is a violation of a safety envelope in which safety of the intended functionality is set according to a driving policy, in the host moving object in manual driving;

transmitting, when it is determined that the safety envelope violation has occurred, scenario information representing a scene or scenario of the safety envelope violation to the target moving object; and receiving feedback information which is fed back based on the scenario information, from the target moving object.

(Technical Feature 38)

A processing method executed by a processor (12, 62) for performing processing related to driving of a host moving object (2, 3*a*) capable of communicating with a target moving object (3*a*, 2), comprising:

monitoring a safety envelope violation, which is a violation of a safety envelope in which safety of the intended functionality is set according to a driving policy, in the host moving object in manual driving;

transmitting, when it is determined that the safety envelope violation has occurred, scenario information representing a scene or scenario of the safety envelope violation to the target moving object; and receiving feedback information which is fed back based on the scenario information, from the target moving object.

(Technical Feature 39)

A processing program stored in a storage medium (10, 60) for performing processing related to driving of a host moving object (2, 3*a*) capable of communicating with a target moving object (3*a*, 2), causing a processor (12, 62) to execute a command comprising:

monitoring a safety envelope violation, which is a violation of a safety envelope in which safety of the intended functionality is set according to a driving policy, in the host moving object in manual driving;

transmitting, when it is determined that the safety envelope violation has occurred, scenario information representing a scene or scenario of the safety envelope violation to the target moving object; and receiving feedback information which is fed back based on the scenario information, from the target moving object.

(Technical Feature 40)

A processing device (1*a*) for performing processing related to driving of a target moving object (2, 3*a*) at a host moving object (3*a*, 2) capable of communicating with the target moving object, comprising:

a processor (12) configured to execute:

acquiring scenario information representing a scene or scenario of a safety envelope violation, which is a violation of a safety envelope in which safety of the intended functionality is set according to a driving policy, from the target moving object in manual driving; and generating feedback information which is fed back based on the scenario information to transmit the feedback information to the target moving object.

(Technical Feature 41)

A processing method executed by a processor (12) for performing processing related to driving of a target moving object (2, 3*a*) at a host moving object (3*a*, 2) capable of communicating with the target moving object, comprising:

acquiring scenario information representing a scene or scenario of a safety envelope violation, which is a violation of a safety envelope in which safety of the intended functionality is set according to a driving policy, from the target moving object in manual driving; and generating feedback information which is fed back based on the scenario information to transmit the feedback information to the target moving object.

(Technical Feature 42)

A processing program stored in a storage medium (10) for performing processing related to driving of a target moving object (2, 3*a*) at a host moving object (3*a*, 2) capable of communicating with the target moving object, causing a processor (12) to execute a command comprising:

acquiring scenario information representing a scene or scenario of a safety envelope violation, which is a violation of a safety envelope in which safety of the intended functionality is set according to a driving policy, from the target moving object in manual driving; and generating feedback information which is fed back based on the scenario information to transmit the feedback information to the target moving object.

(Technical Feature 43)

A communication device (6*a*) for performing processing related to driving of a target moving object (2, 3*a*) at a host moving object (3*a*, 2) capable of communicating with the target moving object in cooperation with the processing device (I a) according to technical feature 40, comprising:

a processor (62) configured to execute:

receiving scenario information representing a scene or scenario of a safety envelope violation from the target moving object in manual driving, and transmitting feedback information to the target moving object.

(Technical Feature 44)

A communication device (6*a*) for performing processing related to driving of a target moving object (2, 3*a*) at a host moving object (3*a*, 2) capable of communicating with the target moving object, comprising:

a processor (62) configured to execute:

receiving scenario information representing a scene or scenario of a safety envelope violation, which is a violation of a safety envelope in which safety of the intended functionality is set according to a driving policy, from the target moving object in manual driving; and transmitting feedback information which is fed back based on the scenario information to the target moving object.

(Technical Feature 45)

A processing method executed by a processor (62) for performing processing related to driving of a target moving object (2, 3*a*) at a communication device (6*a*) of a host moving object (3*a*, 2) capable of communicating with the target moving object, comprising:

receiving scenario information representing a scene or scenario of a safety envelope violation, which is a violation of a safety envelope in which safety of the intended functionality is set according to a driving policy, from the target moving object in manual driving; and transmitting feedback information which is fed back based on the scenario information to the target moving object.

(Technical Feature 46)

A processing program stored in a storage medium (60) for performing processing related to driving of a target moving object (2, 3*a*) at a communication device (6*a*) of a host moving object (3*a*, 2) capable of communicating with the target moving object, causing a processor (62) to execute a command comprising:

receiving scenario information representing a scene or scenario of a safety envelope violation, which is a violation of a safety envelope in which safety of the intended functionality is set according to a driving policy, from the target moving object in manual driving; and transmitting feedback information which is fed back based on the scenario information to the target moving object.

(Technical Feature 47)

A processing system (1) for performing processing related to driving of a target moving object (2, 3a) at a host moving object (3a, 2) capable of communicating with the target moving object, comprising:

a processor (12, 62) configured to execute:

receiving scenario information representing a scene or scenario of a safety envelope violation, which is a violation of a safety envelope in which safety of the intended functionality is set according to a driving policy, from the target moving object in manual driving; and transmitting feedback information which is fed back based on the scenario information to the target moving object.

(Technical Feature 48)

A processing method executed by a processor (12, 62) for performing processing related to driving of a target moving object (2, 3a) at a host moving object (3, 2) capable of communicating with the target moving object, comprising:

receiving scenario information representing a scene or scenario of a safety envelope violation, which is a violation of a safety envelope in which safety of the intended functionality is set according to a driving policy, from the target moving object in manual driving; and transmitting feedback information which is fed back based on the scenario information to the target moving object.

(Technical Feature 49)

A processing program stored in a storage medium (10, 60) for performing processing related to driving of a target moving object (2, 3a) at a host moving object (3, 2) capable of communicating with the target moving object, causing a processor (12, 62) to execute a command comprising:

receiving scenario information representing a scene or scenario of a safety envelope violation, which is a violation of a safety envelope in which safety of the intended functionality is set according to a driving policy, from the target moving object in manual driving; and transmitting feedback information which is fed back based on the scenario information to the target moving object.

What is claimed is:

1. A processing device performing a process related to driving of a host moving object, the host moving object being capable of communicating with a remote center, the processing device comprising:

a processor configured to:

monitor a safety envelope violation, which is a violation of a safety envelope in which safety of intended functionality is set in compliance with a driving policy, in the host moving object in manual driving, the safety envelope violation indicating a violation of a set of limits and conditions set for maintaining an operation within an acceptable level of risk;

in response to determining that the safety envelope violation has occurred, generate scenario information, which represents a scenario of the safety envelope violation, and transmit the scenario information to the remote center; and acquire feedback information from the remote center, the feedback information being fed back based on the scenario information, wherein manual driving of the host moving object by a driver is assisted based on the feedback information acquired from the remote center by presenting the acquired feedback information using an information presentation system, which is implemented by a human machine interface.

2. The processing device according to claim 1, wherein the generating of the scenario information includes generating, as the scenario information, situation information that represents a situation of the safety envelope violation.

3. The processing device according to claim 1, wherein the acquiring of the feedback information includes acquiring, as the feedback information, assistance information that represents an assistance content for the driving determined based on the scenario information.

4. The processing device according to claim 1, wherein the acquiring of the feedback information includes acquiring, as the feedback information, factor information that represents a factor of the safety envelope violation determined based on the scenario information.

5. The processing device according claim 1, wherein the acquiring of the feedback information includes acquiring, as the feedback information, score information that represents a driving score of a driver of the host moving object, and the driving score of the driver is determined based on the scenario information.

6. The processing device according to claim 1, wherein the generating of the scenario information includes storing the generated scenario information in a storage medium of the host moving object, and the acquiring of the feedback information includes deleting the scenario information from the storage medium in response to the acquiring of the feedback information.

7. The processing device according claim 1, wherein the safety envelope is set as a physics-based margin around each road user, which includes the host moving object and a target moving object, with a margin relating to a kinematic property, which includes at least one of a distance, a speed, or an acceleration.

8. A processing method executed by a processor for performing a process related to driving of a host moving object, the host moving object being capable of communicating with a remote center, the processing method comprising:

monitoring a safety envelope violation, which is a violation of a safety envelope in which safety of the intended functionality is set in compliance with a driving policy, in the host moving object in manual driving, the safety envelope violation indicating a violation of a set of limits and conditions set for maintaining an operation within an acceptable level of risk;

in response to determining that the safety envelope violation has occurred, generating scenario information, which represents a scenario of the safety envelope violation, and transmitting the scenario information to the remote center; and acquiring feedback information from the remote center, the feedback information being fed back based on the scenario information, wherein manual driving of the host moving object by a driver is assisted based on the feedback information acquired from the remote center by presenting the acquired feedback information using an information presentation system, which is implemented by a human machine interface.

9. A computer-readable non-transitory storage medium storing a processing program comprising instructions, the instructions, when being executed by a processor, performing a process related to driving of a host moving object, the host moving object being capable of communicating with a remote center, the instructions comprising:

monitoring a safety envelope violation, which is a violation of a safety envelope in which safety of the intended functionality is set in compliance with a driving policy, in the host moving object in manual driving, the safety envelope violation indicating a violation of a set of limits and conditions set for maintaining an operation within an acceptable level of risk;

in response to determining that the safety envelope violation is has occurred, generating scenario information, which represents a scenario of the safety envelope violation, and transmitting the scenario information to the remote center; and acquiring feedback information from the remote center, the feedback information being fed back based on the scenario information, wherein manual driving of the host moving object by a driver is assisted based on the feedback information acquired from the remote center by presenting the acquired feedback information using an information presentation system, which is implemented by a human machine interface.

10. A processing device performing a process related to driving of a host moving object in a remote center, the remote center being capable of communicating with the host moving object, the processing device comprising:

a processor configured to:

acquire scenario information from the host moving object in manual driving, the scenario information representing a scenario of a safety envelope violation, the safety envelope violation being a violation of a safety envelope in which safety of the intended functionality is set in compliance with a driving policy, the safety envelope violation indicating a violation of a set of limits and conditions set for maintaining an operation within an acceptable level of risk; and generate feedback information based on the scenario information and transmit the feedback information to the host moving object, wherein manual driving of the host moving object by a driver is assisted based on the feedback information acquired from the remote center by presenting the acquired feedback information using an information presentation system, which is implemented by a human machine interface.

11. The processing device according to claim 10, wherein the acquiring of the scenario information includes acquiring, as the scenario information, situation information that represents a situation of the safety envelope violation.

12. The processing device according to claim 10, wherein the generating of the feedback information includes generating, as the feedback information, assistance information that represents an assistance content for the driving determined based on the scenario information.

13. The processing device according to claim 10, wherein the generating of the feedback information includes generating, as the feedback information, factor information that represents a factor of the safety envelope violation determined based on the scenario information.

14. The processing device according to claim 10, wherein the generating of the feedback information includes generating, as the feedback information, score information that represents a driving score of a driver of the host moving object, and the driving score of the driver is determined based on the scenario information.

15. The processing device according to claim 10, wherein the remote center is capable of communicating with a service center that provides a service related to the host moving object, and the generating of the feedback information includes generating public information to be published to the service center, based on at least one of the scenario information or the feedback information.

16. The processing device according to claim 10, wherein the generating of the feedback information includes generating the feedback information in response to the acquiring of the scenario information.

17. The processing device according to claim 10, wherein the acquiring of the scenario information includes accumulating the scenario information acquired at multiple time points in a storage medium of the remote center, and the generating of the feedback information includes generating the feedback information based on a statistical analysis of the scenario information stored in the storage medium at the multiple time points.

18. The processing device according to claim 17, wherein the generating of the feedback information includes deleting the scenario information, which were stored at the multiple time points, from the storage medium in response to the generating or the transmitting of the feedback information.

19. The processing device according claim 10, wherein the safety envelope is set as a physics-based margin around each road user, which includes the host moving object and a target moving object, with a margin relating to a kinematic property, which includes at least one of a distance, a speed, or an acceleration.

20. A processing method executed by a processor for performing a process related to driving of a host moving object in a remote center, the remote center being capable of communicating with the host moving object, the processing method comprising:

acquiring scenario information from the host moving object in manual driving, the scenario information representing a scenario of a safety envelope violation, the safety envelope violation being a violation of a safety envelope in which safety of the intended functionality is set in compliance with a driving policy, the safety envelope violation indicating a violation of a set of limits and conditions set for maintaining an operation within an acceptable level of risk; and generating feedback information based on the scenario information and transmitting the feedback information to the host moving object, wherein manual driving of the host moving object by a driver is assisted based on the feedback information acquired from the remote center by presenting the acquired feedback information using an information presentation system, which is implemented by a human machine interface.

21. A computer-readable non-transitory storage medium storing a processing program comprising instructions, the instructions, when being executed by a processor, performing a process related to driving of a host moving object in a remote center, the remote center being capable of communicating with the host moving object, the instructions comprising:

acquiring scenario information from the host moving object in manual driving, the scenario information representing a scenario of a safety envelope violation, the safety envelope violation being a violation of a safety envelope in which safety of the intended functionality is set in compliance with a driving policy, the safety envelope violation indicating a violation of a set of limits and conditions set for maintaining an operation within an acceptable level of risk; and generating feedback information based on the scenario information and transmitting the feedback information to the host moving object, wherein manual driving of the host moving object by a driver is assisted based on the feedback information acquired from the remote center by presenting the acquired feedback information using an information presentation system, which is implemented by a human machine interface.

22. A processing system that performs a process related to driving of a host moving object, the host moving object being capable of communicating with a remote center, the processing system comprising:

a first processor of the host moving object; and
a second processor of the remote center,
wherein
the first processor is configured to:
monitor a safety envelope violation, which is a violation of a safety envelope in which safety of intended functionality is set in compliance with a driving policy, in the host moving object in manual driving, the safety envelope violation indicating a violation of a set of limits and conditions set for maintaining an operation within an acceptable level of risk; and
in response to determining that the safety envelope violation has occurred, generate scenario information, which represents a scenario of the safety envelope violation, and transmit the scenario information from the host moving object to the remote center, and
the second processor is configured to generate feedback information based on the scenario information and transmit the feedback information from the remote center to the host moving object, wherein manual driving of the host moving object by a driver is assisted based on the feedback information acquired from the remote center by presenting the acquired feedback information using an information presentation system, which is implemented by a human machine interface.

23. The processing system according claim 22, wherein the safety envelope is set as a physics-based margin around each road user, which includes the host moving object and a target moving object, with a margin relating to a kinematic property, which includes at least one of a distance, a speed, or an acceleration.

24. A processing method executed by cooperation of a first processor of a host moving object and a second processor of a remote center, the host moving object being capable of communicating with the remote center, the processing method performing process related to driving of the host moving object, the processing method comprising:

monitoring a safety envelope violation, which is a violation of a safety envelope in which safety of intended functionality is set in compliance with a driving policy, in the host moving object in manual driving, the safety envelope violation indicating a violation of a set of limits and conditions set for maintaining an operation within an acceptable level of risk;

in response to determining that the safety envelope violation has occurred, generating scenario information, which represents a scenario of the safety envelope violation, and transmitting the scenario information from the host moving object to the remote center; and generating feedback information based on the scenario information and transmitting the feedback information from the remote center to the host moving object, wherein manual driving of the host moving object by a driver is assisted based on the feedback information acquired from the remote center by presenting the acquired feedback information using an information presentation system, which is implemented by a human machine interface.

25. A computer-readable non-transitory storage medium storing a processing program, the computer-readable non-transitory storage medium being one of a first storage medium of a host moving object or a second storage medium of a remote center, the host moving object being capable of communicating with the remote center, the processing program comprising instructions that perform a process related to driving of the host moving object when the instructions are executed by cooperation of a first processor of the host moving object and a second processor of the remote center, the instructions comprising:

monitoring a safety envelope violation, which is a violation of a safety envelope in which safety of intended functionality is set in compliance with a driving policy, in the host moving object in manual driving, the safety envelope violation indicating a violation of a set of limits and conditions set for maintaining an operation within an acceptable level of risk;

in response to determining that the safety envelope violation has occurred, generating scenario information, which represents a scenario of the safety envelope violation, and transmitting the scenario information from the host moving object to the remote center; and generating feedback information based on the scenario information and transmitting the feedback information from the remote center to the host moving object, wherein manual driving of the host moving object by a driver is assisted based on the feedback information acquired from the remote center by presenting the acquired feedback information using an information presentation system, which is implemented by a human machine interface.

\* \* \* \* \*